(12) United States Patent
Sabe et al.

(10) Patent No.: US 7,630,525 B2
(45) Date of Patent: Dec. 8, 2009

(54) INFORMATION PROCESSING APPARATUS AND METHOD, RECORDING MEDIUM, AND PROGRAM

(75) Inventors: Kohtaro Sabe, Tokyo (JP); Kenichi Hidai, Tokyo (JP)

(73) Assignee: Sony Corporation, Tokyo (JP)

( * ) Notice: Subject to any disclaimer, the term of this patent is extended or adjusted under 35 U.S.C. 154(b) by 613 days.

(21) Appl. No.: 11/089,932

(22) Filed: Mar. 25, 2005

(65) Prior Publication Data

US 2005/0213810 A1    Sep. 29, 2005

(30) Foreign Application Priority Data

Mar. 29, 2004    (JP)    ............................ P2004-094792

(51) Int. Cl.
*G06K 9/00* (2006.01)
*G06K 9/62* (2006.01)

(52) U.S. Cl. ........................ 382/118; 382/159; 700/47; 706/20

(58) Field of Classification Search ................. 382/159, 382/118, 224–228; 700/47, 48; 706/16–25
See application file for complete search history.

(56) References Cited

U.S. PATENT DOCUMENTS

| | | | | |
|---|---|---|---|---|
| 6,144,755 | A * | 11/2000 | Niyogi et al. | 382/118 |
| 6,345,110 | B1 * | 2/2002 | Niyogi et al. | 382/118 |
| 6,996,171 | B1 * | 2/2006 | Walker et al. | 375/240.09 |
| 7,050,607 | B2 * | 5/2006 | Li et al. | 382/118 |
| 7,203,669 | B2 * | 4/2007 | Lienhart et al. | 706/48 |
| 2003/0108244 | A1 * | 6/2003 | Li et al. | 382/227 |
| 2003/0110147 | A1 | 6/2003 | Li et al. | |

OTHER PUBLICATIONS

Pavlovic et al., "Multimodal Speaker Detection Using Error Feedback Dynamic Bayesian Networks", 2000, IEEE Conference on Computer Vision and Pattern Recognition, vol. 2, pp. 34-41.*
Garg et al., "Boosted Learning in Dynamic Bayesian Networks for Multimodal Speaker Detection", Sep. 2003, Proceedings of the IEEE, vol. 91, Issue 9, pp. 1355-1369.*
Li, S., Long, Z., Zhang, Z., Zhang, H.: "Learning to Detect Multi-View Faces in Real Time" Proc. $2^{ND}$ Intl. Conf. on Development and Learning, Jun. 12, 2002, pp. 172-177, XP002366471 p. 172, col. 2, last paragraph—p. 173, col. 1, paragraph 1 p. 173, col. 2, last paragraph—p. 174, col. 1, paragraph 1 p. 174, section 2.3 figures 1,2.

(Continued)

*Primary Examiner*—Aaron W Carter
(74) *Attorney, Agent, or Firm*—Frommer Lawrence & Haug LLP; William S. Frommer; Ellen Marcie Emas

(57) ABSTRACT

In an information processing apparatus, such as a robot that discriminates human faces, nodes are hierarchically arranged in a tree structure. Each of the nodes has a number of weak classifiers. Each terminal node learns face images associated with one label. An upper node learns learning samples of all labels learned by lower nodes. When a window image to be classified is input, discrimination is performed sequentially from upper nodes to lower nodes. When it is determined that the window image does not correspond to a human face, discrimination by lower nodes is not performed, and discrimination proceeds to sibling nodes.

20 Claims, 36 Drawing Sheets

OTHER PUBLICATIONS

Viola P. et al: "Rapid object detection using a boosted cascade of simple features" Proceedings 2001 IEEE Conference on Computer Vision and Pattern Recognition. CVPR 2001. Kauai, Hawaii, Dec. 8-14, 2001, Proceedings of the IEEE Computer Conference on Computer Vision and Pattern Recognition, Los Alamitos, CA, IEEE Comp. Soc, US, vol. vol. 1 of 2, Dec. 8, 2001, pp. 511-518, XP010583787 ISBN: 0-7695-1272-0 p. 512, section 2.1 p. 513, col. 2, paragraph 3 figure 3.

Chang Huang et al: "Omni-directional face detection based on real adaboost" Image Processing, 2004. ICIP '04. 2004 International Conference on Singapore Oct. 24-27, 2004, Piscataway, NJ, USA,IEEE, vol. 1, Oct. 24, 2004, pp. 593-596, XP010784887 ISBN: 0-7803-8554-3 p. 594; figure 2 p. 594, section 4.

Li S. Z. et al.: "FloatBoost Learning and Statistical Face Detection" IEEE Transactions on Pattern Analysis and Machineintelligence, IEEE Service Center, Los Alamitos, CA, US, vol. 26, No. 9, Sep. 1, 2004, pp. 1112-1123, XP011115611 ISSN: 0162-8828.

* cited by examiner

INFORMATION PROCESSING APPARATUS AND METHOD, RECORDING MEDIUM, AND PROGRAM

BACKGROUND OF THE INVENTION

1. Field of the Invention

The present invention relates to information processing apparatuses and methods, recording media, and programs. More specifically, the present invention relates to an information processing apparatus and method, a recording medium, and a program that allow quick detection of an object of interest, such as a face image, by a small amount of computation.

2. Description of the Related Art

Hitherto, various techniques for detecting faces from complex video scenes based only on grayscale patterns of image signals without considering motion have been proposed. For example, a face detector described in United States Unexamined Patent Application Publication No. 2002/0102024 employs AdaBoost, which uses filters, such as Haar-basis filters, as weak classifiers (weak learners). The face detector is capable of quickly calculating weak hypotheses using integral images and rectangle features described later.

FIGS. 1A to 1D are schematic diagrams showing rectangle features described in United States Unexamined Patent Application Publication No. 2002/0102024. As shown in FIGS. 1A to 1D, according to the techniques described in the document, a plurality of filters (weak hypotheses), regarding input images 142A to 142D, calculates the respective sums of luminance values in adjacent rectangular boxes of the same size and outputs the difference between the respective sums of luminance values in the two rectangular boxes. For example, regarding the input image 142A, a filter 154A that subtracts the sum of luminance values in a rectangular box 154A-2, shown as shaded, from the sum of luminance values in a rectangular box 154A-1 is constructed. Such a filter based on two rectangular boxes is referred to as a 2-rectangle feature.

Regarding the input image 142C, a rectangular box is divided into three rectangular boxes 154C-1 to 154C-3, and a filter 154C that subtracts the sum of luminance values in the middle rectangular box 154C-2, shown as shaded, from the sum of luminance values in the rectangular boxes 154C-1 and 154C-3 is constructed. Such a filter based on three rectangular boxes is referred to as a 3-rectangle feature. Regarding the input image 142D, a rectangular box is divided vertically and horizontally into four rectangular boxes 154D-1 to 154D-4, and a filter 154D that subtracts the sum of luminance values in the rectangular boxes 154D-2 and 154D-4, shown as shaded, from the rectangular boxes 154D-1 and 154D-3 is constructed. Such a filter based on four rectangular boxes is referred to as a 4-rectangle feature.

Now, an example of classifying a face image shown in FIG. 2 as a face using a rectangle feature 154B shown in FIG. 1B will be described. The 2-rectangle feature 154B is vertically divided into two rectangular boxes 154B-1 and 154B-2, and the sum of luminance values in the rectangular box 154B-1, shown as shaded, is subtracted from the sum of luminance values in the rectangular box 154B-2. Based on the fact that a region of an eye has a lower luminance value than a region of the cheek, it is possible to estimate at a certain probability whether the input image of a human face (object of interest) 138 corresponds to a face or not (positive or negative) based on an output value of the rectangular feature 154B. This is used as a weak classifier in AdaBoost.

In order to allow detection of face regions of various sizes included in input images, regions of various sizes (hereinafter referred to as search windows) must be cut out to determine whether images correspond to faces. However, for example, in the case of an input image consisting of 320×240 pixels, face regions (search windows) of approximately 50,000 sizes are included, and it takes an extremely long time to perform calculation for all the window sizes. Thus, according to United States Unexamined Patent Application Publication No. 2002/0102024, images referred to as integral images are used. As shown in FIG. 3, an integral image is such an image that a pixel (x, y) 162 in an input image 144 has a value corresponding to the sum of luminance values of pixels in a region that is left above the pixel 162, as expressed in expression (1) below. That is, the value of the pixel 162 is the sum of luminance values of pixels in a region 160 that is left above the pixel 162. Hereinafter, an image having pixel values according to expression (1) below will be referred to as an integral image.

$$I(x, y) = \sum_{x' \leq x, y' \leq y} s(x', y') \tag{1}$$

By using an integral image, it is possible to quickly perform calculation regarding a rectangular box of an arbitrary size. For example, as shown in FIG. 4, regarding an upper left rectangular box 170, a rectangular box 172 that is right to the rectangular box 170, a rectangular box 174 that is below the rectangular box 170, and a rectangular box 176 that is diagonally right below the rectangular box 170, let the four corners of the rectangular box 176 be denoted by p1, p2, p3, and p4 clockwise from the top left corner, and integral images thereof by P1, P2, P3, and P4. P1 corresponds to a sum A of luminance values in the rectangular box 170 (P1=A). P2 corresponds to the sum of the sum A and a sum B of luminance values in the rectangular box 172 (P2=A+B). P3 corresponds to the sum of the sum A and a sum C of luminance values in the rectangular box 174 (P3=A+C). P4 corresponds to the sum of the sums A, B, C and a sum D of luminance values in the rectangular box 176 (P4=A+B+C+D). The sum D of luminance values in the rectangular box 176 can be calculated by P4−(P2+P3)−P1. That is, the sum of luminance values in a rectangular box can be calculated quickly by adding or subtracting pixel values at the four corners of the rectangular box. Usually, an input image is converted into different scales, and search windows having the same size as learning samples used for learning are cut out from the scaled images, allowing detection by search windows of different sizes. However, as described earlier, the amount of computation becomes huge when input images are scaled so that search windows of all sizes can be set. Thus, according to the techniques described in United States Unexamined Patent Application Publication No. 2002/0102024, integral images that allow quick calculation of the sums of luminance values in respective rectangular boxes are used, and the amount of computation is reduced by using rectangle features.

However, the face detector described in United States Unexamined Patent Application Publication No. 2002/0102024 is capable of detecting only objects of sizes that are integer multiples of the sizes of learning samples used for learning. This is because according to the techniques described in the document, instead of changing the size of search window by scaling an input image, an input image is converted into an integral image and face regions in different search windows are detected using the integral image. That is, since the integral image is discrete on a pixel-by-pixel basis, for example, when a window size of 20×20 is used, it is not possible to set a size of 30×30 for a search window, so that it is not possible to detect a face of this window size.

Furthermore, since only differences between luminance values of adjacent rectangular boxes are used as rectangle features in order to increase computation speed, it is not possible to recognize change in luminance between remote rectangular boxes. Thus, the ability of detecting objects is limited.

Although it is possible, for example, by scaling an integral image, to perform searching by a window of an arbitrary size and to use differences between luminance values in remote rectangular boxes, scaling an integral image increases the amount of computation, canceling the effect of increasing computation speed by using the integral image. Furthermore, in order to consider differences between luminance values in remote rectangular boxes, the number of filters needed becomes huge. This also increases the amount of computation.

SUMMARY OF THE INVENTION

The present invention has been made in view of the situation described above, and it is an object thereof to further increase computation speed during learning and detection by reducing the amount of computation when an object of interest is detected based on ensemble learning.

According to an aspect of the present invention, an information processing apparatus is provided. The information processing apparatus includes upper nodes each including a plurality of weak classifiers that learns learning samples with a first label of a first range among learning samples classified with a plurality of labels; first lower nodes each including a plurality of weak classifiers that learns learning samples with a second label of a second range based on results of classification by the upper nodes, the second range being a part of the first range; and second lower nodes each including a plurality of weak classifiers that learns learning samples with a third label of a third range based on the results of classification by the upper nodes, the third range being a part of the first range and different from the second range.

The learning may be sequentially performed from an uppermost node among the upper nodes to a terminal node among the first or second lower nodes, and when the learning reaches the terminal node among the first or second lower nodes, the learning may be performed for other first or second lower nodes that are parallel to the terminal node.

The upper nodes may each have a predetermined number of weak classifiers, and terminal nodes among the first and second lower nodes may each have a number of weak classifiers that is less than or equal to the predetermined number.

Each of the upper nodes and the first and second lower nodes may include a selecting unit for selecting a weak classifier using data weights in each iteration of learning; a cumulative-sum calculating unit for calculating cumulative sums by weighting results of classification of the respective learning samples by weak classifiers that have been selected, the weighting being based on confidences associated with the respective weak classifiers; a reference-value calculating unit for calculating, based on the cumulative sums, a reference value that is used when discrimination is performed using the learned weak classifiers; a weight calculating unit for calculating data weights based on the learning samples; and a reflecting unit for saving the data weights calculated by the weight calculating unit and reflecting the data weights on selection of a weak classifier by the selecting unit in a next iteration of learning.

The weak classifiers may calculate results of classification based on a difference between a threshold and a difference between values of two pixels in image data of the learning samples.

According to another aspect of the present invention, an information processing method is provided. The information processing method includes the steps of learning learning samples with a first label of a first range among learning samples classified with a plurality of labels, by upper nodes each including a plurality of weak classifiers; learning learning samples with a second label of a second range based on results of classification by the upper nodes, the second range being a part of the first range, by first lower nodes each including a plurality of weak classifiers; and learning learning samples with a third label of a third range based on the results of classification by the upper nodes, the third range being a part of the first range and different from the second range, by second lower nodes each including a plurality of weak classifiers.

According to another aspect of the present invention, a recording medium having recorded thereon a computer-readable program is provided. The program includes the steps of learning learning samples with a first label of a first range among learning samples classified with a plurality of labels, by upper nodes each including a plurality of weak classifiers; learning learning samples with a second label of a second range based on results of classification by the upper nodes, the second range being a part of the first range, by first lower nodes each including a plurality of weak classifiers; and learning learning samples with a third label of a third range based on the results of classification by the upper nodes, the third range being a part of the first range and different from the second range, by second lower nodes each including a plurality of weak classifiers.

According to another aspect of the present invention, a program is provided. The program allows a computer to execute the steps of learning learning samples with a first label of a first range among learning samples classified with a plurality of labels, by upper nodes each including a plurality of weak classifiers; learning learning samples with a second label of a second range based on results of classification by the upper nodes, the second range being a part of the first range, by first lower nodes each including a plurality of weak classifiers; and learning learning samples with a third label of a third range based on the results of classification by the upper nodes, the third range being a part of the first range and different from the second range, by second lower nodes each including a plurality of weak classifiers.

According to another aspect of the present invention, an information processing apparatus is provided. The information processing apparatus includes upper nodes each including a plurality of weak classifiers that has learned learning samples with a first label of a first range among learning samples classified with a plurality of labels; first lower nodes each including a plurality of weak classifiers that has learned learning samples with a second label of a second range based on results of classification by the upper nodes, the second range being a part of the first range; and second lower nodes each including a plurality of weak classifiers that has learned learning samples with a third label of a third range based on the results of classification by the upper nodes, the third range being a part of the first range and different from the second range. The first and second lower nodes performs discrimination of input signals based on the results of classification by the upper nodes, and discrimination is performed on a node-by-node basis sequentially from an uppermost node among the upper nodes to a terminal node among the first or second lower nodes, and when the discrimination reaches the terminal node among the first or second lower nodes, the discrimination is performed for other first or second lower nodes that are parallel to the terminal node.

The weak classifiers may calculate results of classification based on a difference between a threshold and a difference between values of two pixels in image data of the learning samples.

According to another aspect of the present invention, an information processing method for an information processing apparatus is provided. The information processing apparatus includes upper nodes each including a plurality of weak classifiers that has learned learning samples with a first label of a first range among learning samples classified with a plurality of labels; first lower nodes each including a plurality of weak classifiers that has learned learning samples with a second label of a second range based on results of classification by the upper nodes, the second range being a part of the first range; and second lower nodes each including a plurality of weak classifiers that has learned learning samples with a third label of a third range based on the results of classification by the upper nodes, the third range being a part of the first range and different from the second range. The information processing method includes the steps of discriminating input signals by the lower nodes based on the results of classification by the upper nodes; and performing discrimination on a node-by-node basis sequentially from an uppermost node among the upper nodes to a terminal node among the first or second lower nodes, and performing discrimination for other first or second lower nodes that are parallel to the terminal node when the discrimination reaches the terminal node among the first or second lower nodes.

According to another aspect of the present invention, a recording medium having recorded thereon a program for an information processing apparatus is provided. The information processing apparatus includes upper nodes each including a plurality of weak classifiers that has learned learning samples with a first label of a first range among learning samples classified with a plurality of labels; first lower nodes each including a plurality of weak classifiers that has learned learning samples with a second label of a second range based on results of classification by the upper nodes, the second range being a part of the first range; and second lower nodes each including a plurality of weak classifiers that has learned learning samples with a third label of a third range based on the results of classification by the upper nodes, the third range being a part of the first range and different from the second range. The program includes the steps of discriminating input signals by the lower nodes based on the results of classification by the upper nodes; and performing discrimination on a node-by-node basis sequentially from an uppermost node among the upper nodes to a terminal node among the first or second lower nodes, and performing discrimination for other first or second lower nodes that are parallel to the terminal node when the discrimination reaches the terminal node among the first or second lower nodes.

According to another aspect of the present invention, a program for an information processing apparatus is provided. The information processing apparatus includes upper nodes each including a plurality of weak classifiers that has learned learning samples with a first label of a first range among learning samples classified with a plurality of labels; first lower nodes each including a plurality of weak classifiers that has learned learning samples with a second label of a second range based on results of classification by the upper nodes, the second range being a part of the first range; and second lower nodes each including a plurality of weak classifiers that has learned learning samples with a third label of a third range based on the results of classification by the upper nodes, the third range being a part of the first range and different from the second range. The program allows a computer to execute the steps of discriminating input signals by the lower nodes based on the results of classification by the upper nodes; and performing discrimination on a node-by-node basis sequentially from an uppermost node among the upper nodes to a terminal node among the first or second lower nodes, and performing discrimination for other first or second lower nodes that are parallel to the terminal node when the discrimination reaches the terminal node among the first or second lower nodes.

According to the present invention, learning samples with a first label of a first range are learned by upper nodes. Based on results of classification by the upper nodes, learning samples with a second label of a second range are learned by first lower nodes, the second range being a part of the first range, and learning samples with a third label of a third range are learned by second lower nodes, the third range being a part of the first range and different from the second range.

Furthermore, according to the present invention, input signals are discriminated by the lower nodes based on the results of classification by the upper nodes. Discrimination is performed on a node-by-node basis sequentially from an uppermost node among the upper nodes to a terminal node among the first or second lower nodes, and discrimination is performed for other first or second lower nodes that are parallel to the terminal node when the discrimination reaches the terminal node among the first or second lower nodes.

According to the present invention, it is possible to detect faces in real time. Particularly, the speed of learning and/or detection can be increased by reducing the amount of computation.

DESCRIPTION OF THE PREFERRED EMBODIMENTS

Figure 24:
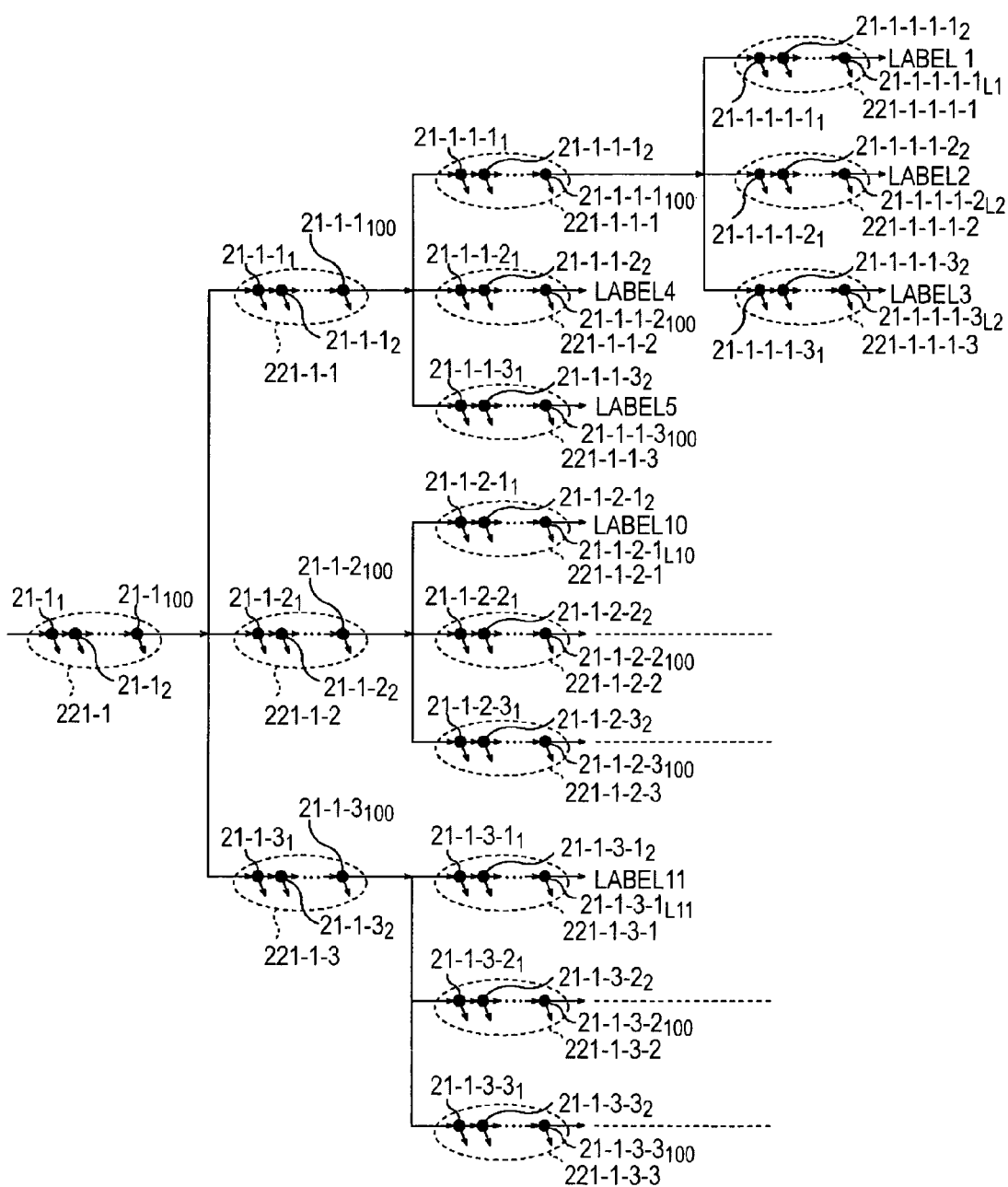
FIG. 24 is a diagram for explaining a tree structure of nodes constructed of weak classifiers with rejection checking.

An information processing apparatus (e.g., an object detecting apparatus 5 shown in FIG. 5) according to the present invention includes upper nodes (e.g., a node 221-1 shown in FIG. 24) each including a plurality of weak classifiers (e.g., weak classifiers $21\text{-}1_1$ to $21\text{-}1_{100}$ shown in FIG. 24) that learns learning samples with a first label (e.g., labels 1 to 15 shown in FIG. 17) of a first range among learning samples classified with a plurality of labels (e.g., labels 1 to 15 shown in FIG. 17); first lower nodes (e.g., a node 221-1-1 shown in FIG. 24) each including a plurality of weak classifiers (e.g., weak classifiers $21\text{-}1\text{-}1_1$ to $21\text{-}1\text{-}1_{100}$) that learns learning samples with a second label (e.g., labels 1 to 5 shown in FIG. 17) of a second range based on results of classification by the upper nodes (e.g., the node 221-1 shown in FIG. 24), the second range being a part of the first range; and second lower nodes (e.g., a node 221-1-2 shown in FIG. 24) each including a plurality of weak classifiers (e.g., weak classifiers $21\text{-}1\text{-}2_1$ to $21\text{-}1\text{-}2_{100}$) that learns learning samples with a third label (e.g., labels 6, 8, 10, 12, and 14 shown in FIG. 17) of a third range based on the results of classification by the upper nodes (e.g., the node 221-1 shown in FIG. 24), the third range being a part of the first range and different from the second range.

The learning may be sequentially performed from an uppermost node (e.g., the node 221-1 shown in FIG. 25) among the upper nodes to a terminal node (e.g., a node 221-1-1-1-1 shown in FIG. 25) among the first or second lower nodes, and when the learning reaches the terminal node among the first or second lower nodes, the learning may be performed for other first or second lower nodes (e.g., a node 221-1-1-1-2 shown in FIG. 25, which is a sibling node) that are parallel to the terminal node.

The upper nodes (e.g., a node 221-1-1 shown in FIG. 24) may each have a predetermined number (e.g., 100) of weak classifiers, and terminal nodes among the first and second lower nodes may each have a number (e.g., 100 or L1 shown in FIG. 24) of weak classifiers that is less than or equal to the predetermined number.

Each of the upper nodes and the first and second lower nodes may include a selecting unit (e.g., a weak-classifier selector 333 shown in FIG. 29) for selecting a weak classifier using data weights (e.g., weights $D_t$ according to expression (11)) in each iteration of learning; a cumulative-sum calculating unit (e.g., a weighted-majority calculator 336 shown in FIG. 29) for calculating cumulative sums (e.g., $F(x)$ according to expression (7)) by weighting results (e.g., $f(x)$) of classification of the respective learning samples by weak classifiers that have been selected, the weighting being based on confidences (e.g., weights $\alpha_t$ according to expression (10)) associated with the respective weak classifiers; a reference-value calculating unit (e.g., a threshold calculator 337 shown in FIG. 29) for calculating, based on the cumulative sums, a reference value (e.g., a termination threshold $R_M$ according to expression (8)) that is used when discrimination is performed using the learned weak classifiers; a weight calculating unit (e.g., a data-weight updater 335 shown in FIG. 29) for calculating data weights based on the learning samples; and a reflecting unit (e.g., a saver 339 shown in FIG. 29) for saving the data weights calculated by the weight calculating unit and reflecting the data weights on selection of a weak classifier by the selecting unit in a next iteration of learning.

Figure 32:
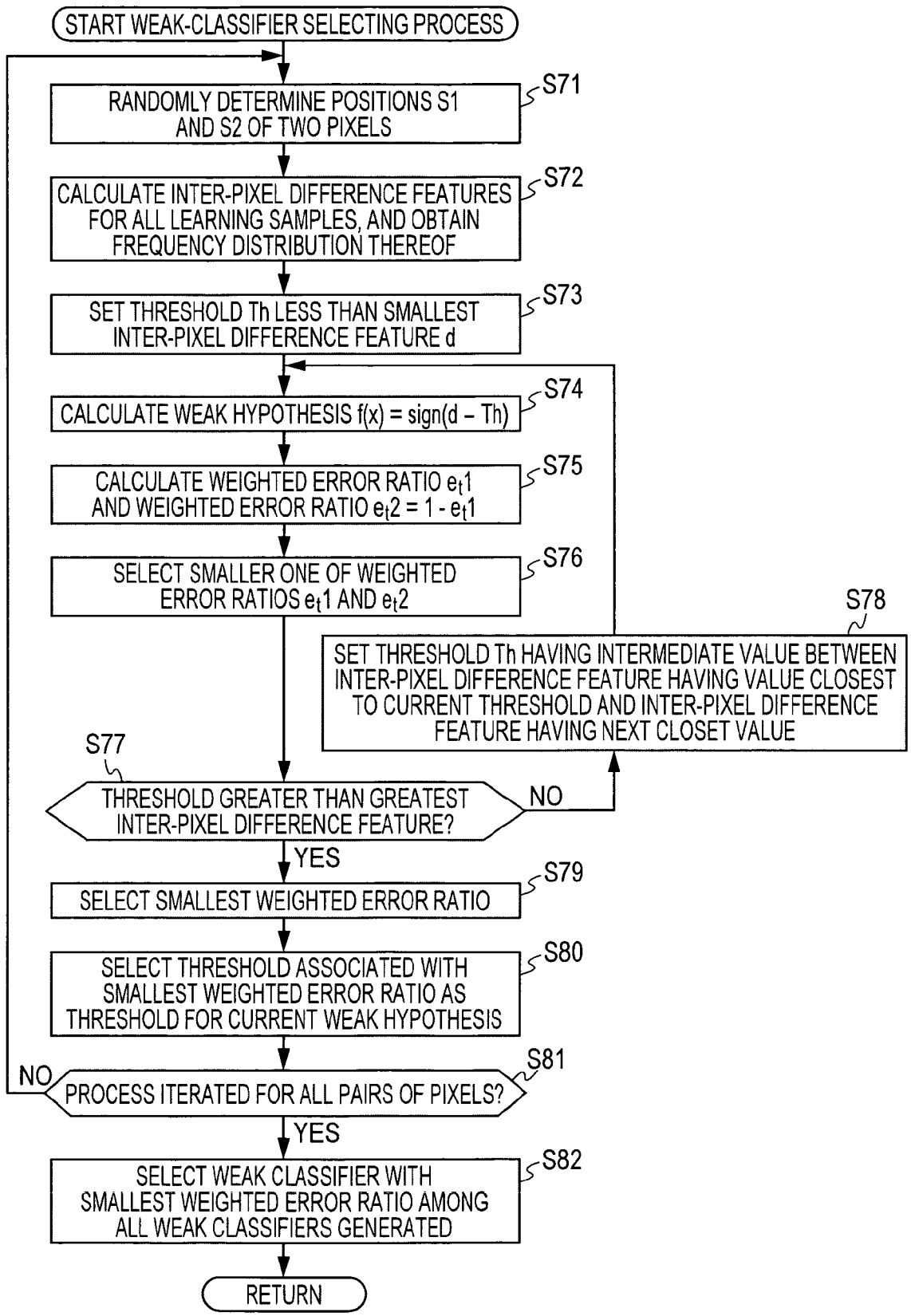
FIG. 32 is a flowchart of a weak-classifier selecting process in step S43 shown in FIG. 30.

The weak classifiers may calculate results (e.g., a weak hypothesis $f(x)$ in step S74 shown in FIG. 32) of classification based on a difference between a threshold (e.g., a threshold Th for a weak hypothesis $f(x)$ in step S74 shown in FIG. 32) and a difference (e.g., an inter-pixel difference feature d according to expression (2)) between values (e.g., $I_1$ and $I_2$) of two pixels in image data of the learning samples.

An information processing method according to the present invention includes the steps of learning learning samples with a first label (e.g., labels 1 to 15 shown in FIG. 17) of a first range among learning samples classified with a plurality of labels (e.g., labels 1 to 15 shown in FIG. 17), by upper nodes (e.g., a node 221-1 shown in FIG. 24) each including a plurality of weak classifiers (e.g., weak classifiers $21\text{-}1_1$ to $21\text{-}1_{100}$ shown in FIG. 24); learning learning samples with a second label (e.g., labels 1 to 5 shown in FIG. 17) of a second range based on results of classification by the upper nodes (e.g., a node 221-1 shown in FIG. 24), the second range being a part of the first range, by first lower nodes (e.g., a node 211-1-1 shown in FIG. 24) each including a plurality of weak classifiers (e.g., weak classifiers $21\text{-}1\text{-}1_1$ to $21\text{-}1\text{-}1_{100}$ shown in FIG. 24); and learning learning samples with a third label (e.g., labels 6, 8, 10, 12, and 12 shown in FIG. 18) of a third range based on the results of classification by the upper nodes (e.g., a node 221-1 shown in FIG. 24), the third range being a part of the first range and different from the second range, by second lower nodes (e.g., a node 211-1-2 shown in FIG. 24)

each including a plurality of weak classifiers (e.g., weak classifiers $21\text{-}1\text{-}2_1$ to $21\text{-}1\text{-}2_{100}$ shown in FIG. 24).

Another information processing apparatus (e.g., an object detecting apparatus 1 shown in FIG. 5) according to the present invention includes upper nodes (e.g., a node 221-1 shown in FIG. 24) each including a plurality of weak classifiers (e.g., weak classifiers $21\text{-}1_1$ to $21\text{-}1_{100}$ shown in FIG. 24) that has learned learning samples with a first label (e.g., labels 1 to 15 shown in FIG. 17) of a first range among learning samples classified with a plurality of labels (e.g., labels 1 to 15 shown in FIG. 17); first lower nodes (e.g., a node 221-1-1 shown in FIG. 24) each including a plurality of weak classifiers (e.g., weak classifiers $21\text{-}1\text{-}1_1$ to $21\text{-}1\text{-}1_{100}$ shown in FIG. 24) that has learned learning samples with a second label (e.g., labels 1 to 5 shown in FIG. 17) of a second range based on results of classification by the upper nodes (e.g., a node 221-1 shown in FIG. 24), the second range being a part of the first range; and second lower nodes (e.g., a node 221-1-2 shown in FIG. 24) each including a plurality of weak classifiers (e.g., weak classifiers $21\text{-}1\text{-}2_1$ to $21\text{-}1\text{-}2_{100}$ shown in FIG. 24) that has learned learning samples with a third label (e.g., labels 6, 8, 10, 12, and 12 shown in FIG. 17) of a third range based on the results of classification by the upper nodes (e.g., a node 221-1 shown in FIG. 24), the third range being a part of the first range and different from the second range. The first and second lower nodes (e.g., nodes 221-1-1 and 221-1-2 shown in FIG. 24) perform discrimination (e.g., step S132 shown in FIG. 36) of input signals based on the results of classification by the upper nodes (e.g., a node 221-1 shown in FIG. 24), and discrimination is performed on a node-by-node basis sequentially from an uppermost node (e.g., a node 221-1 shown in FIG. 24) among the upper nodes to a terminal node (e.g., a node 221-1-1-1-1 shown in FIG. 24) among the first or second lower nodes, and when the discrimination reaches the terminal node among the first or second lower nodes, the discrimination is performed for other first or second lower nodes (e.g., a node 221-1-1-1-2 shown in FIG. 24, which is a sibling node) that are parallel to the terminal node (e.g., steps S132 to S136 after step S138 shown in FIG. 36).

In an information processing method according to the present invention for an information processing apparatus, the information processing apparatus includes upper nodes each including a plurality of weak classifiers that has learned learning samples with a first label of a first range among learning samples classified with a plurality of labels; first lower nodes each including a plurality of weak classifiers that has learned learning samples with a second label of a second range based on results of classification by the upper nodes, the second range being a part of the first range; and second lower nodes each including a plurality of weak classifiers that has learned learning samples with a third label of a third range based on the results of classification by the upper nodes, the third range being a part of the first range and different from the second range. The information processing method includes the steps of discriminating input signals by the lower nodes based on the results of classification by the upper nodes (e.g., step S132 shown in FIG. 36); and performing discrimination on a node-by-node basis sequentially from an uppermost node among the upper nodes to a terminal node among the first or second lower nodes, and performing discrimination for other first or second lower nodes that are parallel to the terminal node when the discrimination reaches the terminal node among the first or second lower nodes (e.g., steps S132 to S136 after step S138 shown in FIG. 36).

Now, an embodiment of the present invention will be described in detail with reference to the drawings. In this embodiment, the present invention is applied to an information processing apparatus that functions as an object detecting apparatus for detecting an object of interest from an image through ensemble learning.

A learning machine that is obtained by ensemble learning is composed of a large number of weak hypotheses and a combiner for combining the weak hypotheses. An example of combiner that combines outputs of weak hypotheses with fixed weights irrespective of input is boosting. In boosting, using results of learning of previously generated weak hypotheses, the distribution of learning samples is modified so that weights of misclassified learning samples (examples) are increased, and learning of new weak hypotheses is performed based on the modified distribution. Thus, weights for objects that are difficult to learn to classify relatively increase, so that weak classifiers that lean to correctly classify learning samples with high weights, which are difficult to learn to classify, are progressively selected. In this case, weak hypotheses for learning are progressively generated, and weak hypotheses generated later depend on previously generated weak hypotheses.

When detecting an object of interest, results of classification by a large number of hypotheses progressively generated by learning as described above are used. For example, in the case of AdaBoost, all the results of classification (1 for objects of interest and −1 for objects not of interest) by the weak hypothesis (hereinafter referred to as weak classifiers) generated by learning are fed to a combiner. The combiner calculates the sum of the classification results weighted by confidences calculated during learning for the respectively associated weak classifiers to output a value of weighted majority, and determines whether the input image corresponds to an object of interest by evaluating the output of the combiner.

The weak classifiers determine whether an image corresponds to an object of interest based on certain features. As will be described later, the weak classifiers may output deterministic values as to whether an image corresponds to an object of interest, or probabilistic values representing the likelihood of being an object of interest. An ensemble learning machine in this embodiment uses weak classifiers that determine whether an image corresponds to an object of interest using very simple features, i.e., differences between luminance values of pairs of pixels (hereinafter referred to as inter-pixel difference features), allowing quick detection of an object of interest.

(1) Object Detecting Apparatus

Figure 5:
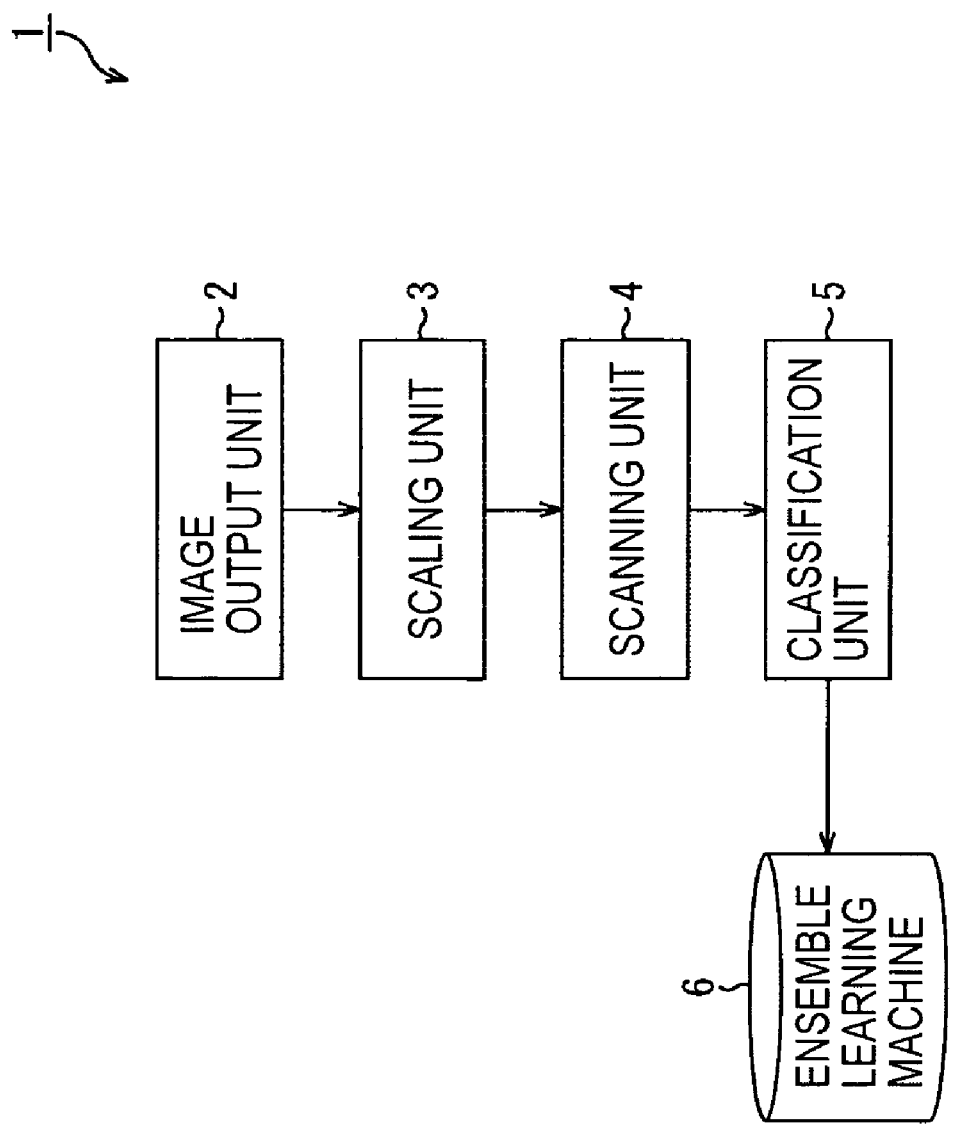
FIG. 5 is a functional block diagram showing processing functions of an object detecting apparatus according to an embodiment of the present invention.

FIG. 5 is a functional block diagram showing processing functions of an object detecting apparatus according to this embodiment. As shown in FIG. 5, an object detecting apparatus 1 includes an image output unit 2 for outputting a grayscale image (luminance image) as an input image to a scaling unit 3, the scaling unit 3 for scaling, i.e., enlarging or reducing, the input image, a scanning unit 4 for sequentially scanning the scaled input image, for example, from top left to bottom right, using a window having a specified size, outputting an image in the window as a window image, and a classification unit 5 for classifying whether each window image obtained by sequential scanning by the scanning unit 4 corresponds to an object of interest or not. The object detecting apparatus 1 outputs a position and size of an object of interest, indicating a region of the object of interest in the input image.

The scaling unit 3 enlarges or reduces the input image to each specified scale to output scaled images. The scanning unit 4 sequentially scans each of the scaled images using a window of a size corresponding to the size of an object to be detected, thereby cutting out window images. The classification unit 5 classifies whether each of the window images corresponds to a face.

The classification unit 5, with reference to results of learning by an ensemble learning machine 6 that performs ensemble learning of a plurality of weak classifiers constituting the classification unit 5, classifies whether a current window image corresponds to an object of interest (e.g., an image of a face) or an object not of interest (e.g., an image that is not an image of a face).

The object detecting apparatus 1, when a plurality of objects is detected from the input image, outputs a plurality of pieces of region information. Furthermore, when some of the regions overlap each other among the plurality of regions, the object detecting apparatus 1 is capable of selecting one of the regions having the highest evaluation for the object of interest by a method described later.

The grayscale image output from the image output unit 2 is first input to the scaling unit 3. The scaling unit 3 reduces the image by bilinear interpolation. In this embodiment, instead of first generating a plurality of reduced images in the scaling unit 3, the scaling unit 3 repeats a process of outputting an image needed to the scanning unit 4 and generating a further reduced image only after processing of the previous image has been finished.

Figure 6:
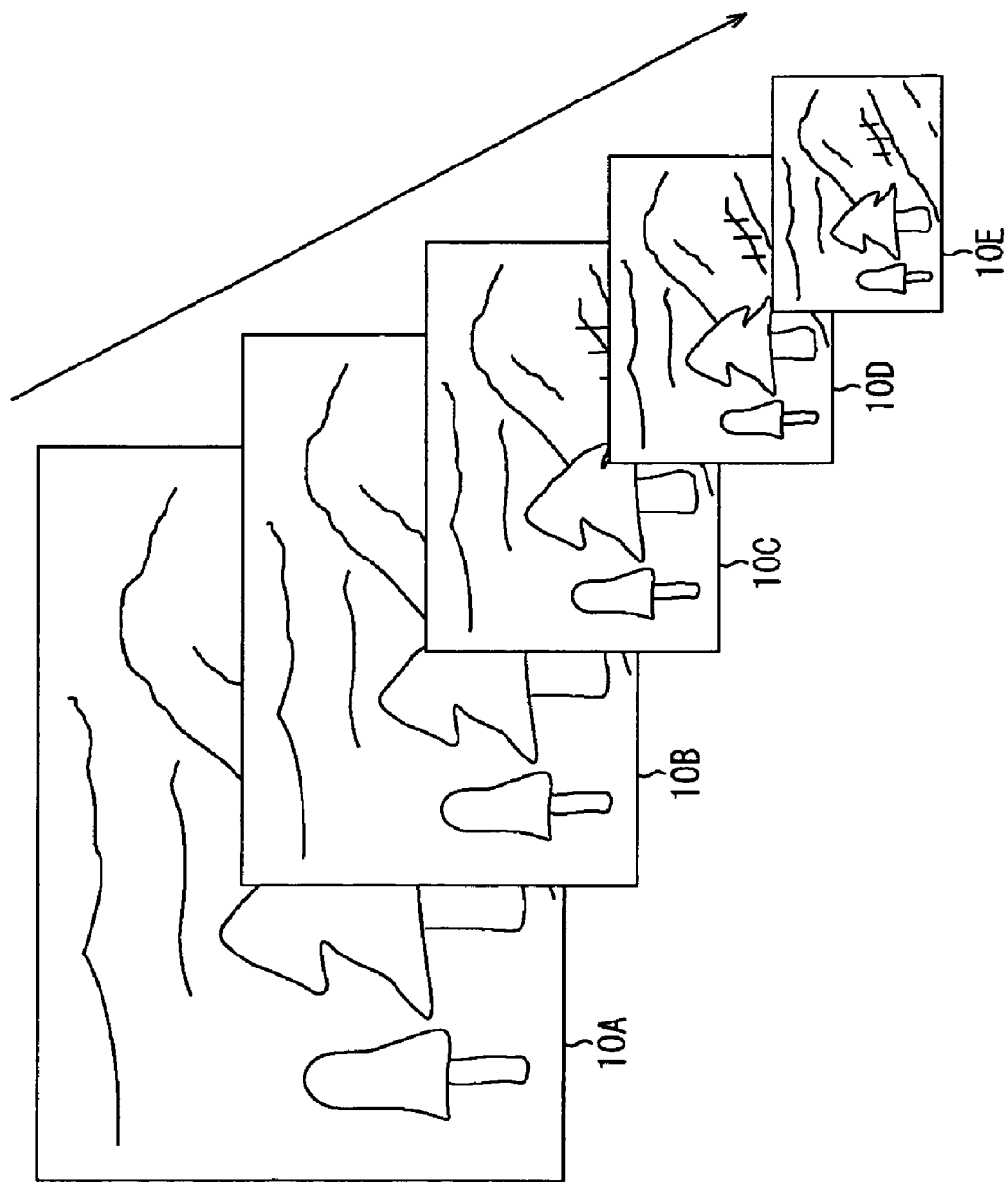
FIG. 6 is a diagram for explaining scale conversion.

That is, as shown in FIG. 6, the scaling unit 3 first outputs an input image 10A as it is to the scanning unit 4. Then, after processing of the input image 10A by the scanning unit 4 and the classification unit 5 is finished, the scaling unit 3 generates an input image 10B by reducing the size of the input image 10A. Furthermore, after processing of the input image 10B by the scanning unit 4 and the classification unit 5 is finished, the scaling unit 3 generates an input image 10C by further reducing the size of the input image 10B. Similarly, the scaling unit 3 progressively generates reduced images 10D, 10E, and so forth of increasingly reduced sizes until the size of a reduced image becomes smaller than the size of the window being used for scanning by the scanning unit 4. When the process is finished, the image output unit 2 outputs a next input image to the scaling unit 3.

Figure 7:
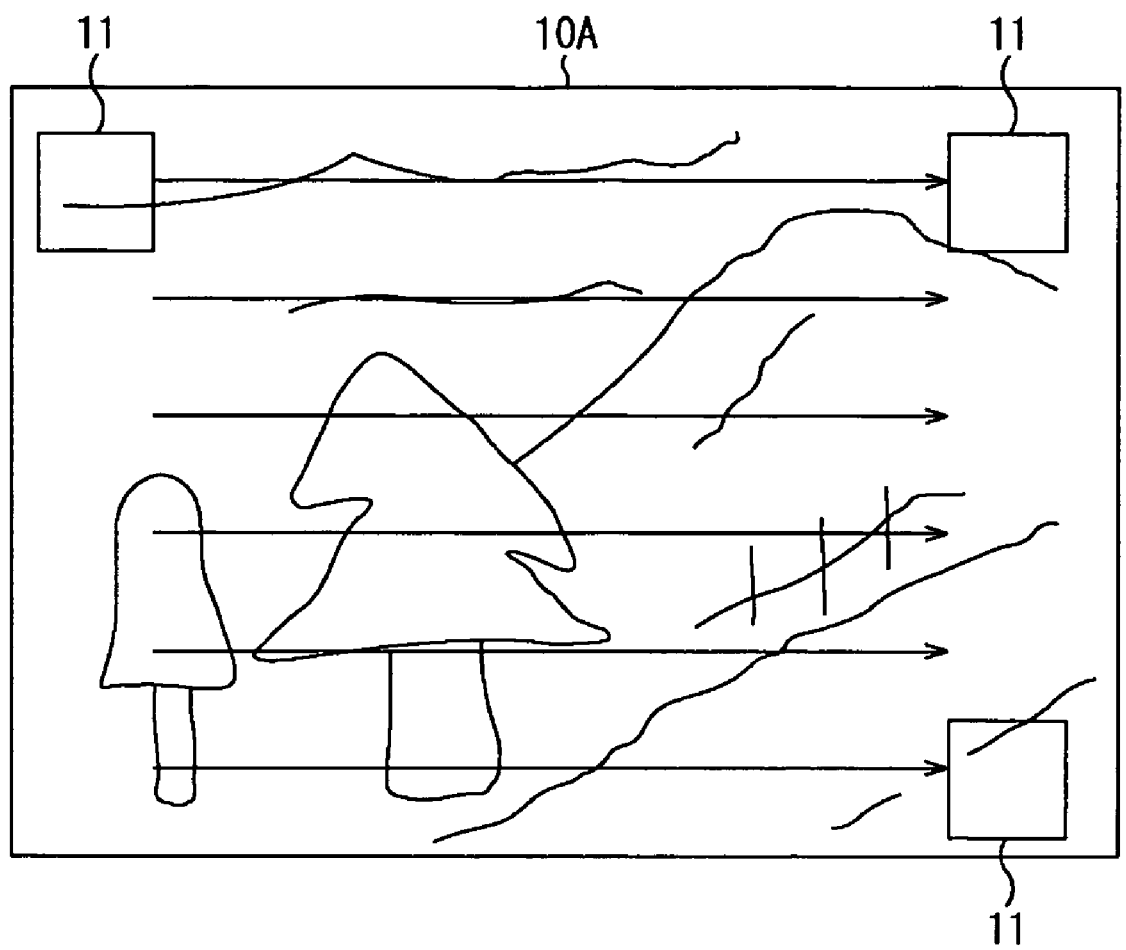
FIG. 7 is a diagram for explaining scanning using a search window.

As shown in FIG. 7, the scanning unit 4, for example, when the image 10A is fed thereto, sequentially applies to the entire image a window 11 having the same size as a window size accepted by the classification unit 5 at the downstream thereof, outputting an image in the window 11 at each position (hereinafter referred to as a cutout image or a window image) to the classification unit 5.

Figure 8:
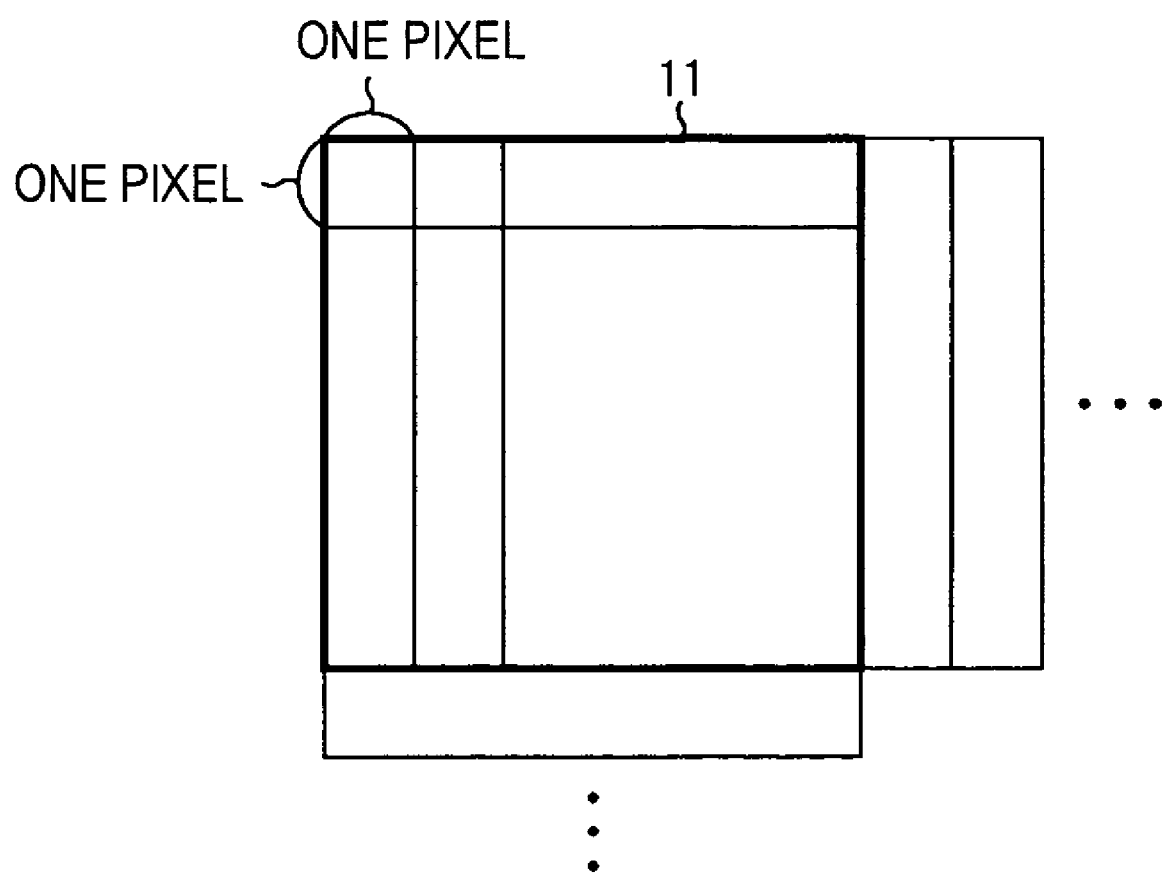
FIG. 8 is a diagram for explaining movement of a search window.

Scanning based on the window 11 is carried out on a pixel-by-pixel basis, as shown in FIG. 8. That is, after a cutout image in the window 11 at a given position is output from the scanning unit 4, the window 11 is shifted rightward by one pixel for a next scan so that a cutout image in the window 11 at the shifted position is fed to the classification unit 5.

Although the window size is fixed, since the scaling unit 3 progressively reduces the size of the input image to various scales as described earlier, it is possible to detect an object of an arbitrary size.

That is, whatever the size of a face in an input image, the size of the face in the image eventually becomes substantially the same as the window size S as the image size is increasingly reduced. Thus, it is possible to detect whether the image in the window 11 is an image of a human face or not.

Figure 9:
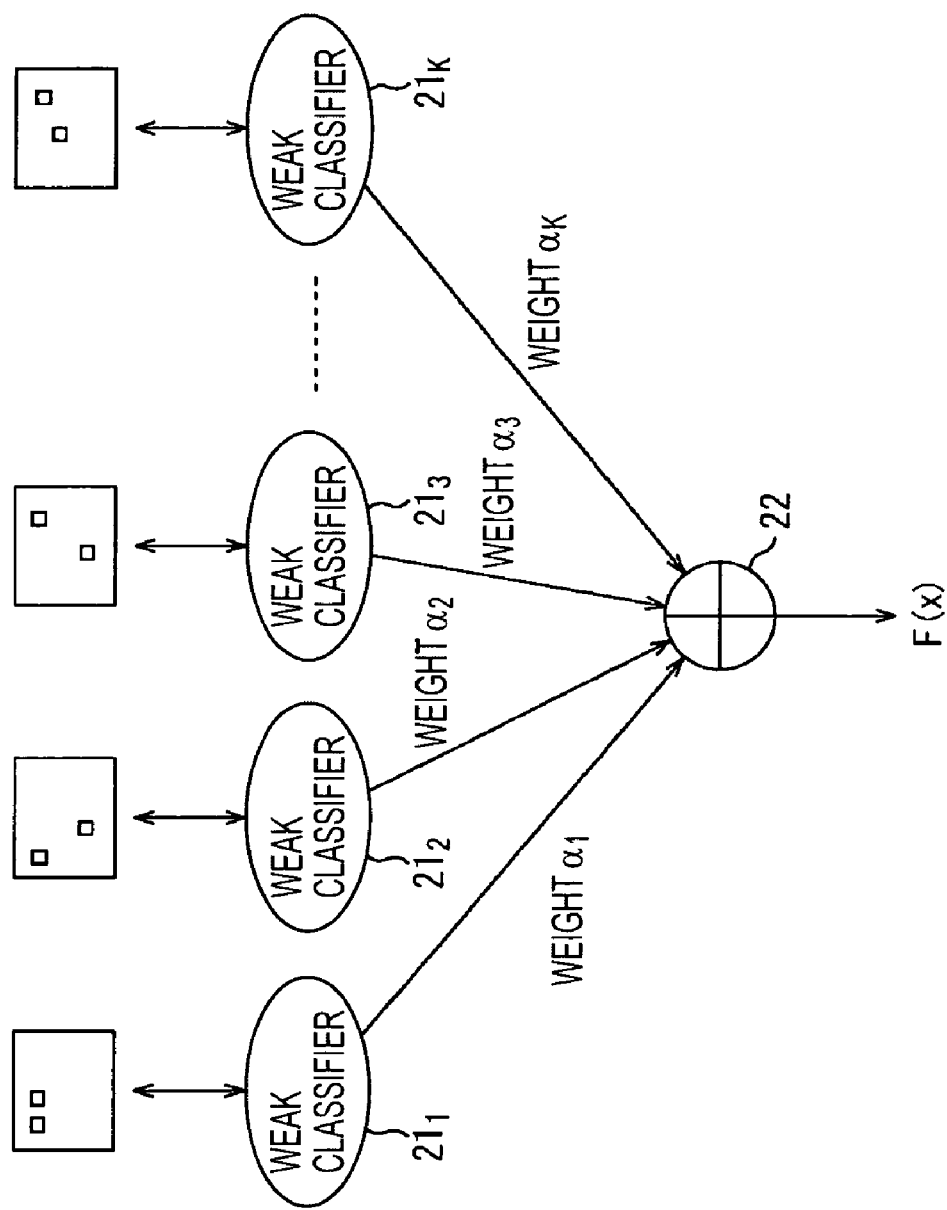
FIG. 9 is a diagram showing the construction of a classification unit.

The classification unit 5 classifies whether a cutout image fed from the upstream corresponds to an object of interest, e.g., a face. As shown in FIG. 9, the classification unit 5 is composed of a plurality of weak classifiers $21_i$ (i=1, 2, 3, ..., K) obtained by ensemble learning, and an adder 22 for calculating a value F(x) of weighted majority by multiplying outputs (classification results) of the respective classifiers $21_i$ with respectively associated weights $\alpha_i$ (i=1, 2, 3, ..., K).

Each of the weak classifiers $21_1$ to $21_K$ determines whether the image in the window 11 is an image of a human face based on two arbitrary pixels among the pixels in the window 11. K denotes the number of possible pairs of two pixels that can be chosen from the image in the window 11.

In the classification unit 5, the weak classifiers $21_i$ sequentially output estimation values f(x) as to whether the input window image corresponds to an object of interest, and the adder 22 calculates a value F(x) of weighted majority to yield an output. Based on the value F(x) of weighted majority, a determiner (not shown in FIG. 9) determines whether the window image corresponds to an object of interest.

The ensemble learning machine 6 learns in advance the weak learners $21_i$ and weights to be used to multiply outputs (estimation values) of the respective weak learners $21_i$, by ensemble learning described later. Ensemble learning may be performed by any method that allows majority calculation of results obtained by a plurality of classifiers. For example, ensemble learning based on boosting, such as AdaBoost, which weights data to calculate a value of weighted majority, may be used.

Each of the weak classifiers $21_i$ constituting the classification unit 5 uses the difference between luminance value of two pixels (an inter-pixel difference feature) as a feature for classification. Each of the weak classifiers $21_i$ compares a feature learned from learning samples including a plurality of grayscale images that are labeled in advance as to whether the image corresponds to an object of interest or not with a feature of the window image, deterministically or probabilistically outputting an estimation value as to whether the window image corresponds to an object or not.

The adder 22 multiplies estimation values obtained by the weak classifiers $21_i$ by weights that serve as confidences of the respective weak classifiers $21_i$, and outputs the sum of the results (a value of weighted majority). In the case of AdaBoost, the plurality of weak classifiers $21_i$ sequentially calculates estimation values, and a value of weighted majority is progressively updated accordingly. The plurality of weak classifiers is progressively generated by ensemble learning by the ensemble learning machine 6 according to an algorithm described later using learning samples, and the weak classifiers calculate estimation values, for example, in the order of generation. The weights (confidences) used for weighted majority are learned in a learning process for generating weak classifiers, which will be described later.

Each of the weak classifiers $21_i$, when it generates a binary output as in the case of AdaBoost, classifies an inter-pixel difference feature into two classes on the basis of a threshold for classification as to whether the image corresponds to an object of interest. Alternatively, classification may be based on a plurality of thresholds. The weak classifiers may probabilistically output continuous values representing the likelihood indicating whether the image corresponds to an object of interest based on the inter-pixel difference feature. Features (thresholds) needed by the weak classifier $21_i$ for classification are also learned during learning according to the algorithm described above.

Furthermore, in this embodiment, at the time of calculating a value of weighted majority, without waiting for results of calculation by all the weak classifiers, calculation can be terminated even in the course of calculation when it is considered that the image does not correspond to an object of interest depending on the value calculated. For this purpose, a termination threshold (reference value) is learned in the learning process. By terminating calculation, the amount of computation for detection can be considerably reduced. Thus, it is possible to enter a process of classifying a next window image in the course of calculation without waiting for results of calculation by all the weak classifiers, allowing quick processing.

As described above, the classification unit 5 functions as a determiner for calculating a value of weighted majority as an evaluation value for determining whether a window image corresponds to an object of interest based on the evaluation value. Furthermore, each time one of the plurality of weak classifiers generated by learning in advance outputs an estimation value, the classification unit 5 updates the value of weighted majority obtained by multiplying evaluation values by weights for the respective weak classifiers obtained by learning and summing the results of multiplication. The classification unit 5 also controls whether to terminate calculation of estimation values on the basis of the termination threshold each time updating the value of weighted majority (evaluation value).

The classification unit 5 is generated by ensemble learning by the ensemble learning machine 6 according to a predetermined algorithm using learning samples. Now, description will first be directed to a method of ensemble learning by the ensemble learning machine 6, and then to a method of classifying an object in an input image using the classification unit 5 obtained by ensemble learning.

(2) Ensemble Learning Machine

The ensemble learning machine 6 performs ensemble learning according to a boosting algorithm using a plurality of weak classifiers as described above so that a strong classification can be obtained as a result. Although each of the weak classifiers is constructed very simply, having low ability of classifying face and non-face by itself, high ability of classification can be achieved by combining, for example, on the order of hundreds to thousands of weak classifiers. The ensemble learning machine generates weak classifiers using, for example, on the order of thousands of learning samples labeled in advance (i.e., correct classifications are assigned) including sample images of objects of interest and objects not of interest, e.g., face images and non-face images, by selecting (learning) a hypothesis according to a predetermined learning algorithm from a large number of learning models (combinations of hypotheses), determining a combination of weak classifiers. Although each of the weak classifiers has low classification ability by itself, a classifier having high classification ability can be obtained depending on selection and combination of weak classifiers. Thus, the ensemble learning machine 6 learns a combination of weak classifiers, i.e., selection of weak classifiers and weights on output values of the respective weak classifiers for calculating a value of weighted majority.

Next, a learning method used by the ensemble learning machine 6 to obtain an appropriate combination of a large number of classifiers according to a learning algorithm will be described. Before describing the learning method of the ensemble learning machine 6, leaning data that serves as features in this embodiment among learning data learned by ensemble learning, more specifically, inter-pixel difference features for constructing weak classifiers and a termination threshold (reference value) for terminating detection during a classification process (detection process) will be described.

(3) Construction of Weak Classifiers

The classification unit 5 in this embodiment is constructed of a plurality of weak classifiers. Each of the weak classifiers is constructed very simply so as to determine whether an input image corresponds to a face based on the difference between luminance values of two pixels selected from all the pixels in the input image (an inter-pixel difference feature). Thus, in a classification process, the weak classifiers calculate results of classification quickly. Images input to the weak classifiers in the learning process are learning samples, and images input to the weak classifiers in the classification process (discrimination process) are window images cut out from scaled images.

Figure 10:
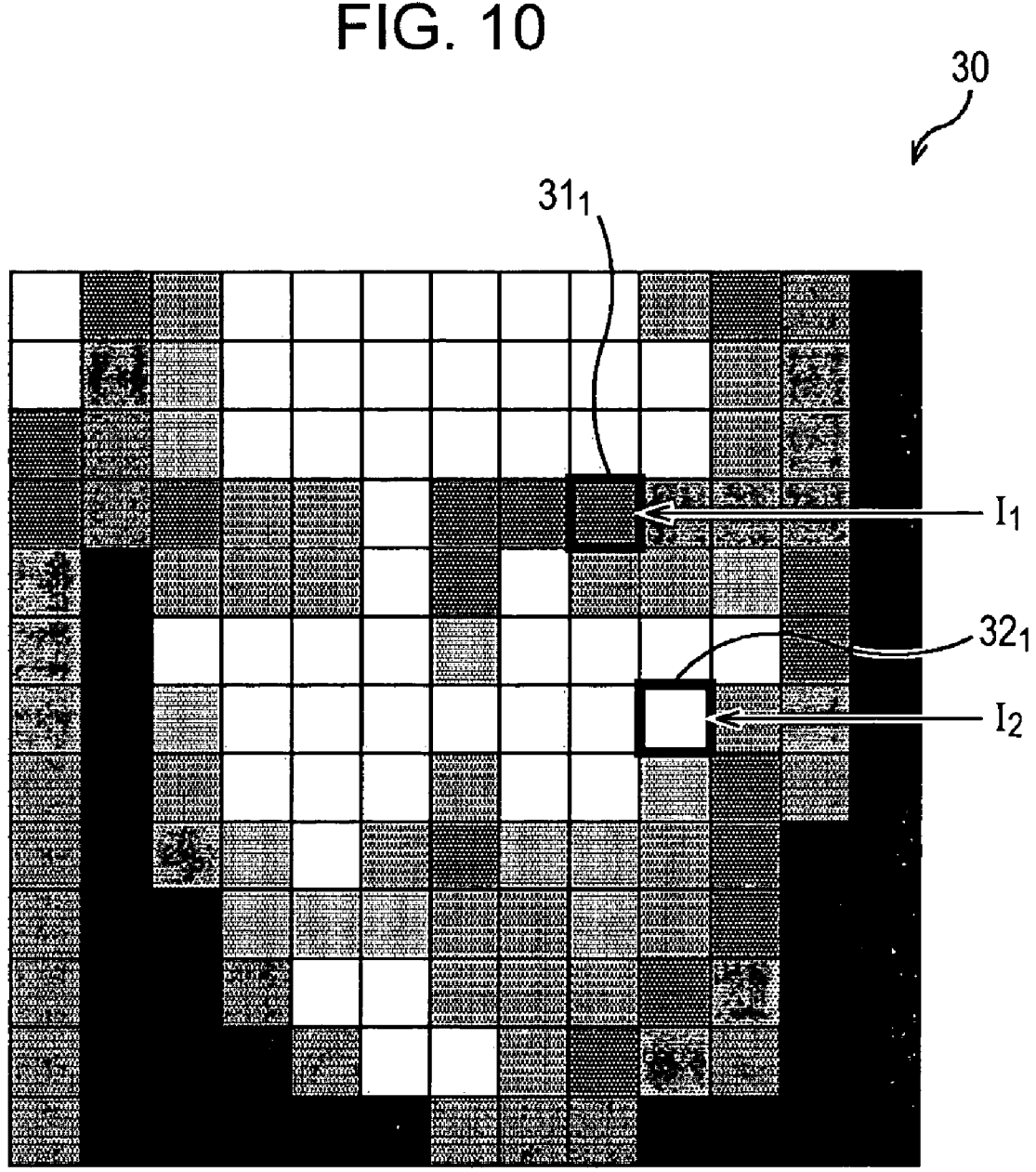
FIG. 10 is a diagram for explaining an inter-pixel difference feature.

FIG. 10 is a schematic diagram showing an image for explaining an inter-pixel difference feature. In an image 30, the difference between luminance values of arbitrarily chosen two pixels, e.g., the difference between a luminance value $I_1$ of a pixel 31 and a luminance value $I_2$ of a pixel 32, i.e., a value d expressed by expression (2) below, is defined as the inter-pixel difference feature:

$$d = I_1 - I_2 \quad (2)$$

The ability of each of the weak classifiers depends on which inter-pixel difference feature d is used for face detection. Thus, a pair of pixels used by each of the weak classifiers must be selected from combinations of arbitrary two pixels included in a sample image or a window image (referred to as a filter or a weak hypothesis).

For example, AdaBoost requires each weak classifier a deterministic output of "+1" (i.e., an object of interest) or "−1" (i.e., an object not of interest). Thus, in the case of AdaBoost, a weak classifier can be constructed by classifying an inter-pixel difference feature d of a pair of pixels at arbitrary positions into two classes (+1 and −1) using one or more thresholds.

In the case of a boosting algorithm that outputs continuous values (real values) representing the probability distribution of learning samples instead of outputting binary values, such as Real-AdaBoost or GentleBoost, a weak classifier outputs a likelihood (probability) of an input image corresponding to an object of interest. As described above, the output of a weak classifier may be either deterministic or probabilistic. Now, these two types of weak classifiers will be described.

(3-1) Binary-Output Weak Classifiers

A weak classifier that generates a deterministic output performs two-class classification as to whether an image corresponds to an object of interest based on the value of an inter-pixel difference feature d. Let the luminance values of two pixels in a target image region be denoted by $I_1$ and $I_2$, and a threshold for classifying the target image region as an object of interest or not based on the inter-pixel difference feature d by $Th_1$. Then, the class that the target image region belongs to can be determined according to whether expression (3) below is satisfied:

$$I_1 - I_2 > Th_1 \quad (3)$$

In order to construct a weak classifier, positions of two pixels and a threshold must be determined. A method for this purpose will be described later. Expression (3) above is used in a case of the simplest threshold check. Alternatively, threshold check may be based on two thresholds as expressed in expression (4) or expression (5) below:

$$Th_{11} > I_1 - I_2 > Th_{12} \quad (4)$$

$$I_1 - I_2 < Th_{21} \text{ or } Th_{22} > I_1 - I_2 \quad (5)$$

Figure 1A:
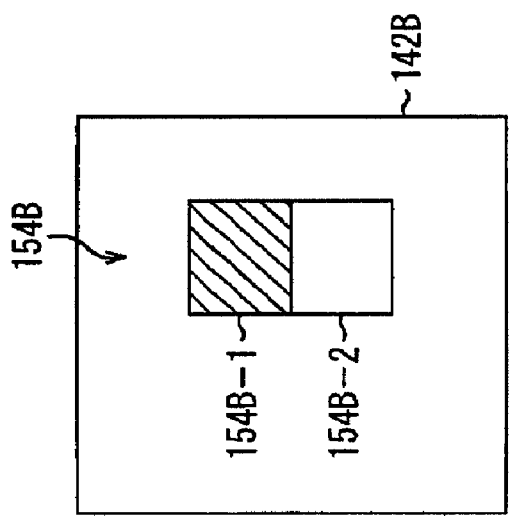
FIGS. 1A to 1D are schematic diagrams showing rectangle features used in the related art.
Figure 1B:
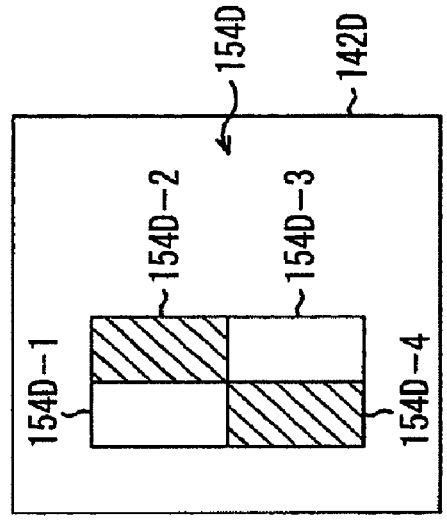
Figure 1C:
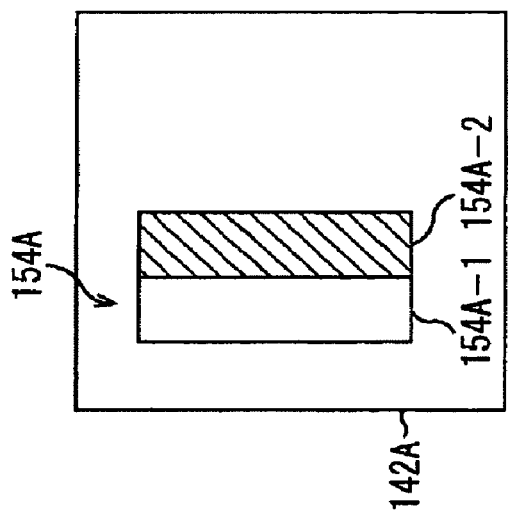
Figure 1D:
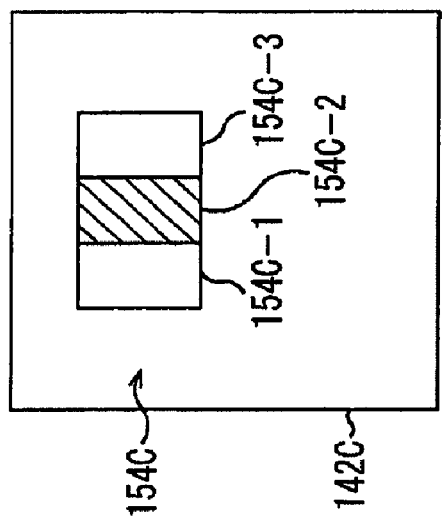
Figure 2:
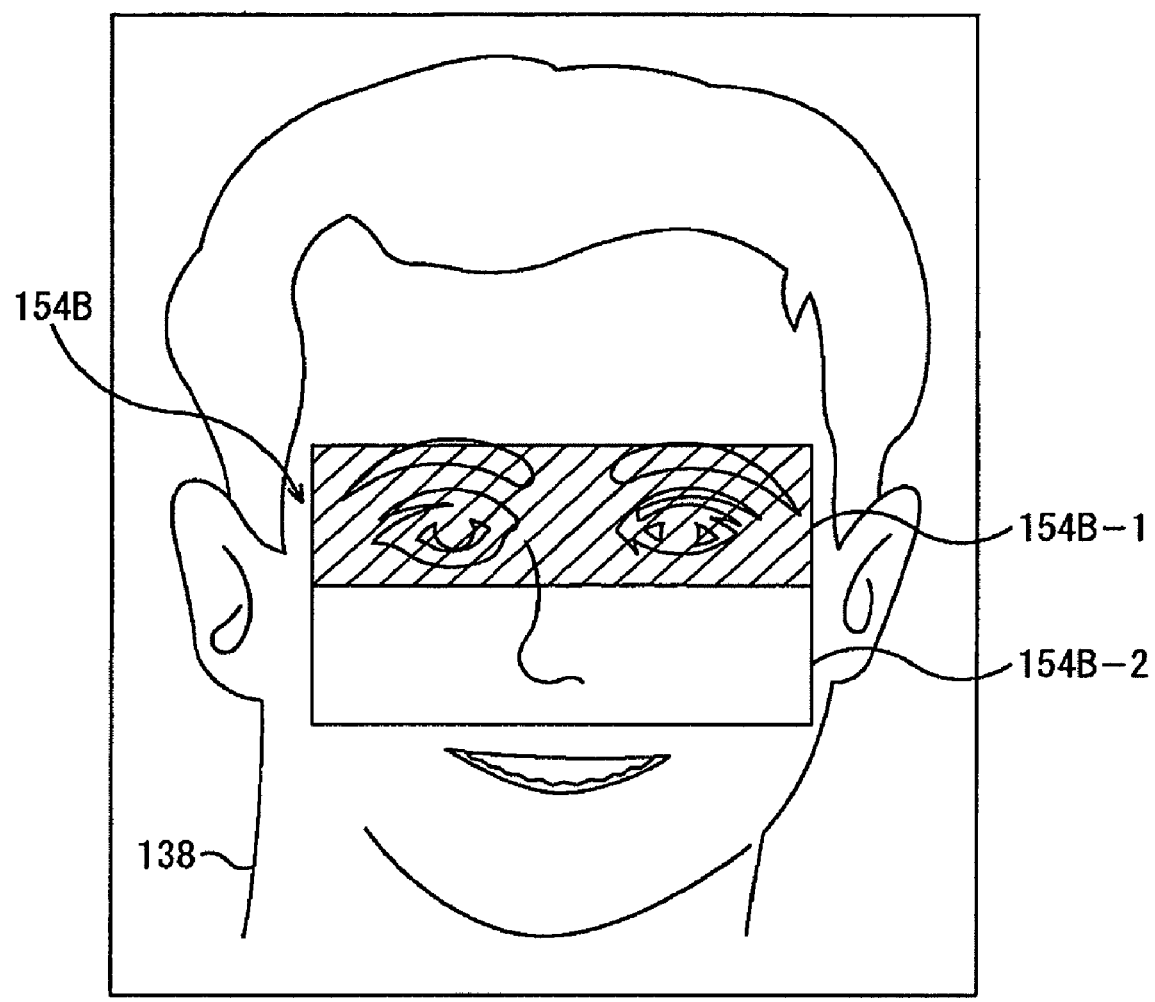
FIG. 2 is a diagram for explaining a method for classifying a face image using the rectangle features according to the related art.
Figure 3:
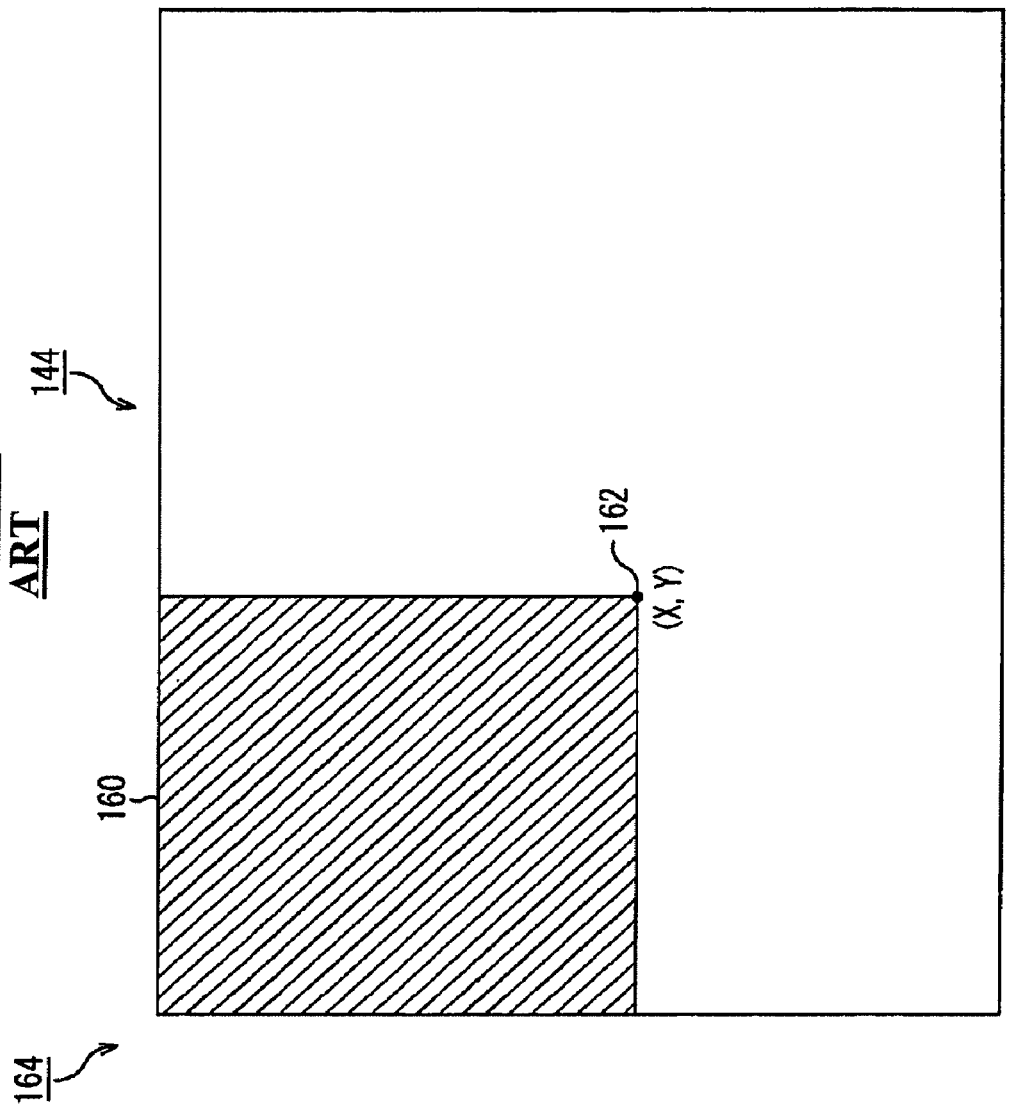
FIG. 3 is a schematic diagram showing an integral image used in the related art.
Figure 4:
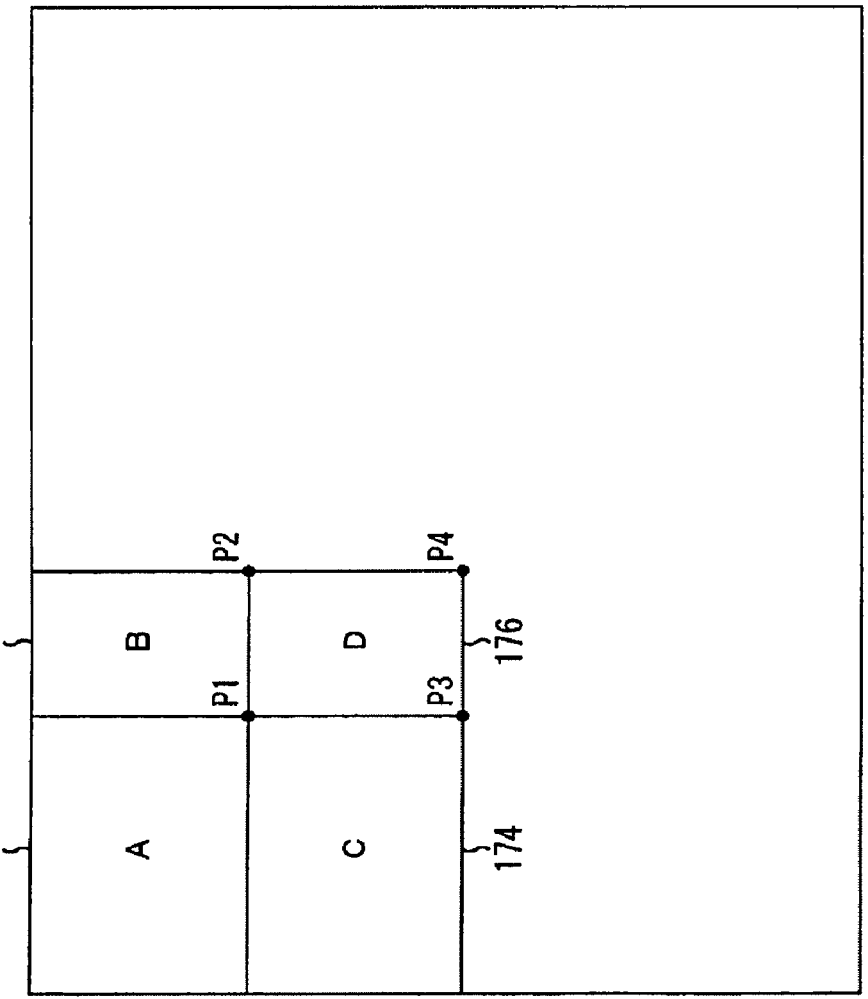
FIG. 4 is a diagram showing a method for calculating the sum of luminance values in a rectangular box using the integral image according to the related art.
Figure 11A:
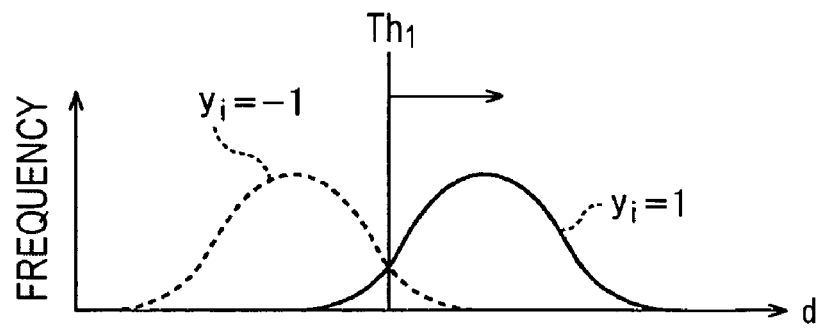
FIGS. 11A to 11C are diagram for explaining relationship between an inter-pixel difference feature and a threshold.
Figure 11B:
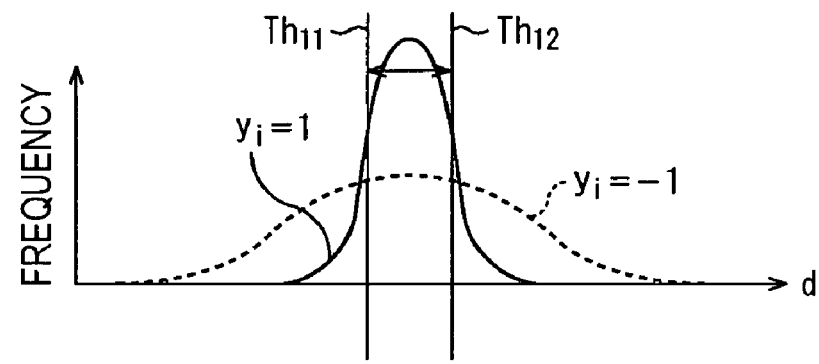
Figure 11C:
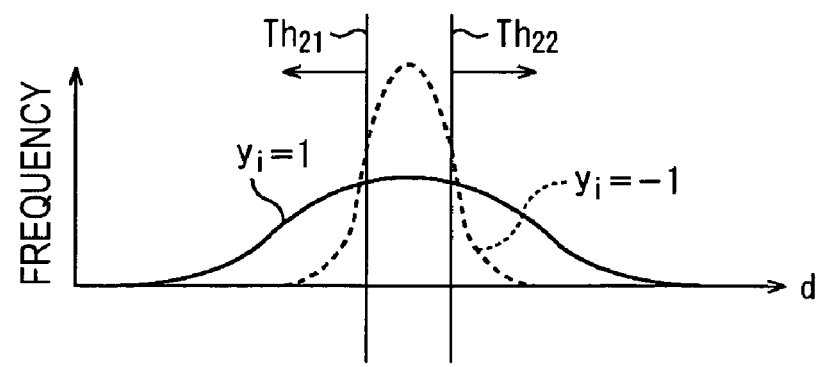

FIGS. 11A to 11C are schematic diagrams showing characteristic cases of the frequency distribution of data according to the three classification methods expressed in expressions (3) to (5) above, in which the vertical axes represent frequency and the horizontal axes represent inter-pixel difference feature d. In FIGS. 11A to 1C, $y_t$ denotes an output of a weak classifier, a broken line represents the distribution of learning samples classified as $y_i=-1$ (i.e., objects not of interest), and a solid line represents the distribution of learning samples classified as $y_i=1$ (i.e., objects of interest). Histograms shown in FIGS. 11A to 11C are obtained by taking frequencies of the same values of inter-pixel difference feature d regarding learning samples including a large number of face images and non-face images.

Figure 12:
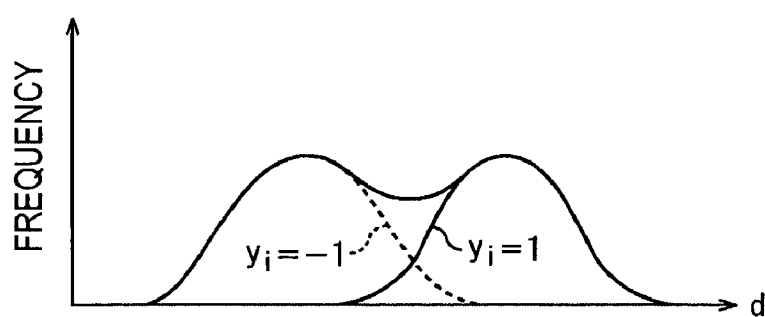
FIG. 12 is a diagram for explaining a frequency distribution.

The solid line and the broken line represent the distributions of learning samples classified as $y_i=1$ and $y_i=-1$, respectively, independently of each other. Thus, for example, the total distribution of inter-pixel difference feature d shown in FIG. 11A is as shown in FIG. 12.

For example, when the histogram is such that the distribution of objects not of interest as represented by the broken line and the distribution of objects of interest as represented by the solid line form similar normal curves with peaks thereof horizontally shifted with respect to each other as shown in FIG. 11A, a threshold $Th_1$ is set at a boundary therebetween so that it is possible to classify whether an image corresponds to an object of interest according to expression (3) above. For example, in the case of AdaBoost, letting an output (classification result) of a weak classifier be denoted by f(x), the output f(x)=1 (i.e., an object of interest) or f(x)=−1 (i.e., an object not of interest). FIG. 11A shows an example where it is determined that the image corresponds to an object of interest when the inter-pixel difference feature d is greater than the threshold $Th_1$ and the output of the weak classifier f(x)=1.

When the peaks of the two histograms are located at substantially the same positions and the widths of the distributions thereof differ, using a value in the vicinity of an upper limit and a value in the vicinity of a lower limit of the inter-pixel difference feature d of the narrower distribution as thresholds, it is possible to classify whether the image corresponds to an object of interest according to expression (4) or (5) above. FIG. 11B shows an example where the image is classified as corresponding to an object of interest when the inter-pixel difference feature d is within the narrower distribution, and the output of the weak classifier is f(x)=1. FIG. 11C shows an example where the image is classified as corresponding to an object of interest when the inter-pixel difference feature d is in one of the ranges defined by excluding the narrower distribution from the wider distribution, and the output of the weak classifier is f(x)=1.

The weak classifier is constructed by determining an inter-pixel difference feature d and a threshold. The inter-pixel difference feature d must be chosen so that error ratio will be minimized, i.e., so that classification ratio will be high. For example, regarding labeled learning samples for two pixel positions are determined, a histogram such as the one shown in FIG. 11 is obtained, and a threshold is determined so that correct classification ratio will be maximized, i.e., so that incorrect classification ratio (error ratio) will be minimized. The two pixel positions are determined so that, for example, error ratio will be minimized in consideration of the threshold. In AdaBoost, however, data weights reflecting the degrees of difficulty of classification are assigned to the respective learning samples, and learning is performed so that weighted error ratio described later will be minimized by choosing an appropriate inter-pixel difference feature (choosing an appropriate pair of pixels whose luminance values are used to define a feature).

(3-2) Continuous-Output Weak Classifiers

A type of weak classifier that produces probabilistic outputs, such as Real-AdaBoost or GentleBoost, outputs continuous values as described earlier. In this case, in contrast to the case described above in which a classification problem is solved based on a predetermined threshold to produce a binary output (f(x)=1 or −1), the weak classifier outputs the likelihood of an input image corresponding to an object of interest, for example, in the form of a probability density function.

Let the probability density function of objects of interest in learning samples with input of inter-pixel difference features d be denoted by $P_p(x)$, and the probability density function of objects not of interest in the learning samples as $P_n(x)$. Then, the probabilistic output representing the likelihood (probability) of an image corresponding to an object of interest can be expressed by a function f(x) expressed in expression (6) below:

$$f(x)=P_p(x)-P_n(x) \qquad (6)$$

Figure 13A:
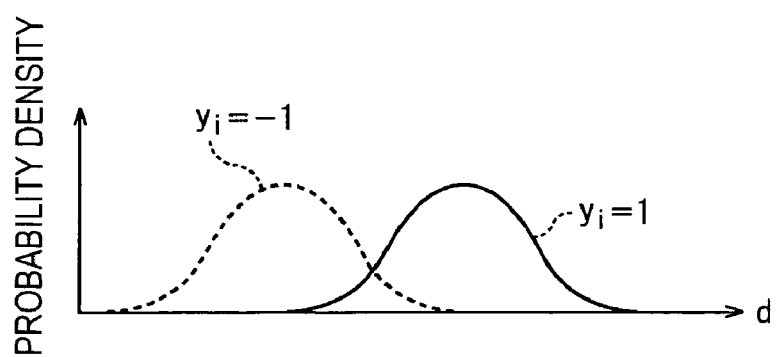
FIGS. 13A and 13B are diagrams for explaining inter-pixel difference features based on probability density.
Figure 13B:
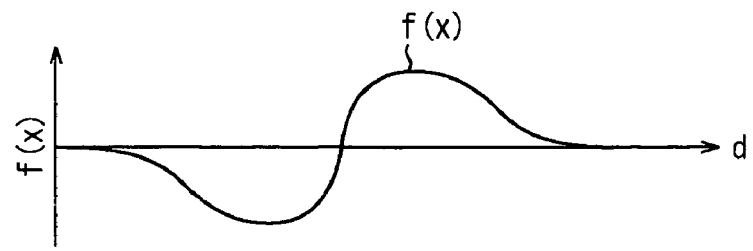

FIG. 13A is a diagram showing a case of a characteristic frequency distribution of data, in which the vertical axis represents probability density and the horizontal axis represent inter-pixel difference feature d. FIG. 13B is a graph showing the function f(x) for the data distribution shown in FIG. 13A, in which the vertical axis represents value of the function f(x) and the horizontal axis represents inter-pixel difference feature d. In FIG. 13A, the broken line represents the probability density of images corresponding to objects not of interest, and the solid line represents the probability density of images corresponding to objects of interest. Calculating the function f(x) according to expression (6) above yields the graph shown in FIG. 13B. The weak classifier outputs a function f(x) corresponding to the inter-pixel difference feature d according to expression (2) above, obtained from a learning sample or a window image input thereto in the learning process or the classification process. The function f(x) represents the likelihood of an image corresponding to an object of interest. For example, when an object not of interest corresponds to −1 and an object of interest corresponds to 1, the function f(x) is possible to take on continuous values between −1 to 1. For example, a table defining inter-pixel difference features d and corresponding values of f(x) is stored, and a value of f(x) corresponding to a given input is read and output. Thus, although the amount of storage needed becomes somewhat larger than the threshold $Th_1$ or the thresholds $Th_{11}$ and $Th_{12}$ or $Th_{21}$, and $Th_{22}$, classification performance is improved.

It is expected that classification performance is improved when these estimation methods (classification methods) are used in combination during ensemble learning. When only a single classification method is used, execution speed is increased.

The weak classifiers used in this embodiment are advantageous in that they are capable of quickly classifying objects as described above since features used (inter-pixel difference features d) are very simple. When faces are detected as objects of interest, very favorable classification results can be obtained based on the threshold check of the inter-pixel difference features d according to expression (3), which is simplest among the classification methods described above. Which classification method is suitable for the weak classifiers to work effectively varies depending on the problem in question, and a method of setting a threshold is suitably chosen in each case. Furthermore, depending on the nature of the problem, instead of difference between luminance values of two pixels, difference among luminance values of three or more pixels may be used as a feature.

(4) Termination Threshold

Now, a termination threshold will be described. In an ensemble learning machine based on boosting, usually, whether a window image corresponds to an object of interest is determined by calculating a value of weighted majority based on the outputs of all the weak classifiers constituting the classification unit 5. The value of weighted majority is calculated by progressively summing up results of classification (estimation values) by the weak classifiers. For example, letting the number of weak classifiers be denoted by t (=1, . . . , K), majority weights (confidences) for the respective weak classifies by $\alpha_t$, and the outputs of the respective weak classifiers by $f_t(x)$, the value F(x) of weighted majority in the case of AdaBoost can be calculated according to expression (7) below:

$$F(x) = \sum_t \alpha_t f_t(x) \qquad (7)$$

Figure 14:
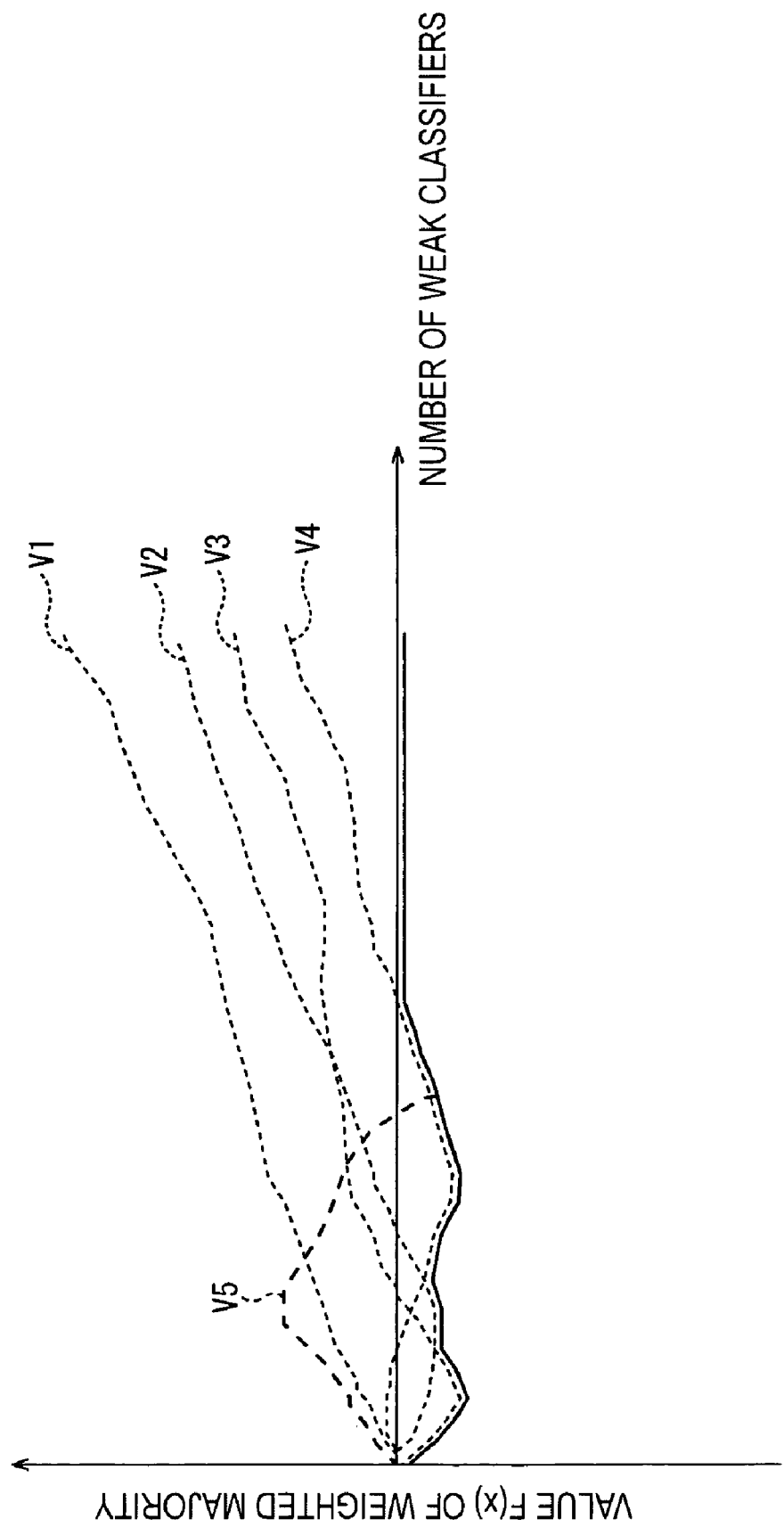
FIG. 14 is a diagram showing change in the value F(x) of weighted majority.

FIG. 14 is a graph showing how the value F(x) of weighted majority according to whether an input image corresponds to an object of interest changes, in which the horizontal axis represents the number of weak classifiers and the vertical axis represents the value F(x) of weighted majority according to expression (7) above. In FIG. 14, data $V_1$ to $V_4$ represented by broken lines represent values F(x) of weighted majority in cases where estimation values f(x) are sequentially calculated by the weak classifiers with images (learning samples) labeled as objects of interest as inputs. As indicated by the data $V_1$ to $V_4$, when input images correspond to objects of interest, the value F(x) of weighted majority according to classification by a certain number of weak classifiers becomes positive.

In this embodiment, a method that is different from the normal boosting algorithm is employed. More specifically, in a process of progressively summing up results of classification by weak classifiers, even before results from all the weak classifiers are obtained, classification can be terminated when a window image can be clearly classified as not corresponding to an object of interest. A termination threshold (reference value) for determining whether to terminate classification is learned in the learning process.

By using the termination threshold, when it is reliably estimated that an image does not correspond to an object of interest without using results output from all the weak classifiers, calculation of estimated values f(x) by the weak classifiers can be terminated in the middle. This serves to reduce the amount of computation considerably compared with a case where all the weak classifiers are used to calculate a value of weighted majority, allowing quick processing.

The termination threshold may be chosen to be a minimum value that can be taken by the value of weighted majority as a result of classification of a learning sample indicating an object to be detected among labeled learning samples. In the classification process, results of classification of a window image by the weak classifiers are sequentially weighted and output. That is, the value of weighted majority is progressively updated. On each occasion of updating, i.e., each time a classification result is output by one of the weak classifiers, the updated value is compared with the termination threshold. When the updated value of weighted majority becomes less than the termination threshold, it is possible to determine that the window image does not correspond to an object of interest, so that calculation can be terminated. This serves to save useless computation, serving to improve the speed of the classification process.

That is, a termination threshold $R_M$ for the output $f_M(x)$ of the M-th weak classifier is a minimum value of the value F(x) of weighted majority for learning samples $x_j$ (j=1 to J) for positive samples (i.e., learning samples corresponding to objects of interest) among learning samples $x_i$ (i=1 to N), which can be expressed as in expression (8) below:

$$R_M = \min\left(\sum_{t=1}^{M} \alpha_t f_t(x_1), \sum_{t=1}^{M} \alpha_t f_t(x_2), \ldots, \sum_{t=1}^{M} \alpha_t f_t(x_j), 0\right) \qquad (8)$$

As expressed in expression (8), when the minimum value of the value F(x) of weighted majority of the learning samples $x_1$ to $x_J$ corresponding to objects of interest exceeds 0, 0 is set as the termination threshold $R_M$. This holds in the case of AdaBoost, which performs classification with a threshold of 0, and does not necessarily hold depending on the method of ensemble learning. In the case of AdaBoost, as represented by a solid line in FIG. 14, the termination threshold $R_M$ is chosen to be a minimum value that can be taken among the values F(x) of weighted majority of all the data $V_1$ to $V_4$ when input images corresponding to objects of interest are input, and when the minimum value of the values F(x) of weighted majority of all the data $V_1$ to $V_4$ exceeds 0, the termination threshold $R_M$ is chosen to be 0.

In this embodiment, termination thresholds $R_M$ ($R_1$ to $R_K$) used when generating weak classifiers are learned, so that in the classification process described later, estimation values are sequentially output by a plurality of weak classifiers and the value of weighted majority is progressive updated as in data $V_5$. When the value becomes less than the termination threshold $R_M$, classification by subsequent weak classifiers is refrained. That is, by learning the termination thresholds $R_M$, when an estimation value is calculated by a weak classifier, it is possible to determine whether to perform calculation by a next weak classifier. Thus, when it is clear that an image does not correspond to an object of interest without waiting for results of classification by all the weak classifiers, calculation can be terminated in the course of classification. This serves to improve the speed of detection.

(5) Construction of Weak Classifiers

Figure 15:
FIG. 15 is a diagram showing an example of learning sample.

Next, the construction of weak classifiers in this embodiment will be described. In this embodiment, for example, a plurality of learning samples shown in FIG. 15 is used for learning. Each of the learning samples consists of 24×24 pixels. The learning samples are images of human faces, and have variation regarding light condition, race, and so forth.

In this embodiment, labeling is performed based on the posture of human faces (heads).

Figure 16A:
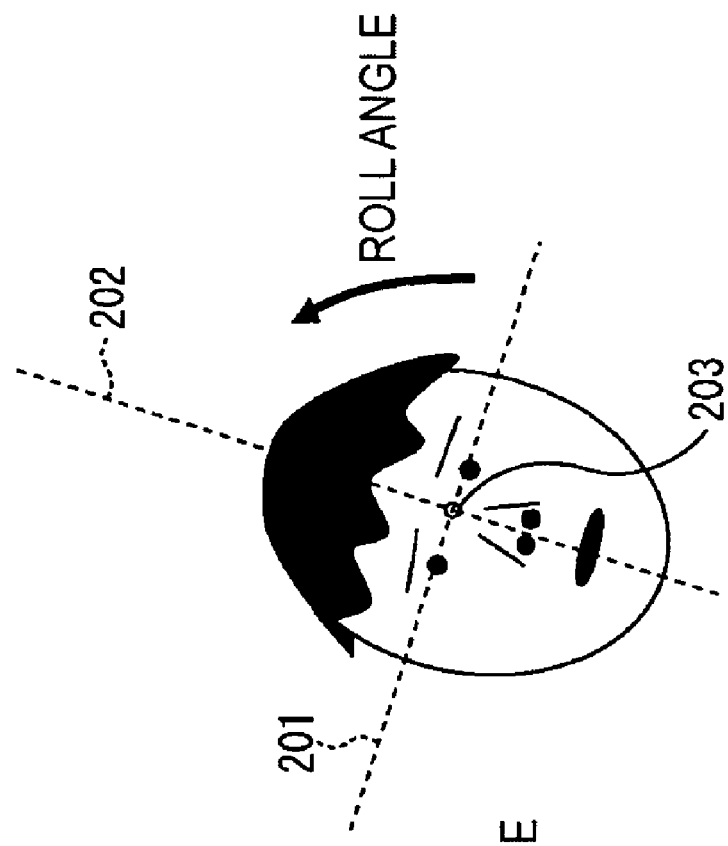
FIGS. 16A and 16B are diagrams for explaining angles relating to the posture of a face.
Figure 16B:
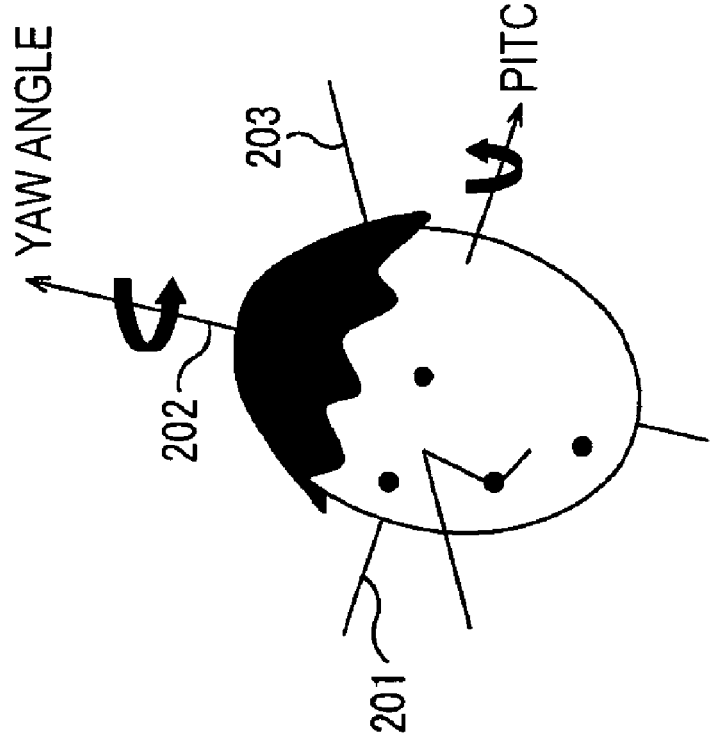

More specifically, a human face is determined based on a pitch angle, a yaw angle, and a roll angle, as shown in FIGS. 16A and 16B. The pitch angle is an upward or downward angle with respect to an axis 201 that is parallel to a line connecting the eyes of a person and substantially passing through the center of the head of the person. For example, the pitch angle is positive when the person looks upward, and the pitch angle is negative when the person looks downward. The yaw angle is an angle with respect to an axis 202 that is perpendicular to the axis 201 and substantially passing through the center of the head in the vertical direction. For example, the yaw angle is 0 degrees when the person looks frontward, the yaw angle is negative when the person looks rightward, and the yaw angle is positive when the person looks leftward. The roll angle is an angle of rotation with respect to an axis 203 that is perpendicular to the axes 201 and 202. The roll angle is 0 degrees when the axis 201 is horizontal.

Of these three angles, the roll angle can be corrected (converted) by rotating the image. Thus, it is possible to determine whether the image corresponds to a human face based on the corrected image. On the other hand, the yaw angle and the pitch angle cannot be simply corrected. Thus, in this embodiment, by learning images of human faces having certain yaw angles and pitch angles, it becomes possible to detect whether images correspond to human faces.

Figure 17:
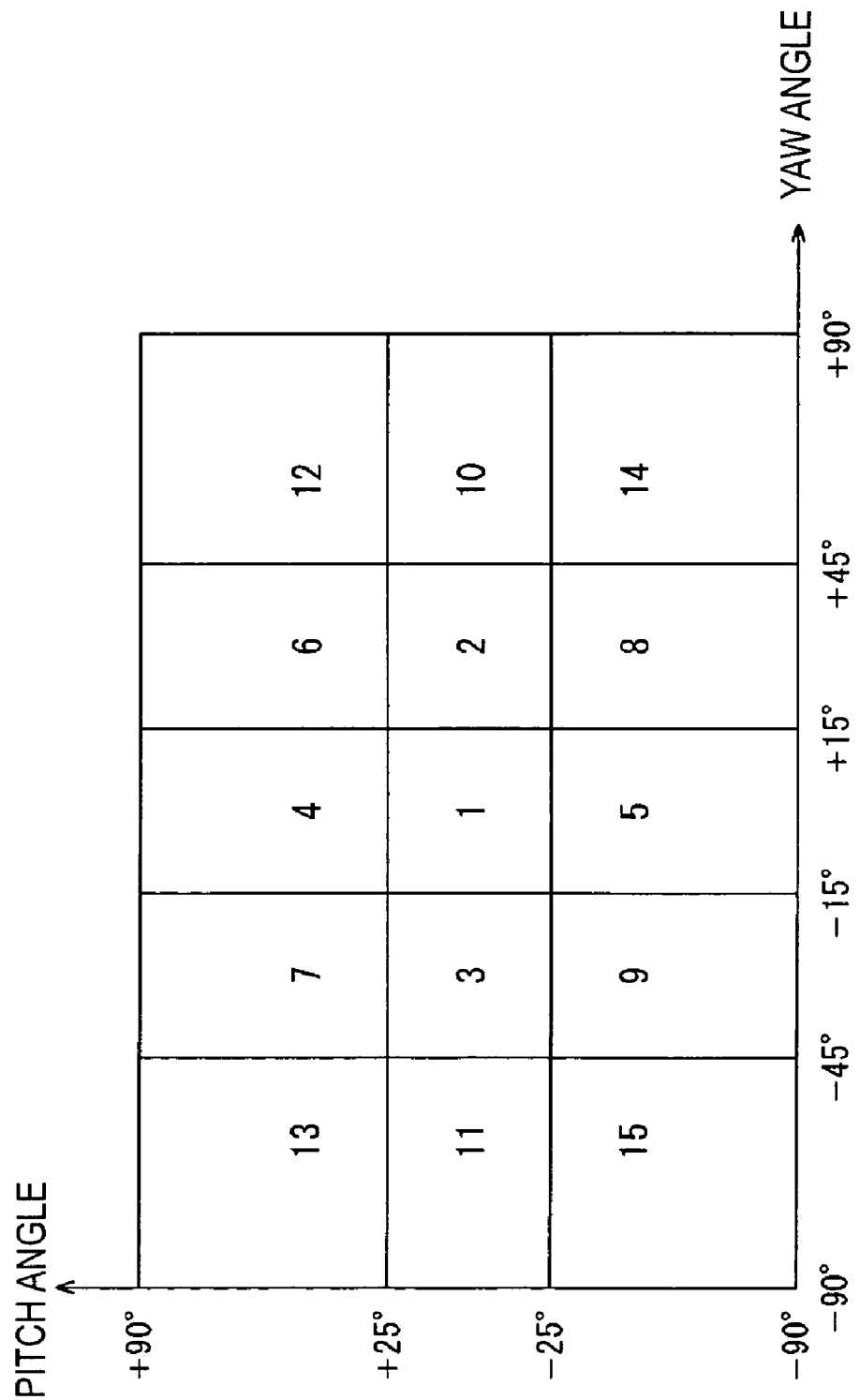
FIG. 17 is a diagram for explaining labels.

For this purpose, in this embodiment, learning samples are classified (labeled) into 15 groups (labels) on the basis of the yaw angles and pitch angles thereof, as shown in FIG. 17.

The yaw angle is divided into five ranges, namely, a range of −90 to −45 degrees, a range of −45 to −15 degrees, a range of −15 to +15 degrees, a range of +15 to +45 degrees, and a range of +45 to +90 degrees. The pitch angle is divided into three ranges, namely, a range of −90 to −25 degrees, a range of −25 to +25 degrees, and a range of +25 to +90 degrees.

Label 1 is assigned when the yaw angle is in the range of −15 to +15 degrees and the pitch angle is in the range of −25 to +25 degrees. Label 2 is assigned when the yaw angle is in the range of +15 to +45 degrees and the pitch angle is in the range of −25 to +25 degrees. Label 3 is assigned when the yaw angle is in the range of −45 to −15 degrees and the pitch angle is in the range of −25 to +25 degrees. Label 4 is assigned when the yaw angle is in the range of −15 to +15 degrees and the pitch angle is in the range of +25 to +90 degrees. Label 5 is assigned when the yaw angle is in the range of −15 to +15 degrees and the pitch angle is in the range of −90 to −25 degrees. Label 6 is assigned when the yaw angle is in the range of +15 to +45 degrees and the pitch angle is in the range of +25 to +90 degrees. Label 7 is assigned when the yaw angle is in the range of −45 to −15 degrees and the pitch angle is in the range of +25 to +90 degrees. Label 8 is assigned when the yaw angle is in the range of +15 to +45 degrees and the pitch angle is in the range of −90 to −25 degrees. Label 9 is assigned when the yaw angle is in the range of −45 to −15 degrees and the pitch angle is in the range of −90 to −25 degrees. Label 10 is assigned when the yaw angle is in the range of +45 to +90 degrees and the pitch angle is in the range of −25 to +25 degrees. Label 11 is assigned when the yaw angle is in the range of −90 to −45 degrees and the pitch angle is in the range of −25 to +25 degrees. Label 12 is assigned when the yaw angle is in the range of +45 to +90 degrees and the pitch angle is in the range of +25 to +90 degrees. Label 13 is assigned when the yaw angle is in the range of −90 to −45 degrees and the pitch angle is in the range of +25 to +90 degrees. Label 14 is assigned when the yaw angle is in the range of +45 to +90 degrees and the pitch angle is in the range of −90 to −25 degrees. Label 15 is assigned when the yaw angle is in the range of −90 to −45 degrees and the pitch angle is in the range of −90 to −25 degrees.

Figure 18:
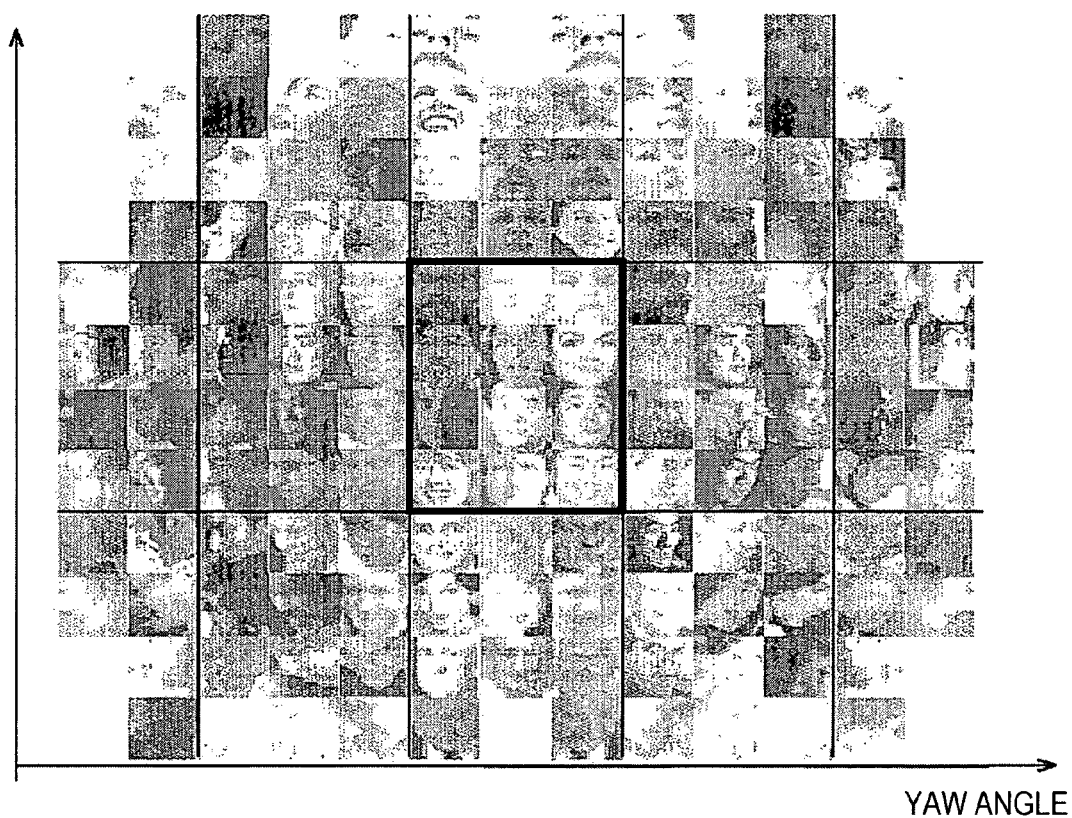
FIG. 18 is a diagram for explaining classification of the angles relating to the posture of a face.

As shown in FIG. 18, each of the learning samples is labeled with one of the labels 1 to 15 shown in FIG. 17, according to the direction of the face of a person in the sample. This labeling is performed manually.

In this embodiment, each node is constructed basically of a predetermined number of weak classifiers (e.g., 100 weak classifiers), and nodes are arranged to form a tree structure. Learning is performed so that discrimination of images with the respective labels is allowed. An upper node in the tree structure performs learning involving all labels that are to be learned by weak classifiers of lower nodes.

Figure 19:
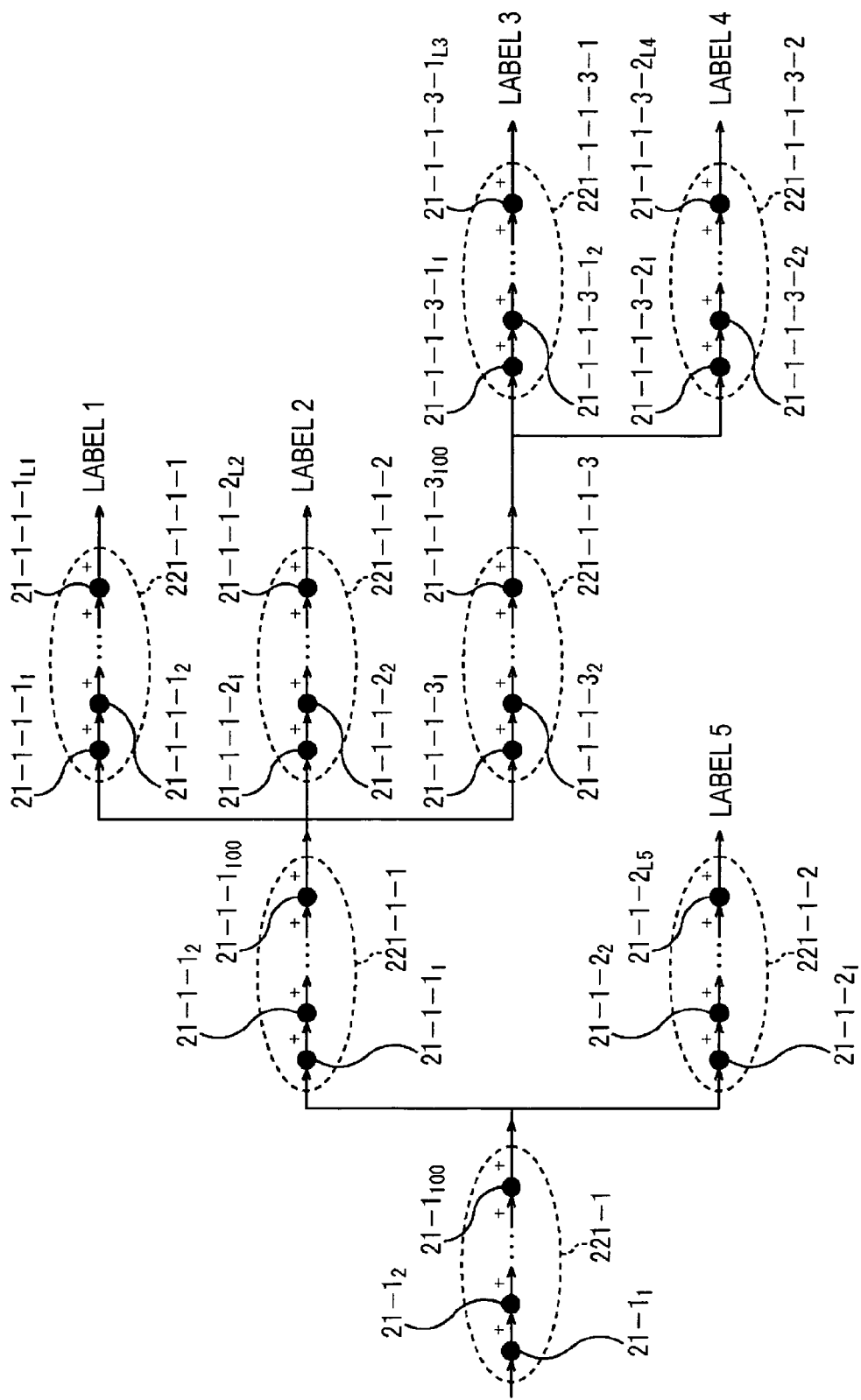
FIG. 19 is a diagram for explaining a tree structure.

As a simple example, when images of five labels 1 to 5 are to be learned, a tree structure shown in FIG. 19 is formed. In the example shown in FIG. 19, each node is constructed of 100 weak classifiers. An uppermost node 221-1 is constructed of weak classifiers $21\text{-}1_1$ to $21\text{-}1_{100}$. The node 221-1 learns all learning samples with the labels 1 to 5.

As lower nodes of the node 221-1, nodes 221-1-1 and 221-1-2 are constructed. The node 221-1-1 is constructed of weak classifiers $21\text{-}1\text{-}1_1$ to $21\text{-}1\text{-}1_{100}$, and the node 221-1-2 is constructed of weak classifiers $21\text{-}1\text{-}2_1$ to $21\text{-}1\text{-}2_{L5}$. That is, the nodes 221-1-1 and 221-1-2 are child nodes of the upper node 221-1, and relatively the node 221-1 is a parent node of the nodes 221-1-1 and 221-1-2. The nodes 221-1-1 and 221-1-2 are sibling nodes of each other in relation to the parent node 222-1. When a parent node has an even upper node, the parent node is a child node of the upper node.

Since the node 221-1-2 does not have any lower (child) node, the number of weak classifiers is L5. The node 221-1-2 learns learning samples with the label 5. On the other hand, the node 221-1-1 learns learning samples with the labels 1 to 4, i.e., learning samples with the labels excluding the label 5 learned by the sibling node 221-1-2 among the labels 1 to 5 learned by the parent node 221-1.

As lower nodes (child nodes) of the node 221-1-1, nodes 221-1-1-1 to 221-1-1-3 are provided. The node 221-1-1-1 learns learning samples with the label 1, the node 221-1-1-2 learns learning samples with the label 2, and the node 221-1-1-3 learns learning samples with the labels 3 and 4, i.e., learning samples with the labels excluding the labels 1 and 2 learned by the sibling nodes among the labels 1 to 4 learned by the parent node 221-1-1.

The node 221-1-1-1 is a terminal node, not having any lower node, and it has L1 weak classifiers $21\text{-}1\text{-}1\text{-}1_1$ to $21\text{-}1\text{-}1\text{-}1_{L1}$. The node 221-1-1-2 is also a terminal node, and it has L2 weak classifiers $21\text{-}1\text{-}1\text{-}2_1$ to $21\text{-}1\text{-}1\text{-}2_{L2}$.

The node 221-1-1-3 is not a terminal node, and it has 100 weak classifiers $21\text{-}1\text{-}1\text{-}3_1$ to $21\text{-}1\text{-}1\text{-}3_{100}$.

As child node with the node 221-1-1-3 as a parent node, nodes 221-1-1-3-1 and 221-1-1-3-2 are provided. The node 221-1-1-3-1 learns learning samples with the label 3 among the labels 3 and 4 learned by the parent node. The node 221-1-1-3-2 learns learning samples with the label 4, i.e., learning samples with the label excluding the label 3 learned by the sibling node 221-1-1-3-1 among the labels 3 and 4 learned by the parent node 221-1-1-3. The node 221-1-1-3-1, which is a terminal node, is constructed of L3 weak classifiers $21\text{-}1\text{-}1\text{-}3\text{-}1_1$ to $21\text{-}1\text{-}1\text{-}3\text{-}1_{L3}$. The node 221-1-1-3-2, which is also a terminal node, is constructed of L4 weak classifiers $21\text{-}1\text{-}1\text{-}3\text{-}2_1$ to $21\text{-}1\text{-}1\text{-}3\text{-}2_{L4}$.

The numbers L1 to L5 of weak classifiers of the terminal nodes 221-1-1-1, 221-1-1-2, 221-1-1-3-1, 221-1-1-3-2, and 221-1-2 are chosen so that weighted error ratios et will be 0 (sufficiently reduced) when the respective nodes learn learning samples with the associated labels.

Figure 20:
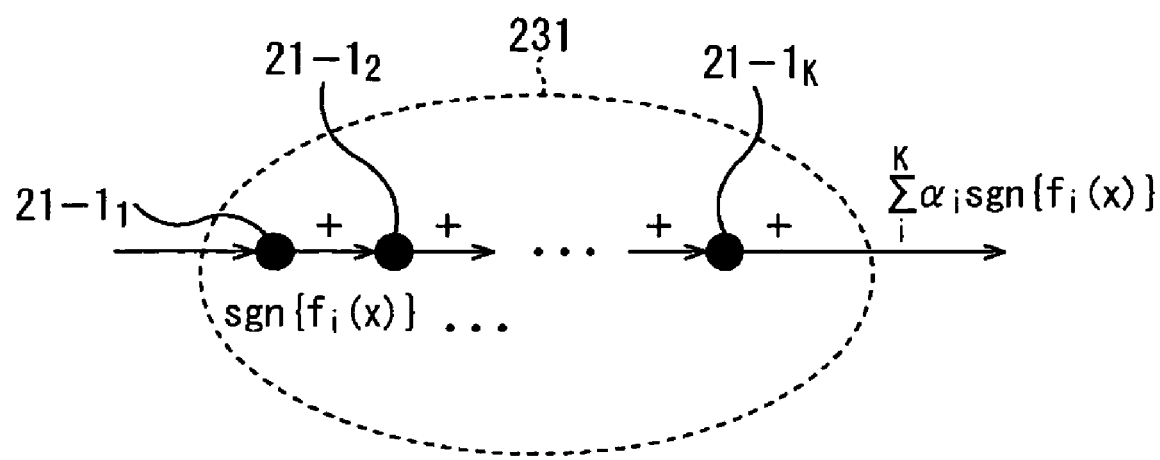
FIG. 20 is a diagram for explaining a construction of weak classifiers according to ordinary AdaBoost.

In this way, the number of weak classifiers can be reduced. More specifically, if such a tree structure is not used, for example, a set of weak classifiers 231 shown in FIG. 20 is needed for discrimination of one label. The set of weak classifiers 231 includes K weak classifiers $21\text{-}1_1$ to $21\text{-}1_K$. Learning samples with one label is learned by the K weak classifiers.

Thus, for example, in order to learn learning samples with five labels, as well as the set of weak classifiers 231-1 for learning learning samples with the label 1, sets of weak classifiers 231-2 to 231-5 for learning learning samples with the labels 2 to 5 are needed. Each of the sets of weak classifiers 231-2 to 231-5 includes K weak classifiers.

In the tree structure shown in FIG. 19, when a weighted error ratio $e_t$ is not sufficiently reduced until the end, the maximum number of weak classifiers on a learning path from an uppermost node to a terminal node is K. However, when the weighted error ratio $e_t$ is sufficiently reduced in the middle, subsequent learning of learning samples with the relevant label is not performed, so that the number of weak classifiers can be reduced accordingly. Furthermore, learning samples with a plurality of labels are learned on the upper side by common weak classifiers, so that the number of weak classifiers can be reduced accordingly.

Furthermore, in this embodiment, when a value of weighted majority obtained by accumulating results of weighting results of classification (discrimination) by the respective weak classifiers becomes less than a termination threshold, subsequent classification (discrimination) is refrained. Thus, the number of weak classifiers can be reduced also in this respect.

Figure 22:
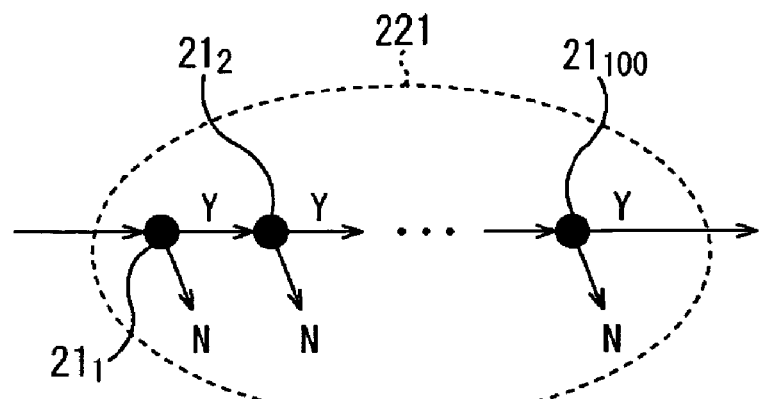
FIG. 22 is a diagram showing the construction of a node composed of weak classifiers with rejection checking.
Figure 23:
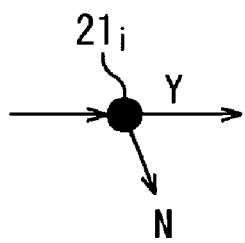
FIG. 23 is a diagram showing the construction of a weak classifier with rejection checking.

This is schematically shown in FIG. 22. That is, in this embodiment, although the node 221 is basically constructed of the weak classifiers $21_1$ to $21_{100}$, each node $21_i$ has a function of termination based on a termination threshold. In FIG. 22, Y denotes that an output is inherited by a subsequent stage, and N denotes that processing is terminated.

FIG. 24 shows a part of a tree structure (a part of a tree structure shown in FIG. 25) in a case where each node is constructed by weak classifiers having the terminating function described above. In this example, learning samples with 15 labels 1 to 15 are learned and discriminated. More specifically, an uppermost parent node 221-1 is constructed of weak classifiers $21\text{-}1_1$ to $21\text{-}1_{100}$. As child nodes of the parent node 221-1, nodes 221-1-1, 221-1-2, and 221-1-3 are provided. The parent node 221-1 learns learning samples with all the labels 1 to 15. The node 221-1-1 learns learning samples with the five labels 1 to 5. The node 221-1-2 learns learning samples with the five labels 6, 8, 10, 12, and 14. The node 221-1-3 learns learning samples with the five labels 7, 9, 11, 13, and 15.

The node 221-1-1 is constructed of 100 weak classifiers $21\text{-}1\text{-}1_1$ to $21\text{-}1\text{-}1_{100}$. The node 221-1-2 is constructed of 100 weak classifiers $21\text{-}1\text{-}2_1$ to $21\text{-}1\text{-}2_{100}$. The node 221-1-3 is constructed of 100 weak classifiers $21\text{-}1\text{-}3_1$ to $21\text{-}1\text{-}3_{100}$.

As child nodes with the node 221-1-1 as a parent node, nodes 221-1-1-1, 221-1-1-2, and 221-1-1-3 are provided. The node 221-1-1-1 is constructed of 100 weak classifiers $21\text{-}1\text{-}1\text{-}1_1$ to $21\text{-}1\text{-}1\text{-}1_{100}$, and it learns learning samples of the three labels 1 to 3 among the labels 1 to 5 learned by the parent node 221-1-1. The node 221-1-1-2 learns learning samples with the label 4, and it has L4 weak classifiers $21\text{-}1\text{-}1\text{-}2_1$ to $21\text{-}1\text{-}1\text{-}2_{L4}$. The node 221-1-1-3 learns learning samples with the label 5, and it has L5 weak classifiers $21\text{-}1\text{-}1\text{-}3_1$ to $21\text{-}1\text{-}1\text{-}3_{L5}$.

As child nodes with the node 221-1-1-1 as a parent node, nodes 221-1-1-1-1 to 221-1-1-1-3 are provided. The node 221-1-1-1-1 learns learning samples with the label 1, and it has L1 weak classifiers $21\text{-}1\text{-}1\text{-}1\text{-}1_1$ to $21\text{-}1\text{-}1\text{-}1\text{-}1_{L1}$. The node 221-1-1-1-2 learns learning samples with the label 2, and it has L2 weak classifiers $21\text{-}1\text{-}1\text{-}1\text{-}2_1$ to $21\text{-}1\text{-}1\text{-}1\text{-}2_{L2}$. The node 221-1-1-1-3 learns learning samples with the label 3, and it has L3 weak classifiers $21\text{-}1\text{-}1\text{-}1\text{-}3_1$ to $21\text{-}1\text{-}1\text{-}1\text{-}3_{L3}$.

Nodes 221-1-2-1 to 221-1-2-3, which are child nodes of the node 221-1-2, learns learning samples with the label 10, the labels 6 and 12, and the labels 8 and 14, respectively. The node 221-1-2-1 is constructed of L10 weak classifiers $21\text{-}1\text{-}2\text{-}1_1$ to $21\text{-}1\text{-}2\text{-}1_{L10}$, the node 221-1-2-2 has 100 weak classifiers $21\text{-}1\text{-}2\text{-}2_1$ to $21\text{-}1\text{-}2\text{-}2_{100}$, and the node 221-1-2-3 has 100 weak classifiers $21\text{-}1\text{-}2\text{-}3_1$ to $21\text{-}1\text{-}2\text{-}3_{100}$.

As child nodes with the node 221-1-3 as a parent node, nodes 221-1-3-1 to 221-1-3-3 are provided. The node 221-1-3-1 learns learning samples with the label 11, and it has L11 weak classifiers $21\text{-}1\text{-}3\text{-}2_1$ to $21\text{-}1\text{-}3\text{-}1_{L11}$. The node 221-1-3-2 learns learning samples with the labels 7 and 11, and it has 100 weak classifiers $21\text{-}1\text{-}3\text{-}2_1$ to $21\text{-}1\text{-}3\text{-}2_{100}$. The node 221-1-3-3 learns learning samples with the labels 9 and 15, and it has 100 weak classifiers $21\text{-}1\text{-}3\text{-}31$ to $21\text{-}1\text{-}3\text{-}3_{100}$.

Figure 25:
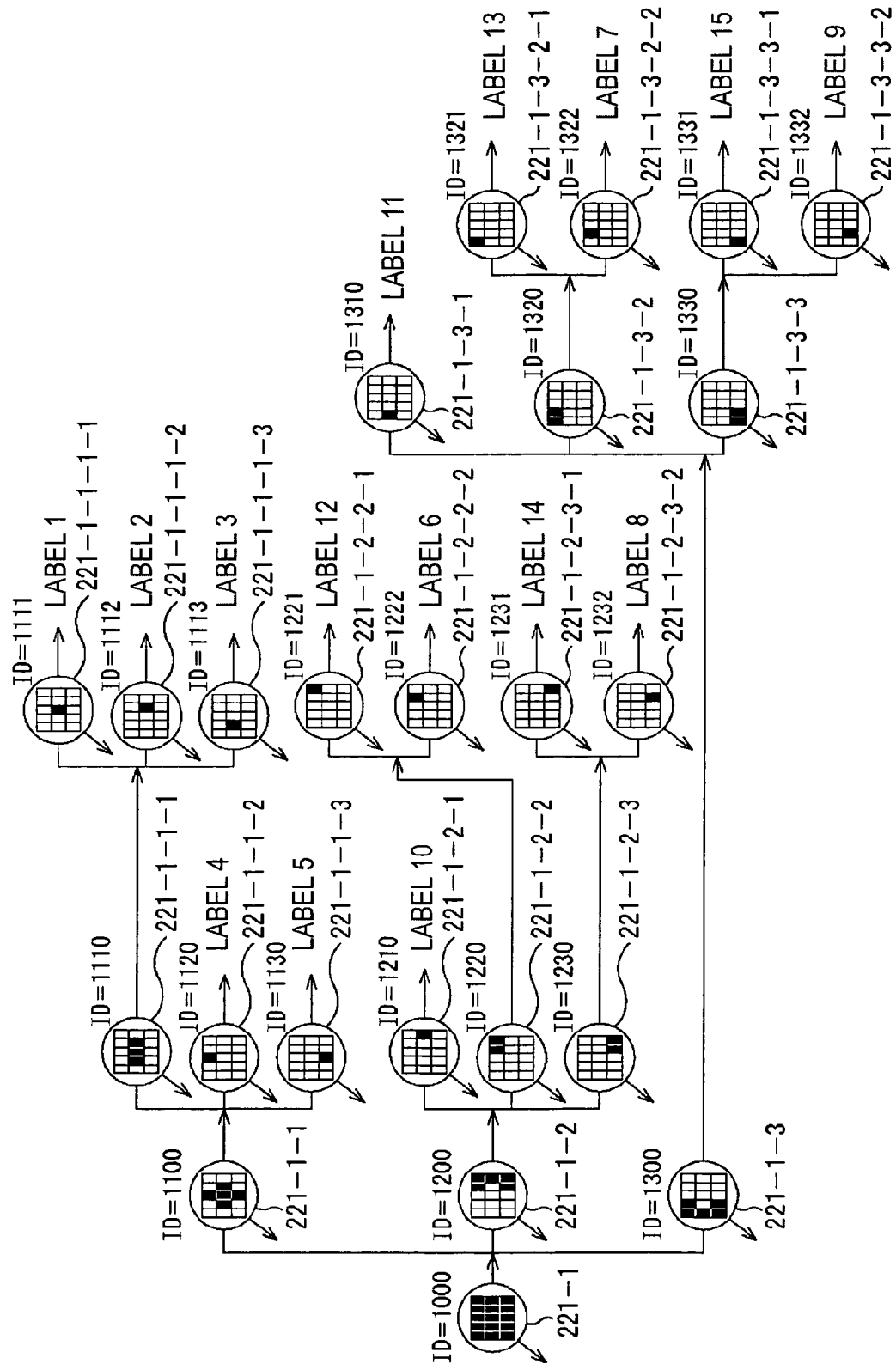
FIG. 25 is a diagram for explaining a tree structure of nodes.

As shown in FIG. 25, a node ID is assigned to each node. The node 221-1 has a node ID 1000, and the nodes 221-1-1 to 221-1-3 have node IDs 1100, 1200, and 1300, respectively. The nodes 221-1-1-1 to 221-1-1-3 have node IDs 1110, 1120, and 1130, respectively. The nodes 221-1-1-1-1 to 221-1-1-1-3 have node IDs 1111, 1112, and 1113, respectively. The nodes 221-1-2-1 to 221-1-2-3 have node IDs 1210, 1220, and 1230, respectively.

As child nodes with the node 221-1-2-2 as a parent node, nodes 221-1-2-2-1 and 221-1-2-2-2 are provided, having node IDs 1221 and 1222, respectively.

As child nodes with the node 221-1-2-3 as a parent node, nodes 221-1-2-3-1 and 221-1-2-3-2 are provided, having node IDs 1231 and 1232, respectively.

The nodes 221-1-3-1 to 221-1-3-3 have node IDs 1310, 1320, and 1330, respectively.

As child nodes with the node 221-1-3-2 as a parent node, nodes 221-1-3-2-1 and 221-1-3-2-2 are provided, having node IDs 1321 and 1322, respectively.

As child nodes of the node 221-1-3-3, nodes 221-1-3-3-1 and 221-1-3-3-2 are provided, having node IDs 1331 and 1332, respectively.

The tree structure may be manually designed based on knowledge of characteristic patterns, or may be constructed by causing samples for which the ability of discrimination does not improve (the weighted error ratio $e_t$ is not sufficiently reduced) to branch as learning proceeds.

The tree structure shown in FIG. 25 (FIG. 24) is designed based on the knowledge that similarity of pattern is high when the yaw angle is close. Thus, the uppermost parent node 221-1 learns learning samples with all the labels 1 to 15. The learning samples with the 15 labels are divided into learning samples with labels regarding front-looking images, labels regarding left-looking images, and labels regarding right-looking images, and learning samples with these labels are learned by the nodes 221-1-1, 221-1-2, and 221-1-3, respectively.

The learning samples of front-looking images with the labels 1 to 5 are further divided into learning samples of images with the labels 1 to 3, i.e., with the pitch angle in the range of −25 to +25 degrees, learning samples of images with the label 4, i.e., with the pitch angle in the range of +25 to +90 degrees, and learning samples of images with the label 5, i.e., with the pitch angle in the range of −90 to −25 degrees. These learning samples are learned by the nodes 221-1-1-1, 221-1-1-2, and 221-1-1-3, respectively.

The learning samples of images with the labels 1 to 3, i.e., with the pitch angle in the range of −25 to +25 degrees, are further divided into learning samples with the label 1, the label 2, and the label 3. These learning samples are learned by the nodes 221-1-1-1-1, 221-1-1-1-2, and 221-1-1-1-3, respectively.

The learning samples of left-looking images with the labels 6, 8, 10, 12, and 14 are divided into learning samples with the label 10, learning samples with the labels 6 and 12, and learning samples with the labels 8 and 14 according to the pitch angle. The learning samples with the label 10 are learned by the node 221-1-2-1, the learning samples with the labels 6 and 12 are learned by the node 221-1-2-2, and the learning samples with the labels 8 and 14 are learned by the node 221-1-2-3.

The learning samples with the labels 6 and 12 are further divided into learning samples with the label 6 and learning samples with the label 12. These learning samples are learned by the nodes 221-1-2-2-1 and 221-1-2-2-2, respectively.

The learning samples with the labels 8 and 14 are further divided into learning samples with the label 8 and learning samples with the label 14. These learning samples are learned by the nodes 221-1-2-3-1 and 221-1-2-3-2, respectively.

The learning samples of right-looking images with the labels 7, 9, 11, 13, and 15 are divided into learning samples with the label 11, learning samples with the labels 7 and 13, and learning samples with the labels 9 and 15. The learning samples with the label 11 are learned by the node 221-1-3-1, the learning samples with the labels 7 and 13 are learned by the node 221-1-3-2, and the learning samples with the labels 9 and 15 are learned by the node 221-1-3-3.

The learning samples with the labels 7 and 13 are divided into learning samples with the label 7 and learning samples with the label 13. These learning samples are learned by the nodes 221-1-3-2-2 and 221-1-3-2-1, respectively.

The learning samples with the labels 9 and 15 are divided into learning samples with the label 9 and learning samples with the label 15. These learning samples are learned by the nodes 221-1-3-3-2 and 221-1-3-3-1, respectively.

Figure 26:
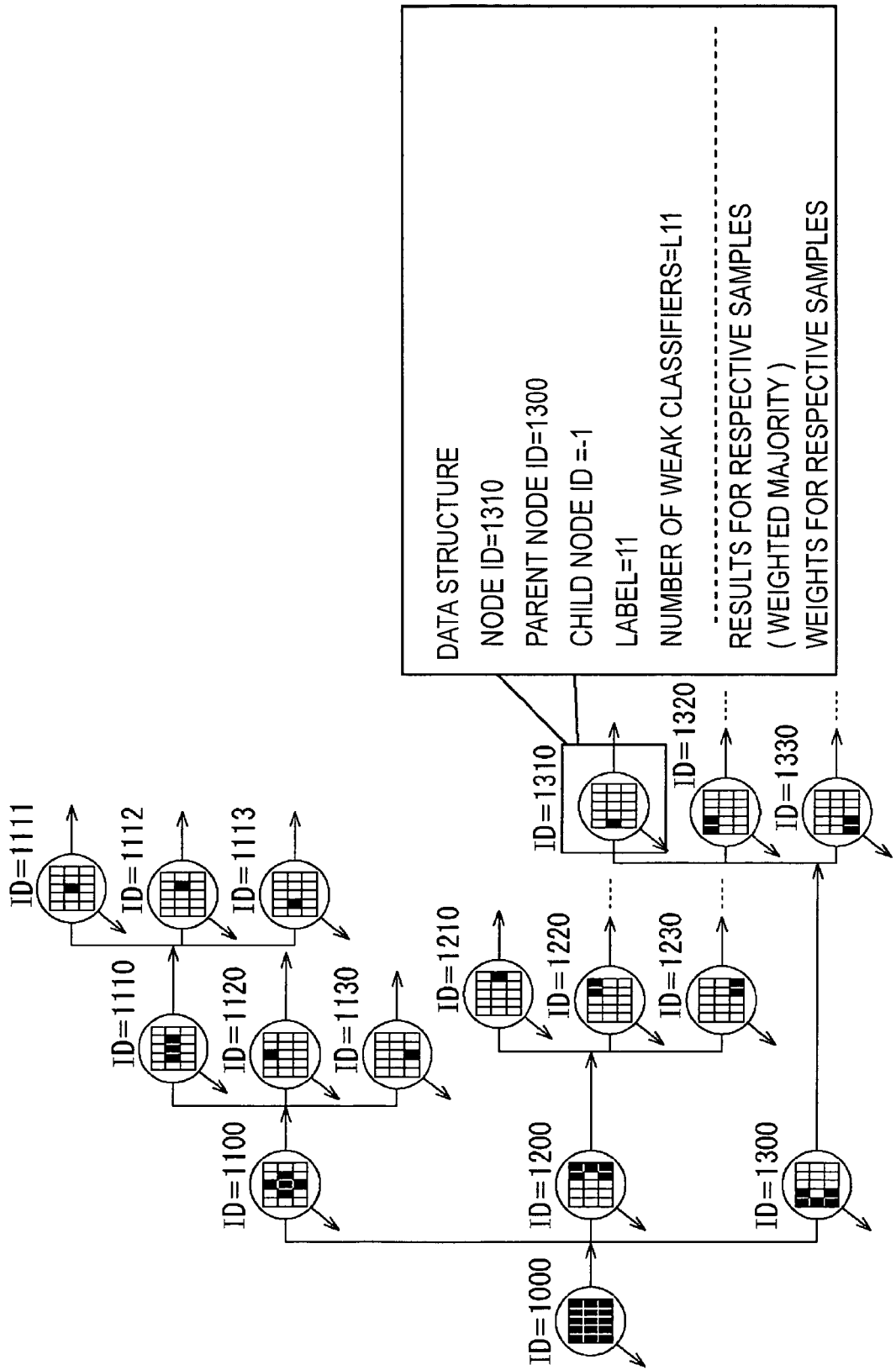
FIG. 26 is a diagram for explaining a data structure of a node.

As shown in FIG. 26, each node has a definition of data structure. A node ID is a number for identifying each node. In the example shown in FIG. 26, the node ID is 1310. A parent node ID represents the node ID of a parent node as viewed from a node in question. The parent node of the node 221-1-3-1 is the node 221-1-3 with a node ID 1300, so that 1300 is written in the section of parent node ID. When no parent node exists, the parent node ID is −1. A child node ID is an ID of a child node. When a plurality of child nodes exists, a plurality of child node IDs is written. Since the node 221-1-3-1 is a terminal node and does not have any child node, −1 is written to the section of child node ID. A label refers to a label of samples to be processed by the node in question, and the label of the node 221-1-3-1 is 11. The number of weak classifiers refers to the number of weak classifiers of the node in question, which is L11 in this example.

Weight for weighted majority and sample weights are written in the data structure.

(6) Learning Method

Next, a method of learning by the ensemble learning machine 6 will be described. In an pattern recognition problem of classifying whether given data corresponds to a face, and which direction the face is looking in when the data corresponds to a face, images that serve as learning samples (training data), manually labeled in advance (i.e., correct classifications are assigned), are prepared. The learning samples include images of regions of objects to be detected (i.e., positive samples), and irrelevant images of regions randomly extracted (i.e., negative samples), such as landscapes.

A learning algorithm is applied based on the learning samples to generate learning data that is used during classification. In this embodiment, the learning data used during classification includes the following four types of data:

(A) K pairs of two pixel positions
(B) K thresholds for weak classifiers
(C) K weights for weighted majority (K confidences for weak classifiers)
(D) K termination thresholds (6-1) Generation of Weak Classifiers Now, an algorithm for learning the four types of learning data (A) to (D) from a large number of learning samples will be described.

Figure 27:
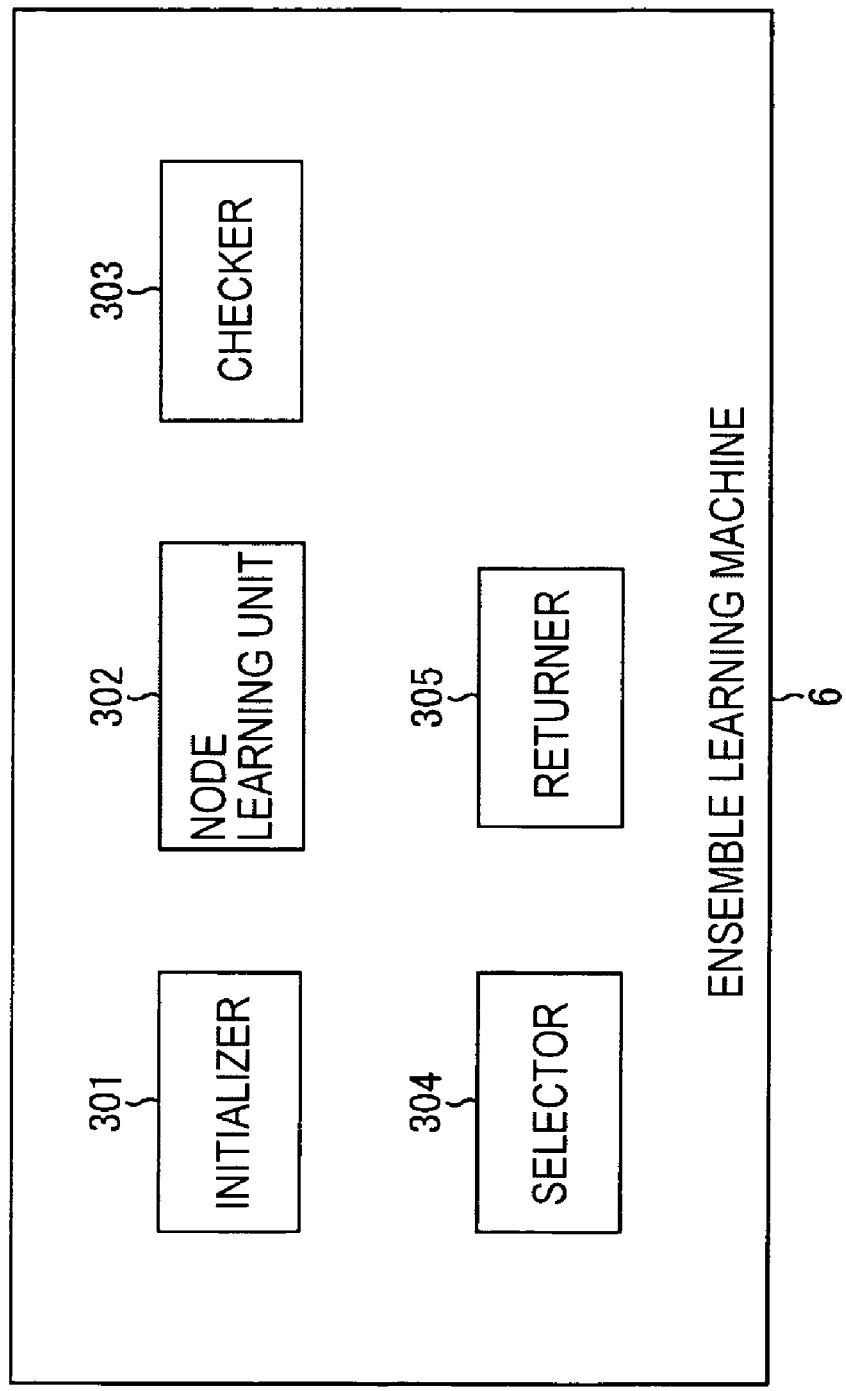
FIG. 27 is a block diagram showing an example of functional construction of an ensemble learning machine.

In order to execute a learning process, the ensemble learning machine 6 is functionally constructed as shown in FIG. 27. Referring to FIG. 27, the ensemble learning machine 6 includes an initializer 301, a node learning unit 302, a checker 303, a selector 304, and a returner 305. These components are allowed to exchange data with each other as needed.

The initializer 301 sets various initial values. The node learning unit executes a learning process of weak classifiers at each node. The checker 303 compares the number of child nodes (size(numChild)) with a branch count (branch_count[i]) described later, checks whether a node ID is positive, and so forth. The selector 304 selects a node to be processed next. The returner 305 executes processing such as returning a node to be processed to a parent node.

Figure 28:
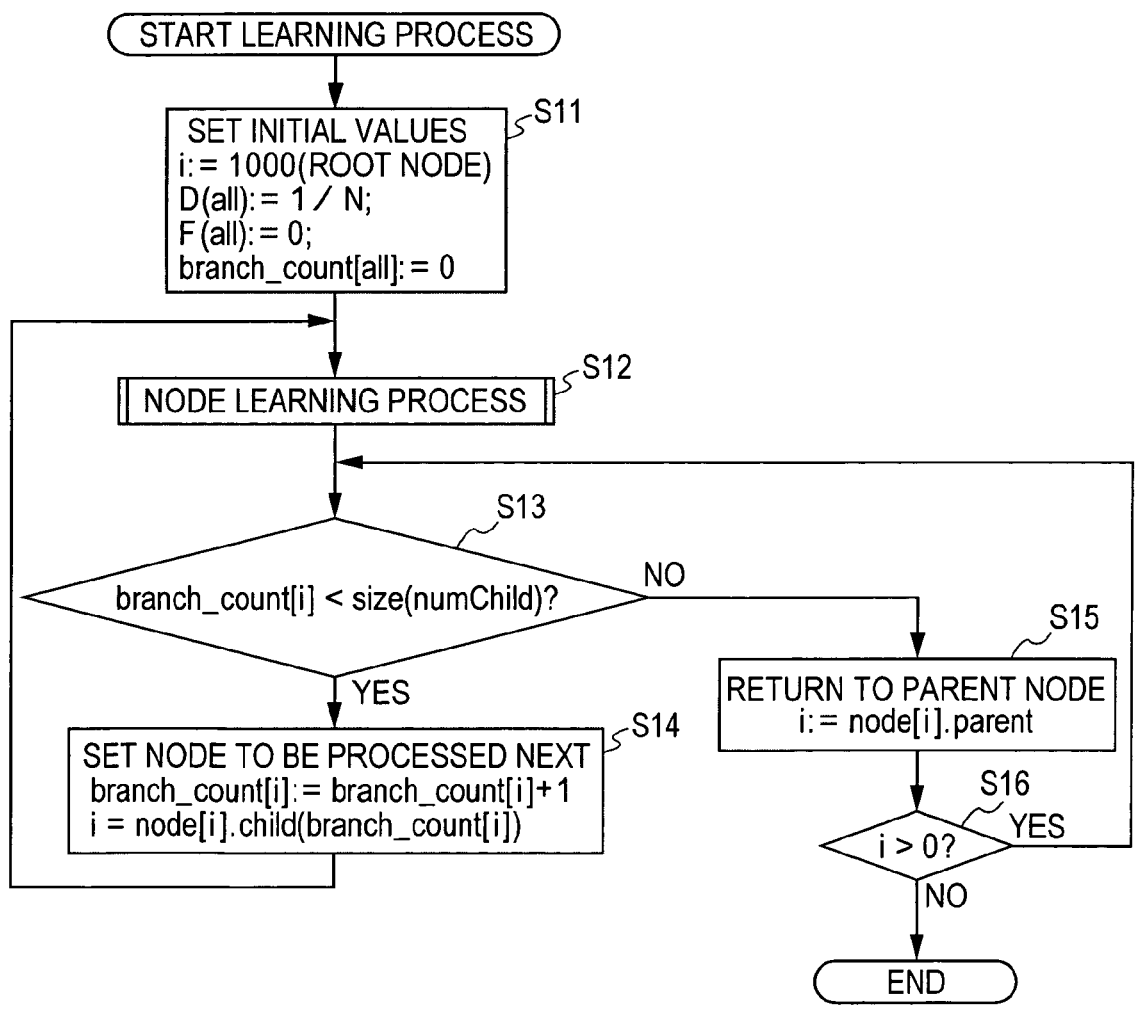
FIG. 28 is a flowchart of a learning process.

FIG. 28 is a flowchart of the method of learning by the ensemble learning machine 6. Although AdaBoost, which is a learning algorithm that uses specific values as thresholds for weak classification, will be described herein, other learning algorithms for performing ensemble learning to combine weak classifiers may be used. For example, Real-AdaBoost, which uses continuous values representing the likelihoods (probabilities) of correct classifications as thresholds, may be used.

As described earlier, first, N learning samples labeled in advance as objects of interest or objects not of interest are prepared.

For example, the learning samples are N images of human faces, each consisting of 24×24 pixels, as shown in FIG. 18. Each of the learning samples is labeled with one of the labels 1 to 15.

In step S11, the initializer 301 sets initial values. More specifically, the initializer 301 sets an ID of an uppermost node (root node) (1000 in the example shown in FIG. 25) to a variable i representing the node ID of a node to be processed. Furthermore, the initializer 301 sets 1/N to data weights $D_t$ of all the data. N denotes the number of samples. Furthermore, the initializer 301 initializes the values F(x) of weighted majority at all the nodes to 0. Furthermore, the initializer 301 sets 0 to a variable branch_count[i] representing the number of times that lower nodes (child nodes) are visited by each node.

In step S12, the node learning unit 302 performs a learning process of a node having an ID set to the current value of the variable i. Although the process will be described later in detail with reference to a flowchart shown in FIG. 30, learning of weak classifiers at the current node of processing is performed. The results of processing at the node are saved so that the results can be inherited by a child node. In this example, since 1000 is set to the variable 1, a learning process of the node 221-1 shown in FIG. 25 is performed.

Then, in step S13, the checker 303 compares the value of the variable branch_count[i] with a variable size(numChild) representing the number of child nodes. When the value of the variable branch_count[i] is less than the number of child nodes, it is indicated that the learning process has not been finished for all the child nodes, so that the process proceeds to step S14. In this case, the value of the variable branch_count[i] is 0 (in step S11) and the node 221-1 with an ID 1000 (i=1000) has three child nodes 221-1-1 to 221-1-3. Thus, step S13 turns out YES, and the process proceeds to step S14.

In step S14, the selector 304 selects a node to be processed next. More specifically, the selector 304 increments by 1 the value of the variable branch_count[i] of the node 221-1 currently being processed (the value becomes 1 in this case), and sets the node ID of a child node represented by the variable branch_count[i] to the variable i representing a node to be processed. For example, an ID 1100 of the node 221-1-1, which is a child node of the node 221-1 currently being processed, is set to the variable i.

Then, the process returns to step S12, and a learning process for a node corresponding to the value set to the variable i is performed. In this example, a learning process for the node 221-1-1 with a node ID 1100 is performed.

Then, in step S13, the checker 303 determines whether the value of the variable branch_count[i] is less than the number of child nodes. In this example, the node being processed is the node 221-1-1 with a node ID 1100, having three child nodes 221-1-1-1 to 221-1-1-3 having node IDs 1110, 1120, and 1130, respectively. Since the variable branch_count[i] of the node 221-1-1 is also initialized to 0 in step S11, it is determined that the value of the variable branch_count[i] is less than the number of child nodes (3), so that the process proceeds to step S14. In step S14, the variable branch_count[i] of the node 221-1-1 is incremented by 1 (the value becomes 1), and a node ID of a child node of the node 221-1-1, represented by the variable branch_count[i] of the node 221-1-1, is set to the variable i. In the example shown in FIG. 25, 1110, which is the node ID of the node 221-1-1-1, which is one of the child nodes of the node 221-1-1 that has been processed, is set to the variable i.

Then, the process returns to step S12, and a learning process for the node 221-1-1-1 corresponding to the ID set to the variable i (1110 in this case) is performed.

Then, in step S13, the number of child nodes of the node 221-1-1-1 currently being processed (in the example shown in FIG. 25, the number of child nodes is 3 since the node 221-1-1-1 has three child nodes 221-1-1-1-1 to 221-1-1-1-3) is compared with the variable branch_count[i] of the node 221-1-1-1. The value of the variable branch_count[i] of the node 221-1-1-1 is initialized to 0 in step S11, so that it is less than the number of child nodes (3). Thus, in step S14, the value of the variable branch_count[i] is incremented by 1 (the value becomes 1). Furthermore, a node ID of a child node of the node 221-1-1-1, represented by the variable branch_count[i] (=1) (e.g., ID 1111 of the node 221-1-1-1-1 in FIG. 25), is set to the variable i. Then, in step S12, a learning process of the node 221-1-1-1 correspond to the ID 1111 set to the variable i is performed.

Then, in step S13, the value (=0) of the variable branch_count[i] of the node 221-1-1-1-1 currently being processed is compared with the number of child nodes thereof. Since the node 221-1-1-1-1 is a terminal node and does not have any child node, the number of child node is 0. Thus, in step S13, since the variable branch_count[i] (=0) is equal to the number of child nodes (=0), it is determined that the variable branch_count[i] is not less than the number of child nodes. Then, in step S15, the returner 305 returns the node to be processed to the parent node. More specifically, the returner 305 sets the ID 1110 of the node 221-1-1-1, which is the parent node of the node 221-1-1-1-1 that is currently being processed. Then, in step S16, the returner 305 determines whether the value of the variable i set in step S15 is greater than 0. Since IDs of nodes other than the uppermost parent node (root node) 221-1 are positive, in this case, step S16 turns out YES. Actually, the ID of the parent node 221-1-1-1 is 1110, which is greater than 0. Thus, the returner 305 returns the process to step S13.

In step S13, the checker 303 determines whether the variable branch_count[i] of the node corresponding to the ID set to the variable i (in this case, the node 221-1-1-1 having an ID 1110) is less than the number of child nodes thereof. Since 1 is set to the variable branch_count[i] of the node 221-1-1-1 in this case and the number of child nodes thereof is 3, it is determined that the variable branch_count[i] is less than the number of child nodes, so that the process proceeds to step S14. In step S14, the selector 304 increments the value of the variable branch_count[i] by 1 (the value becomes 2), and sets the ID of a child node corresponding to the current value of the variable branch_count[i] to the variable i. In this example, the ID 1112 of the node 221-1-1-1-2 is set to the variable i. Then, in step S12, a learning process of the node 221-1-1-1-2 having a node ID 1112 is performed.

In step S13, it is determined whether the variable branch_count[i] (=0) of the node 221-1-1-1-2 currently being processed is less than the number of child nodes thereof. Since the node 221-1-1-1-2 is a terminal node and does not have any child node, so that the number of child nodes is 0. The value of the variable branch_count[i] is also 0. Thus, step S13 turns out NO. Then, in step S15, the returner 305 sets the ID of the parent node to the variable i. That is, the returner 305 sets the ID 1110 of the parent node 221-1-1-1. In step S16, it is determined whether the value of the variable i set in step S15 is greater than 0. In this case, the value is greater than 0, so that the process returns to step S13.

In step S13, the checker 303 determines whether the value of the variable branch_count[i] of the node 221-1-1-1 having an ID 1110, currently being processed, is less than the number of child nodes thereof. In this example, the number of child nodes is 3 and the value of the variable branch_count[i] is 2. Thus, step S13 turns out YES, and the process proceeds to step S14.

In step S14, the selector increments the value of the variable branch_count[i] by 1 (the value becomes 3 in this case), and sets an ID of the child node represented by the value to the variable i. In this case, the ID 1113 of the node 221-1-1-1-3, which is a child node of the node 221-1-1-1, is set to the variable i. Then, in step S12, a learning process of the node 221-1-1-1-3 having the ID 1113 is performed.

In step S13, it is determined whether the value of the variable branch_count[i] of the node 221-1-1-1-3 is less than the number of child nodes thereof. Since the node 221-1-1-1-3 is a terminal node and does not have any child node, the value of the variable branch_count[i] is equal to the number of child nodes, not less than the number of child nodes. Thus, the process proceeds to step S15, in which the returner sets the ID 1110 of the node 221-1-1-1, which is the parent node of the node 221-1-1-1-3 that has been processed, to the variable i. Since the value is greater than 0, the process returns from step S16 to step S13.

In step S13, the checker 303 determines whether the value (=3 in this case) of the variable branch_count[i] of the node 221-1-1-1 is less than the number of child nodes thereof (3 in this case). Since these values are both 3, step S13 turns out NO, and the process proceeds to step S15. In step S15, the returner 305 sets the ID 1100, which is the parent node of the node 221-1-1-1, to the variable i. In step S16, it is determined that the ID set to the variable i is greater than 0, so that the process returns to step S13.

In step S13, the checker 303 determines whether the value=1) of the variable branch_count[i] of the node 221-1-1 is less than the number of child nodes thereof. The number of child nodes is 3, which is greater than the value 1 of the variable branch_count[i]. Thus, the process proceeds to step S14, in which the variable i in the variable branch_count[i] is incremented by 1 (the value becomes 2). Then, an ID of a child node corresponding to the value 2 is set to the variable i. In this case, the ID 1130 of the node 221-1-1-2, which is a child node of the node 221-1-1, is set to the variable i. Then, in step S12, a learning process of the node 221-1-1-2 is performed.

Similarly, when learning has proceeded to a terminal node, learning returns to the parent node, and learning of sibling nodes is performed. When learning of all the sibling nodes has been finished, learning returns to an even upper parent node, and learning for sibling nodes is performed. This process is sequentially repeated.

In the example shown in FIG. 25, when learning of the final node 221-1-3-3-2 has been performed in step S12, in step S13, it is determined that the value of the variable branch_count[i] thereof is not less than the number of child nodes thereof. In step S15, the ID of the parent node, i.e., the ID 1330 of the node 221-1-3-3, is set to the variable i. Since the value is greater than 0, the process returns from step S16 to S13, in which it is determined that the value (=2) of the variable branch_count[i] of the node 221-1-3-3 is not less than the number of child nodes (=2) thereof. Then, the process proceeds to step S15, in which the ID 1300, which is the ID of the parent node 221-1-3 of the node 221-1-3-3, is set to the variable i.

Since the ID 1300 is greater than 0, the process returns from step S16 to step S13, in which it is determined that the value (=3) of the variable branch_count[i] of the node 221-1-3 is not less than the number of child nodes (=3) thereof. The process then proceeds to step S15, in which the ID 1000 of the parent node 221-1 of the node 221-1-3 is set to the variable i. Since it is determined in step S16 that the value is greater than 0, the process returns to step S13. Then, it is determined that the value (=3) of the variable branch_count[i] of the node 221-1 is not less than the number of child nodes thereof (=3). Then, in step S15, the ID of the parent node is set to the variable i. The node 221-1 is the uppermost node (root node), and an even upper parent node does not actually exist, so that −1 is set to the parent node. Since −1 is set to the variable i in step S15, it is determined in step S16 that the variable i (=−1) is not greater than 0. Then, the process is exited.

In this manner, weak classifiers of the nodes arranged in the tree structure are learned.

Figure 29:
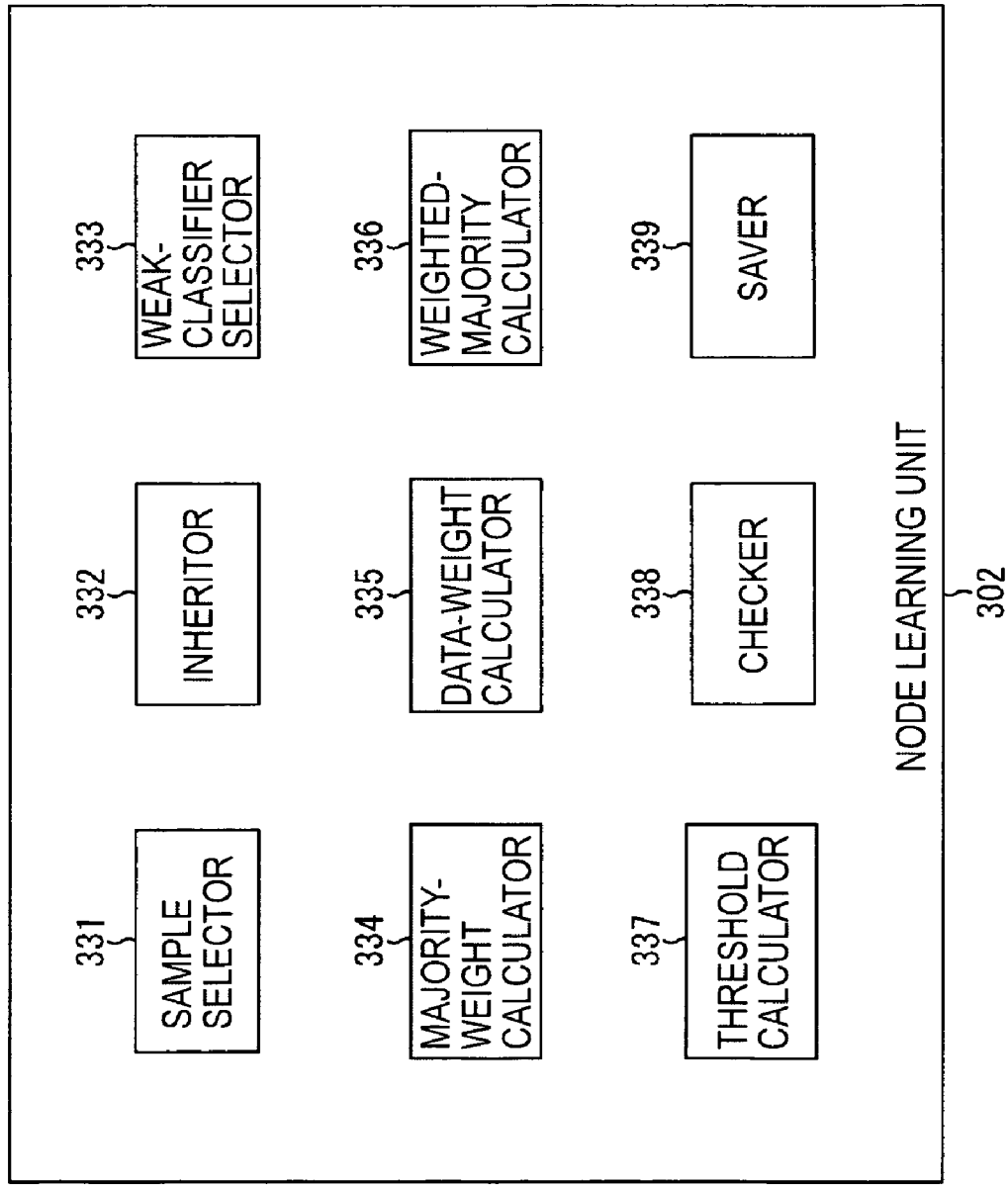
FIG. 29 is a block diagram showing an example of functional construction of a node learning unit.

Next, the node learning process in step S12 shown in FIG. 28 will be described in detail. In order to execute the process, the node learning unit 302 shown in FIG. 27 is constructed as shown in FIG. 29. More specifically, the node learning unit 302 includes a sample selector 331, an inheritor 332, a weak-classifier selector 333, a majority-weight calculator 334, a data-weight updater 335, a weighted-majority calculator 336, a threshold calculator 337, a checker 338, and a saver 339.

The sample selector 331 selects positive samples and negative samples needed for node learning. The inheritor 332 inherits values saved by a previous node as initial values for processing of a subsequent node. The weak-classifier selector 333 selects a weak classifier based on data weights $D_t$. The majority-weight calculator 334 calculates majority weights $\alpha_t$.

The data-weight updater 335 updates the data weights $D_t$. The weighted-majority calculator 336 calculates a value of weighted majority by accumulating results of weighting outputs of the respective weak classifiers by the majority weights $\alpha_t$. More specifically, the weighted-majority calculator 336 calculates expression (7) given earlier. The threshold calculator 337 calculates a termination threshold (reference value $R_M$) according to expression (8). The checker 338 checks whether the value of weighted majority has become less than the termination threshold $R_M$ calculated by the threshold calculator 337, whether learning process has been finished for all the weak classifiers at a node in question, and so forth. The saver 339 saves the value F(x) of weighted majority and the data weights $D_t$ as results of classification (outputs of the node) by the last weak classifier at the node.

Next, the node learning process will be described with reference to a flowchart shown in FIG. 30. First, in step S41, the sample selector 331 selects positive samples with labels to be learned at the node. For example, in the case of a learning process of the node 221-1 shown in FIG. 25, positive samples of all the labels 1 to 15 are selected. On the other hand, in a learning process of the node 221-1-1-1-1, only positive samples with the label 1 are selected. Negative samples are all used in any case.

In step S42, the inheritor 332 inherits the outputs of the parent node. In the case of the uppermost parent node 221-1, since no parent node thereof exists, the value F(x) of weighted majority is initialized to 0, and 1/N (N denotes the number of learning samples) is set to the values of the data weights $D_t$. In the case of a node having a parent node, in step S49 for the parent node, described later, the value F(x) of weighted majority and the data weights $D_t$ saved by the saver 339 are read and set as initial values.

When the outputs of the parent node are inherited, the data weights $D_t$ are normalized so as to sum up to 1.

Then, in step S43, the weak-classifier selector 333 selects a weak classifier. Although the process will be described in detail with reference to a flowchart shown in FIG. 32, a weak classifier that minimizes the value of weighted error ratio $e_t$ among K (the number of inter-pixel difference features d) weak classifiers is selected (generated). In step S44, the majority-weight calculator 334 calculates the majority weights $\alpha_t$ according to expression (10) below:

$$\alpha_t = \frac{1}{2}\ln\left(\frac{1-e_t}{e_t}\right) \qquad (9)$$

As is apparent from expression (10) above, the confidence $\alpha_t$ of the weak classifier increases as the weighted error ratio $e_t$ decreases.

In step S45, the data-weight updater 335 updates the data weights $D_{t,i}$ of the learning samples using the confidences $\alpha_t$ calculated according to expression (9), according to expression (10) below. Usually, the data weights $D_{t,i}$ must be normalized so as to sum up to 1. Thus, the data weights $D_{t,i}$ are normalized according to expression (11) below.

$$D_{t+1,i} = D_{t,i}\exp(-\alpha_t y_i f_t(x_i)) \qquad (10)$$

$$D_{t+1,i} = \frac{D_{t+1,i}}{\Sigma_i D_{t+1}} \qquad (11)$$

In step S446, the weighted-majority calculator 336 updates the value F(x) of weighted majority according to expression (7). The value at of the weighted majority is calculated in step S44, and the value of $f_t(x)$ is calculated in step S43.

Then, in step S47, the threshold calculator 337 calculates a termination threshold $R_M$ according to expression (8). The termination threshold $R_M$ is used in step S175 described later with reference to FIG. 37.

In step S48, the checker 338 determines whether learning of all the weak classifiers has been finished when the node currently being processed has a child node. When the node does not have any child node, it is determined whether the value of weighted error ratio $e_t$ calculated in step S43 has been sufficiently reduced. When the node has a child node, in this embodiment, the number of weak classifiers is chosen to be 100 as described earlier. Thus, when learning of the 100 weak classifiers has not been finished, the process returns to step S43, and subsequent steps are repeated. When the node is a terminal node, the process is repeated until the weighted error ratio $e_t$ is sufficiently reduced. More specifically, it is determined that the weighted error ratio $e_t$ is sufficiently reduced when the weighted error ratio $e_t$ becomes less than or equal to 0. When the weighted error ratio $e_t$ is not sufficiently reduced, the process returns to step S43, and subsequent steps are repeated. That is, steps S43 to S48 are iterated a number of times corresponding to the number of weak classifiers at the node in question.

When it is determined in step S48 that learning of all the weak classifiers has been finished, the process proceeds to step S49, in which the saver 339 saves, as outputs, the value F(x) of weighted majority obtained by classification by the last classifier and the values of the data weights $D_t$. The outputs saved are inherited in step S42 by a lower child node as initial values.

Figure 30:
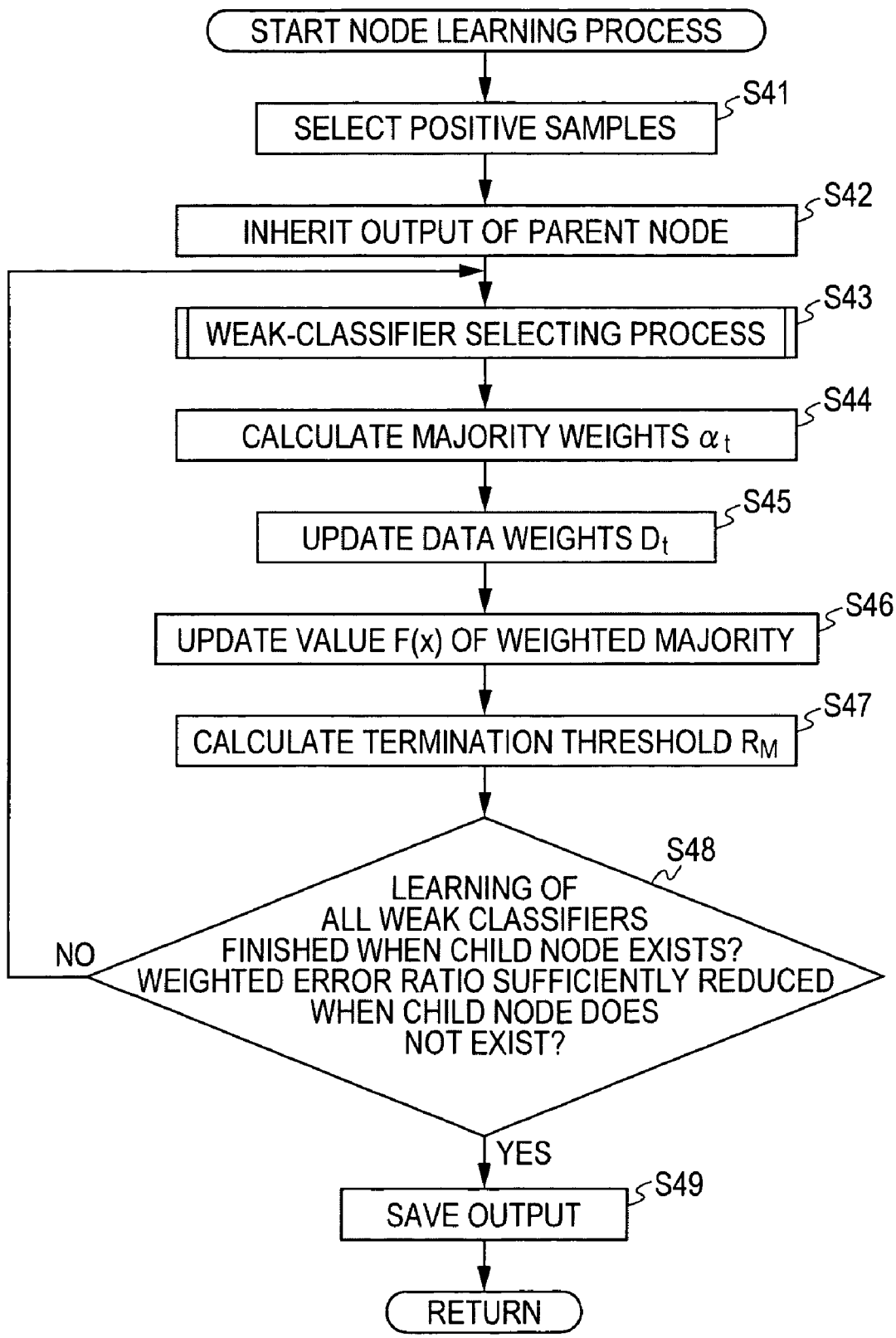
FIG. 30 is a flowchart of a node learning process in step S12 shown in FIG. 28.

In this manner, the process shown in FIG. 30 is executed for each node in step S12 shown in FIG. 28.

(6-2) Generation of Weak Classifiers

Next, the weak-classifier selecting process in step S43 in the flowchart shown in FIG. 30 will be described. The method of generating weak classifiers differ between a case where weak classifiers output binary values and a case where weak classifiers output continuous values represented by the function f(x) expressed by expression (6) given earlier. Furthermore, in the case of binary outputs, the method slightly differs between a case where classification is based on the single threshold $Th_1$ as expressed in expression (3) and a case where classification is based on two thresholds $Th_{11}$ and $Th_{12}$ or $Th_{21}$ and $Th_{22}$ as expressed in expression (4) or (5). The following description deals with a method of learning (generating) weak classifiers that output binary values based on the single threshold $Th_1$.

Figure 31:
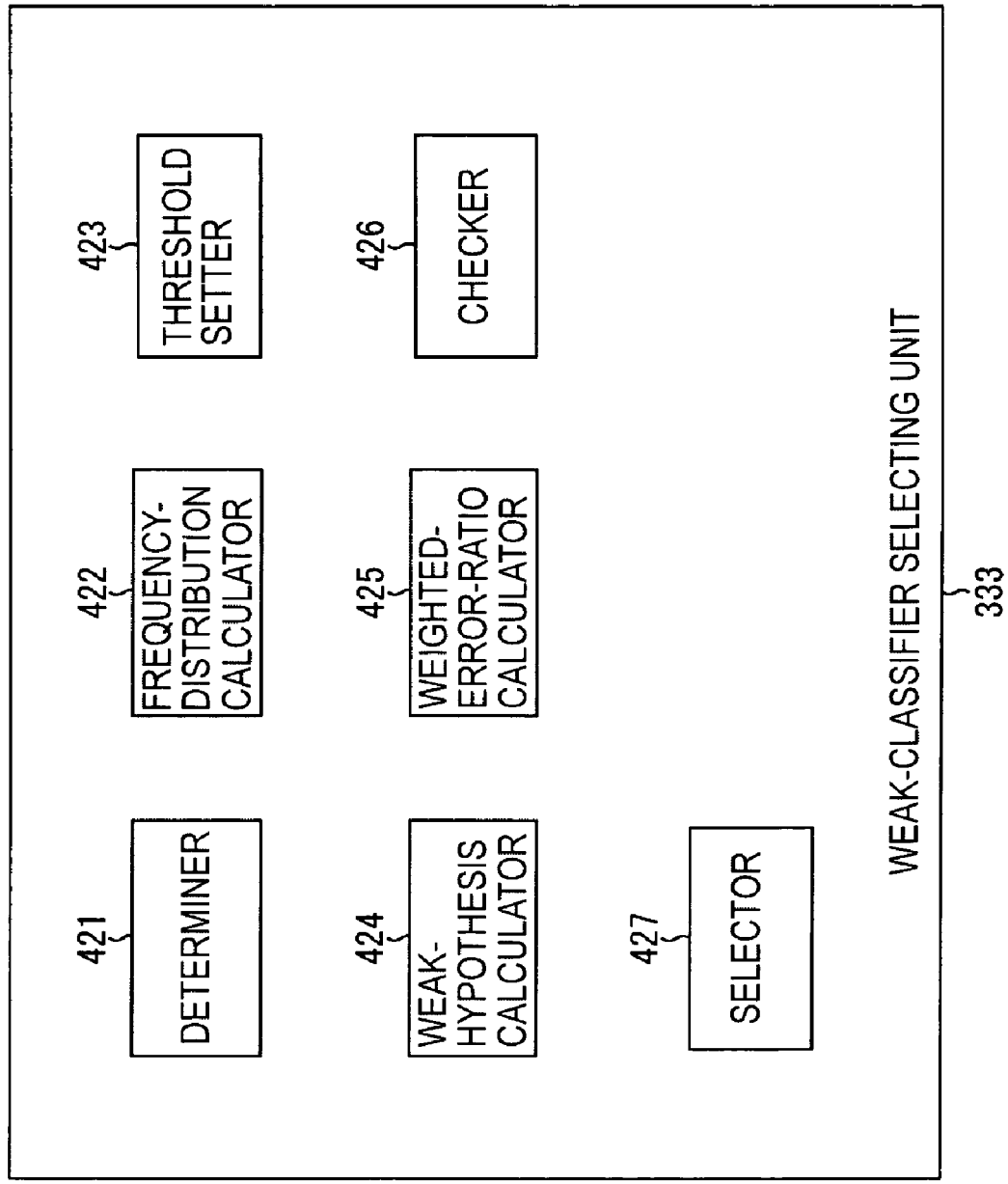
FIG. 31 is a block diagram showing an example of functional construction of a weak-classifier selecting unit.

As shown in FIG. 31, the weak-classifier selecting unit 333 includes a determiner 421, a frequency-distribution calculator 422, a threshold setter 423, a weak-hypothesis calculator 424, a weighted-error-ratio calculator 425, a checker 426, and a selector 427.

The determiner 421 randomly determines two pixels from an input learning sample. The frequency-distribution calculator 422 collects inter-pixel difference features d for pairs of pixels determined by the determiner 421, obtaining a frequency distribution thereof. The threshold setter 423 sets thresholds for weak classifiers. The weak-hypothesis calculator 424 calculates weak hypotheses by weak classifiers, outputting classification results f(x).

The weighted-error-ratio calculator 425 calculates the weighted error ratio $e_t$ expressed in expression (12) below:

$$e_t = \sum_{i: f_t(x_i) \neq y_i} D_{t,i} \quad (12)$$

As expressed in expression (12) above, the weighted error ratio $e_t$ is a sum of data weights of learning samples that are misclassified by the weak classifier ($f_t(x_i) \neq y_i$), i.e., learning samples labeled as $y_i=1$ and classified as $f_t(x_i)=-1$ and learning samples labeled as $y_i=-1$ and classified as $f_t(x_i)=1$. The weighted error ratio et increases when the classifier misclassifies a learning sample having a large data weight $D_{t,i}$, i.e., a learning sample that is difficult to classify.

The checker 426 compares the thresholds Th of weak classifiers and the inter-pixel difference features d. The selector 427 selects a weak classifier associated with a threshold Th associated with a smallest weighted error ratio $e_t$.

FIG. 32 is a flowchart of the method in step S43 of learning (generating) weak classifiers that output binary values based on the single threshold $Th_1$.

In step S71, the determiner 421 randomly determines positions S1 and S2 of two pixels in a learning sample consisting of 24×24 pixels. When a learning sample consists of 24×24 pixels, the number of possible pairs of two pixels is 576×575, and one of the pairs is selected. The positions of the two pixels will be denoted by S1 and S2, and the luminance values thereof by $I_1$ and $I_2$, respectively.

In step S72, the frequency-distribution calculator 422 calculates inter-pixel difference features for all the learning samples, and obtains a frequency distribution thereof. That is, the frequency-distribution calculator 422 calculates an inter-pixel difference feature d representing the difference ($I_1-I_2$) between the luminance values $I_1$ and $I_2$ of the pixels at the two positions S1 and S2 selected in step S71 for each of the N learning samples, obtaining a histogram (frequency distribution) shown in FIG. 11A.

Figure 33:
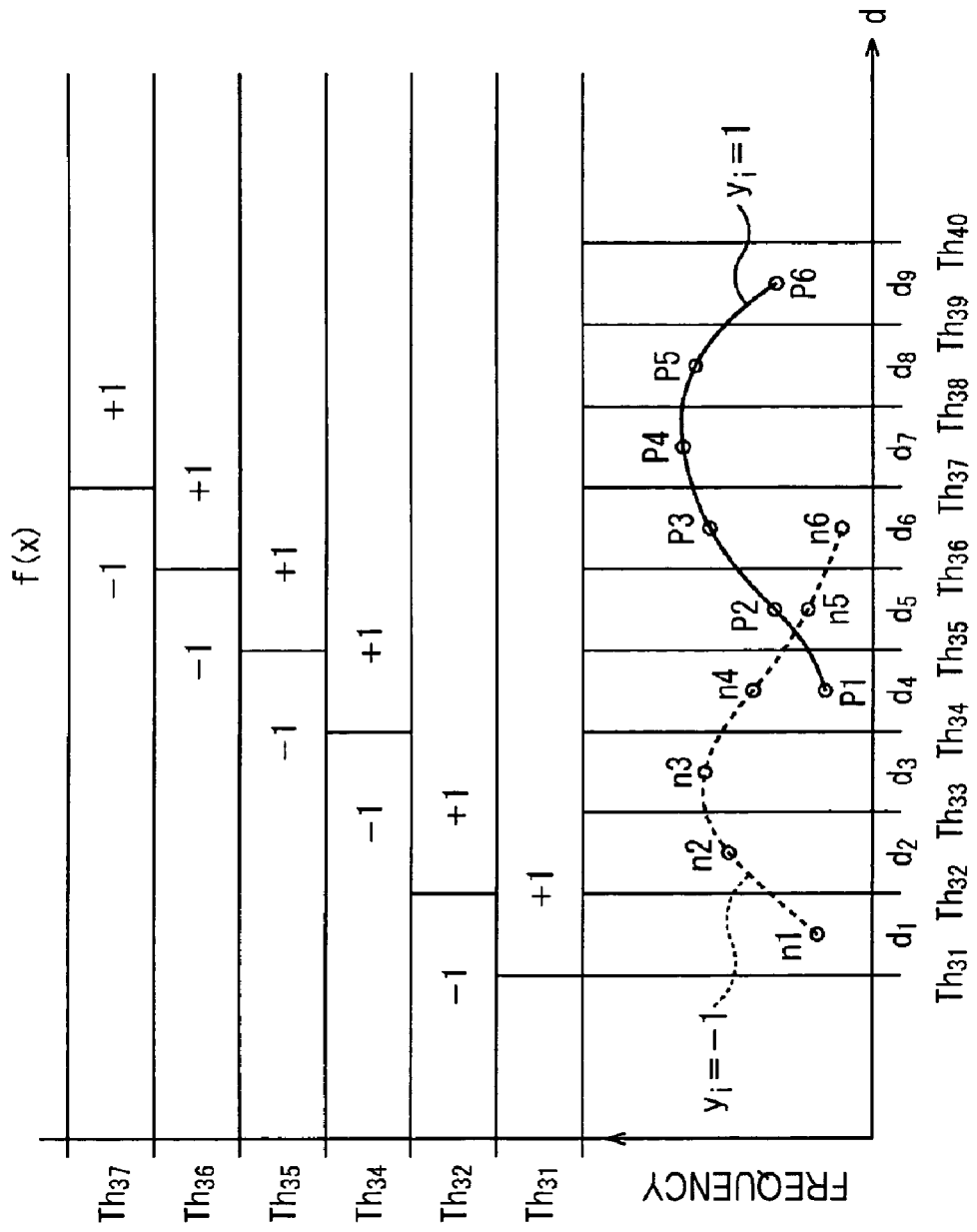
FIG. 33 is a diagram for explaining change in threshold.
Figure 34:
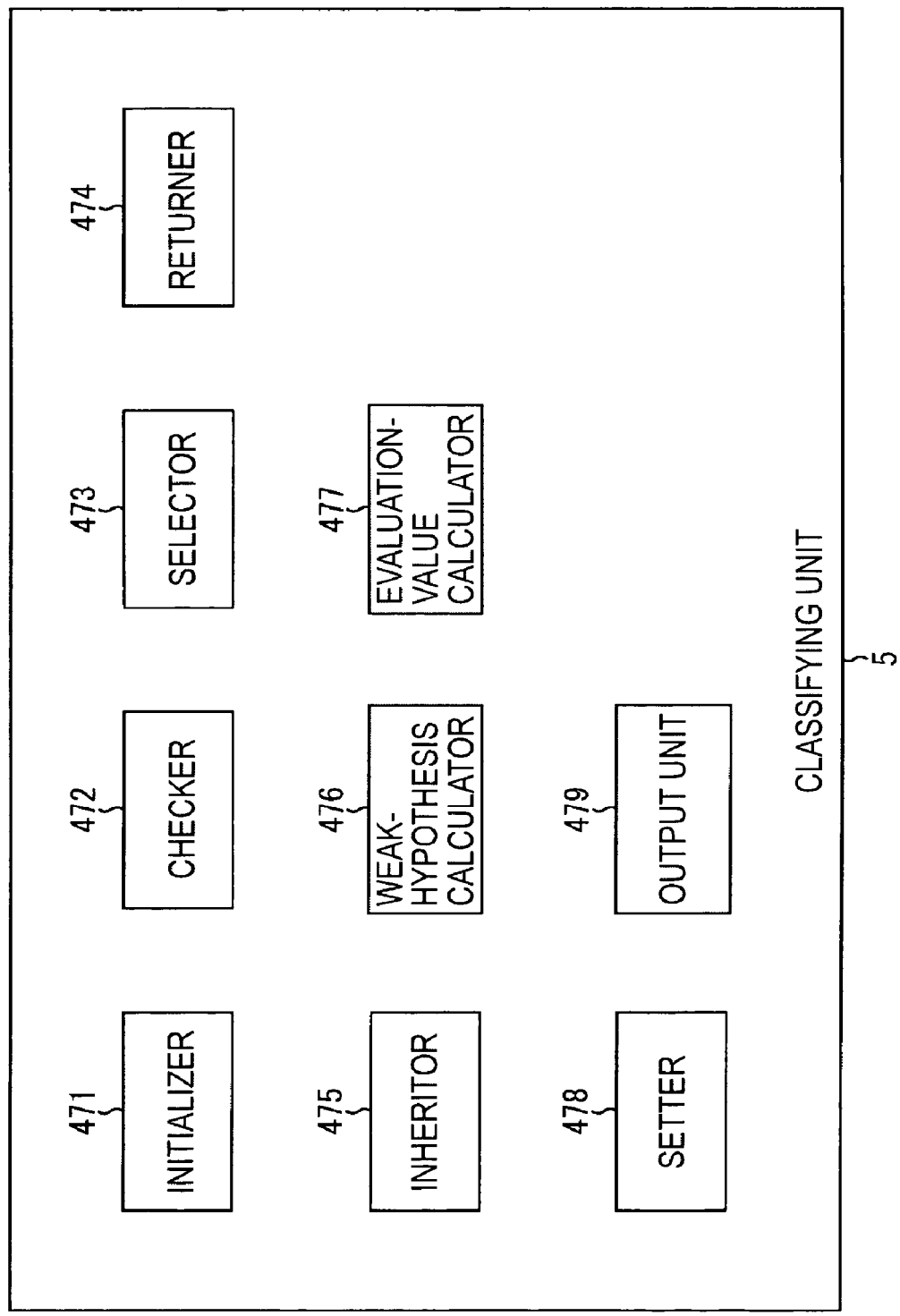
FIG. 34 is a block diagram showing an example of functional construction of a classification unit.

In step S73, the threshold setter 423 sets a threshold Th that is less than the smallest inter-pixel difference feature d. For example, when the values of inter-pixel difference features d are distributed between d1 and d9 as shown in FIG. 33, the value of the smallest inter-pixel difference feature d is d1. Thus, the threshold setter 423 sets a threshold $Th_{31}$ that is less than the inter-pixel difference feature d1 as the threshold Th.

Then, in step S74, the weak-hypothesis calculator 424 calculates a weak hypothesis according to expression (13) below, where sign(A) is a function that outputs +1 when the value A is positive while outputting −1 when the value A is negative:

$$f(x) = \text{sign}(d - Th) \quad (13)$$

In this case, since $Th=Th_{31}$, irrespective of which of d1 to d9 the value of the inter-pixel difference feature d is, the value of (d−Th) is positive. Thus, the result f(x) of classification according to the weak hypothesis, expressed by expression (13), is +1.

In step S75, the weighted-error-ratio calculator 425 calculates weighted error ratios $e_t1$ and $e_t2$. The weighted error ratios $e_t1$ and $e_t2$ have the relationship expressed in expression (14) below:

$$e_t2 = 1 - e_t1 \quad (14)$$

The weighted error ratio $e_t1$ is calculated according to expression (12). The weighted error ratio $e_t1$ is a weighted error ratio in a case where $I_1$ and $I_2$ are the pixel values at the positions S1 and S2, respectively. The weighted error ratio $e_t2$ is a weighted error ratio in a case where $I_2$ is the pixel value at the position S1 and $I_1$ is the pixel value at the position S2. That is, a combination of a first position as position S1 and a second position as position S2 differs from a combination of the first position as position S2 and the second position as position S1. Still, however, the values of the weighted error ratios $e_t1$ and $e_t2$ have the relationship expressed in expression (14). Thus, in step S35, the weighted error ratios $e_t$ of two combinations are calculated together. If otherwise, K iterations of steps S71 to S81 must be performed (where K denotes the number of all possible pairs of two pixels that can be extracted from the learning sample). In contrast, by calculating two weighted error ratios $e_t1$ and $e_t2$ in step S75, the number of iterations is reduced to one half of the number K of all possible combinations.

In step S76, the weighted-error-ratio calculator 425 selects smaller one of the weighted error ratios $e_t1$ and $e_t2$ calculated in step S75.

In step S77, the checker 426 checks whether the threshold is greater than the greatest inter-pixel difference feature. That is, the checker 126 checks whether the current threshold Th is greater than the greatest inter-pixel difference feature d (d9 in the example shown in FIG. 33). In this case, since the threshold Th is the threshold $Th_{31}$ shown in FIG. 33, it is determined that the threshold Th is less than the greatest inter-pixel difference feature d9. Then, the process proceeds to step S78.

In step S78, the threshold setter 423 sets a threshold Th having an intermediate value between an inter-pixel difference feature that is closest to the current threshold and an inter-pixel difference feature that is next closest to the current threshold. In the example shown in FIG. 33, an intermediate value $Th_{32}$ between the inter-pixel difference feature d1, which is closest to the current threshold $Th_{31}$, and the inter-pixel difference feature d2, which is next closest, is set.

Then, the process proceeds to step S74, in which the weak-hypothesis calculator 424 calculates an output f(x) of classification by the weak hypothesis according to expression (13) given earlier. In this case, the value of f(x) is +1 when the value of inter-pixel difference feature d is between d2 to d9, and the value of f(x) is −1 when the value of inter-pixel difference feature d is d1.

In step S75, the weighted error ratio $e_t 1$ is calculated according to expression (12), and the weighted error ratio $e_t 2$ is calculated according to expression (14). Then, in step S76, the smaller one of the weighted error ratios $e_t 1$ and $e_t 2$ is selected.

In step S77, it is determined again whether the threshold is greater than the greatest inter-pixel difference feature. In this case, since the threshold $Th_{32}$ is less than the greatest inter-pixel difference feature d9, the process proceeds to step S78, in which a threshold $Th_{33}$ between the inter-pixel difference features d2 and d3 is set as the threshold Th.

In this manner, the threshold Th is progressively updated to larger values. In step S74, for example, when the threshold Th is a threshold $Th_{34}$ between inter-pixel difference features d3 and d4, +1 is output if the value of the inter-pixel difference feature d is greater than or equal to d4, while outputting −1 if the value is less than or equal to d3. Similarly, the result f(x) of classification by the weak hypothesis is +1 when the value of the inter-pixel difference feature d is greater than or equal to the threshold $Th_t$ and the result f(x) is otherwise −1.

The process described above is repeated until it is determined in step S77 that the threshold Th is greater than the greatest inter-pixel difference feature. In the example shown in FIG. 33, the process is repeated until the threshold reaches a value $Th_{40}$ that is greater than the largest inter-pixel difference feature d9. That is, by iterating steps S74 to S78, weighted error ratios $e_t$ for respective values of the threshold Th are calculated for a pair of pixels selected. In step S79, the selector 427 selects the smallest weighted error ratio from the weighted error ratios $e_t$ that have been calculated. In step S80, the selector 427 selects a threshold associated with the smallest weighted error ratio as a threshold for the current weak hypothesis. That is, a threshold $Th_t$ associated with the smallest weighted error ratio $e_t$ selected in step S79 is selected as a threshold for the weak classifier (the weak classifier generated based on the pair of pixels).

In step S81, the checker 426 checks whether the process has been iterated for all the pairs of pixels. When the process has not been iterated for all the pairs of pixels, the process returns to step S71, and subsequent steps are repeated. That is, positions S1 and S2 of two pixels are determined randomly (but different from the positions previously selected), and the same process is executed for the luminance values $I_1$ and $I_2$ at the positions S1 and S2.

The process described above is repeated until it is determined that K iterations have been finished, K being the number of all possible pairs of two pixels that can be extracted from the learning sample. However, in this embodiment, as described earlier, the process is essentially executed in step S75 for the case where the positions S1 and S2 are reversed, one half of the number K of all pairs suffices in step S81.

When it is determined in step S81 that the process has been finished for all pairs, in step S82, the selector 427 selects a weak classifier associated with the smallest weighted error ratio among the weak classifiers generated. That is, by the process described above, one of the K weak classifiers (e.g., the weak classifier $21_1$ in FIG. 9) is learned and generated.

Then, the process returns to step S43 in FIG. 30, and subsequent steps are executed. The process shown in FIG. 30 is repeated until it is determined in step S48 that learning of all classifiers has been finished when a child node exists, or it is determined that the weighted error ratio has been sufficiently reduced when a child node does not exist. That is, in the second iteration of the process shown in FIG. 30, the weak classifier $21_2$ shown in FIG. 9 is generated by learning, and in the third iteration of the process shown in FIG. 30, the weak classifier $21_3$ shown in FIG. 9 is generated by learning. Similarly, in the K-th iteration of the process shown in FIG. 30, the weak classifier $21_K$ shown in FIG. 9 is generated by learning.

Although the embodiment has been described above in the context of an example where a weak classifier is generated by learning features of a plurality of weak classifiers using data weights $D_{t,i}$ obtained in step S45 of a previous iteration and selecting one of the weak classifiers associated with the smallest weighted error ratio $e_t$ according to expression (12). Alternatively, however, in step S43 described earlier, for example, a weak classifier may be generated by selecting arbitrary pixel positions from a plurality of pixel positions prepared or learned in advance. Yet alternatively, a weak classifier may be generated using learning samples that are different from learning samples used for the iterations of steps S71 to S81 described earlier. Yet alternatively, a weak classifier or a classifier generated may be evaluated using samples that are different from learning samples, as in cross validation or the jack-knife method. In cross validation, learning samples are uniformly divided into I units, learning is performed using the units other than one unit, and results of learning is evaluated using the one unit, and this process is repeated I times.

When a weak classifier performs classification based on two thresholds $Th_{11}$ and $Th_{12}$ or $Th_{21}$ and $Th_{22}$ as expressed in expression (4) or expression (5), processing in steps S74 to S78 shown in FIG. 32 slightly differs. When only one threshold Th is used as expressed in expression (3), it is possible to calculate a weighted error ratio $e_t$ by subtraction from 1. In contrast, when a correct classification is indicated by an inter-pixel difference feature that is greater than the threshold $Th_{12}$ and is less than the threshold $Th_{11}$ as expressed in expression (4), by subtraction from 1, it is understood that a correct classification is indicated when the inter-pixel difference feature is less than the threshold $Th_{22}$ or when the inter-pixel difference feature is greater than the threshold $Th_{21}$ as expressed in expression (5). That is, the inversion of expression (4) is expression (5), and the inversion of expression (5) is expression (4).

When a weak classifier outputs a classification result based on the two thresholds $Th_{11}$ and $Th_{12}$ or $Th_{21}$ and $Th_{22}$, in step S72 shown in FIG. 32, the frequency distribution of inter-pixel difference features is obtained, and values of the thresholds $Th_{11}$ and $Th_{12}$ or $Th_{21}$ and $Th_{22}$ that minimize the weighted error ratio $e_t$ are calculated. Then, in step S81, it is determined whether the predetermined number of iterations has been finished. Thus, a weak classifier associated with the smallest error ratio among the weak classifiers generated by the predetermined number of iterations is adopted.

When the weak classifier outputs continuous values as expressed in expression (6) given earlier, similarly to step S71 in FIG. 32, first, two pixels are selected randomly. Then, similarly to step S32, the frequency distribution for all the leaning samples is obtained. Furthermore, the function f(x) expressed in expression (6) is calculated based on the frequency distribution obtained. Then, a process for calculating a weighted error ratio according to a predetermined learning algorithm that outputs the likelihood of being an object of interest (positive sample) is iterated a predetermined number of times, and a parameter that minimizes error ratio (that maximizes correct classification ratio) is selected, whereby a weak classifier is generated.

In the process of generating a weak classifier, shown in FIG. 32, for example, when learning samples each consisting of 24×24 pixels are used, the number of possible pairs of two pixels is 331,200 (=576×575). Thus, a weak classifier that minimizes error ratio among weak classifier generated by a maximum of 331,200 iterations can be adopted. As described above, a weak classifier having a high ability can be generated by adopting a weak classifier that minimizes error ratio among a maximum number of weak classifiers generated by a maximum number of iterations. Alternatively, however, a weak classifier that minimizes error ratio may be adopted from weak classifiers generated by a number of iterations that is less than the maximum number of iterations, e.g., several hundred iterations.

(6) Method of Detecting Object of Interest

Next, a method of detecting an object of interest by the object detecting apparatus 1 shown in FIG. 5 will be described.

In order to carry out the method, the classification unit 5 includes an initializer 471, a checker 472, a selector 473, a returner 474, an inheritor 475, a weak-hypothesis calculator 476, an evaluation-value calculator 477, a setter 478, and an output unit 479.

The initializer 471 sets initial values of weak classifiers of the uppermost node. The checker 472 checks whether a next scaling image is to be scanned, whether regions of objects of interest overlap each other, whether an image corresponds to a face, whether a child node exists, whether the variable branch_count[i] is less than the number of child nodes, whether the variable i is positive, and so forth.

The selector 473 extracts two overlapping region and selects one of the regions. The returner 474 returns the node to be processed to a parent node. The inheritor 475 inherits outputs of a parent node. The weak-hypothesis calculator 476 calculates a weak hypothesis according to expression (13). The evaluation-value calculator 477 calculates an evaluation value s according to expression (7).

The setter 478 set a maximum value to the evaluation value s. The output unit 479 outputs the evaluation value s.

The initializer 471 to the output unit 479 are allowed to exchange data with each other as needed.

In a detection process (classification process), the classification unit 5 constructed of the set of weak classifiers generated in the learning process as described above is used to detect an object of interest (human face) from an image according to a predetermined algorithm. This process will be described with reference to a flowchart shown in FIG. 35.

In step S101, the scaling unit 3 reduces the scale of a grayscale image input from the image output unit 2 by a specified ratio.

The image output unit 2 may receive input of a grayscale image directly, or an input color image may be converted into a grayscale image in the image output unit 2. The scaling unit 3 first outputs an image given by the image output unit 2 as it is without scaling it, and outputs images of reduced scales at subsequent timings. For the convenience of description, all images output from the scaling unit 3 will be referred to as scaled images. A scaled image is generated at a timing when face detection in all regions of a previously output scaled image is finished. When a scaling image becomes smaller than a window image, processing of a next frame of input image is started.

In step S102, the scanning unit 4 scans the input scaled image using a search window to cut out an image. That is, the scanning unit 4 locates a search window at a specified position on the scaled image to cut out an image in the window as a window image, outputting the window image to the classification unit 5.

In step S103, the classification unit 5 executes a discrimination process. Although the discrimination process will be described later in detail with reference to a flowchart shown in FIG. 36, classification is performed as to whether an image in the search window corresponds to a human face, and which direction the face is looking when the image corresponds to a human face (which of the labels 1 to 15).

In step S104, the checker 472 determines whether another search window is to be applied. When another search window is to be applied, the process returns to step S102, in which the scanning unit 4 shifts the search window of the current scaled image by one pixel to the right, and cuts out an image defined by the search window shifted, outputting the image to the classification unit 5. Then, the classification unit 5 executes step S103 to determine which label of human face image the window image corresponds to.

As described above, the search window is sequentially shifted by one pixel rightward or downward as shown in FIG. 7, determining which label of human face image the image in the search window at each position corresponds. When the position of the search window has reached the bottom right of the scaled image, in step S104, it is determined that another search window to be applied does not exist. Then, the process proceeds to step S105.

In step S105, the scaling unit 3 determines whether another scaled image is to be scanned. When another scaled image is to be scanned, in step S61, the scaling unit 3 generates a scaled image at a further reduction ratio (i.e., reduced further), outputting the scaled image to the scanning unit 4. Then, the same process described above is executed for the scaled image.

The process described above is executed until it is determined in step S105 that no further scaled image is to be scanned. That is, the process described above is repeated until a scaled image becomes smaller than a window image.

As described earlier, the search window is sequentially shifted by one pixel rightward or downward. Thus, for example, when an image in a search window is determined as corresponding to a human face, an image in a window that is shifted by one pixel rightward or downward is usually determined as corresponding to a human face. Thus, an image of the same face is detected as corresponding to a human face in a plurality of window images. Thus, when processing of all the scaled images has been finished, a process for removing overlapping of search windows is executed.

Thus, in step S106, the checker 472 determines whether two or more regions of objects of interest overlap each other. When two or more regions of objects of interest overlap each other, in step S107, the selector 473 executes a process for extracting the two overlapping regions. For example, when it is determined that an image of a search window is obtained in a region of an object of interest, it is usually determined that an image of a search window shifted rightward by one pixel also corresponds to a human face, so that regions of these two windows is extracted. In step S108, the selector 473 selects a region with a greater evaluation value s (described later in relation to step S174 shown in FIG. 37) from the two regions extracted in step S70.

The process then returns to step S106, and subsequent steps are repeated.

As described above, a region with a small estimation value s is disregarded as being unreliable, and a region of the highest evaluation value s is selected. The process described above is repeated until it is determined in step S106 that two or more regions of objects of interest do not overlap each other. When it is determined that regions of objects of interest do not overlap each other, the process for the frame is exited. Then, the process is executed for a next frame as needed.

Figure 35:
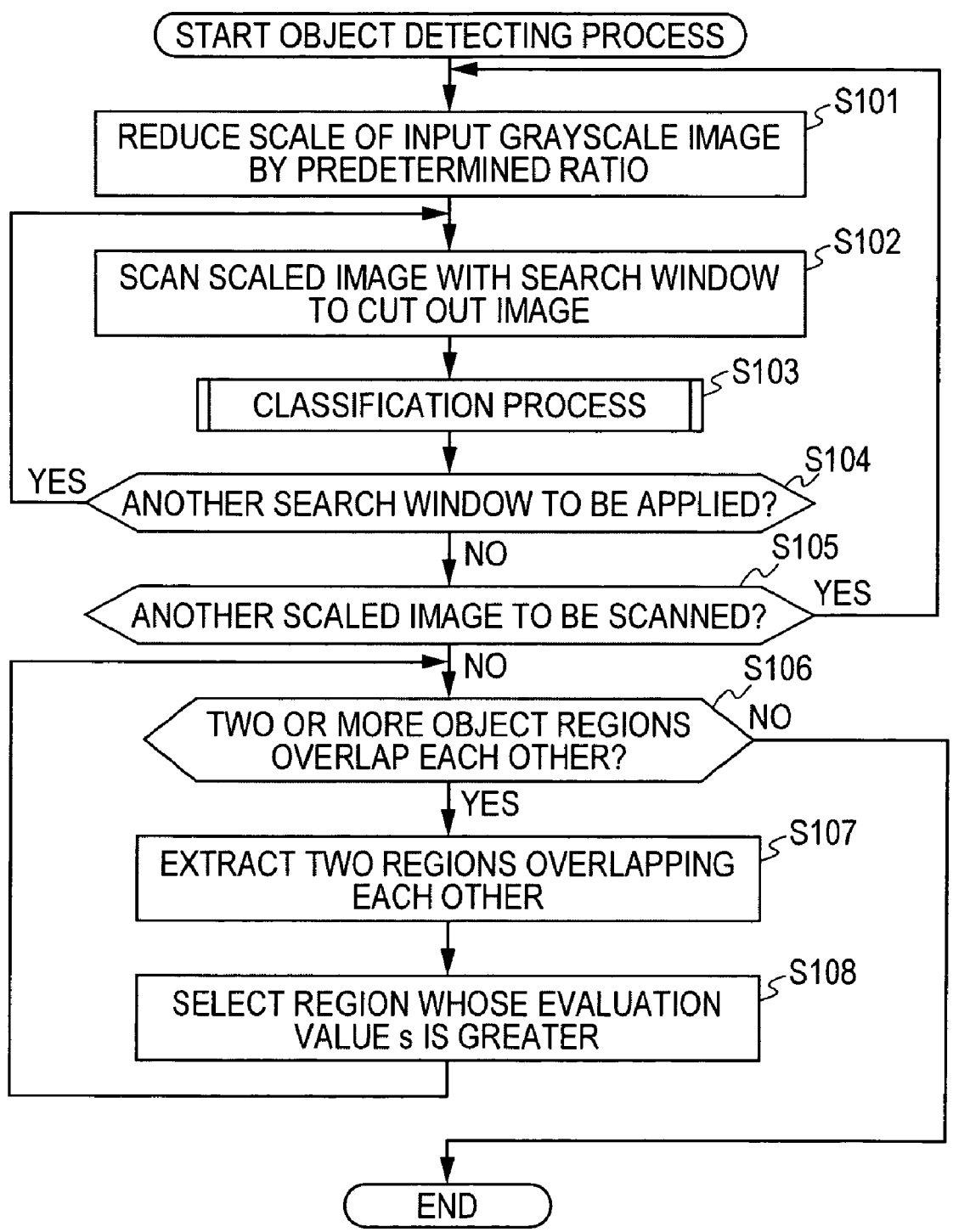
FIG. 35 is a flowchart of an object detecting process.

Next, the discrimination process in step S103 shown in FIG. 35 will be described with reference to a flowchart shown in FIG. 36. In step S131, the initializer 471 sets initial values. More specifically, the initializer 471 sets an ID of the uppermost node (root node) to the variable I representing the ID of a node to be processed. In the case of the example shown in FIG. 25, the ID 1000 of the uppermost node 221-1 is set. Furthermore, the initializer 471 initializes the value of the variable branch_count[i] representing the number of child nodes visited by a node in question to 0 for all the nodes. Furthermore, the initializer 471 initializes the evaluation value s obtained by calculating a value of weighted majority according to expression (7) to 0 for all the nodes.

Then, in step S132, the evaluation-value calculator 477 calculates an evaluation-value calculating process. Although the process will be described later with reference to a flowchart shown in FIG. 37, an evaluation value of a node being processed is calculated.

In step S133, the checker 472 determines whether a window image in question corresponds to a face based on the evaluation value s calculated in step S132. When the evaluation value s is positive (more specifically, when the evaluation value s is greater than a reference value (−HUGE_VAL) set in step S178 described later with reference to FIG. 37), it is determined that the image corresponds to a face, and otherwise it is determined that the image does not correspond to a face.

When it is determined that the window image in question does not correspond to a face, in step S138, the returner 474 returns the node to be processed to the parent node. More specifically, the returner 474 sets the ID of the parent node to the variable i. Since the node that is currently being processed is the uppermost node 221-1, no parent node thereof exists. Thus, −1 is set to the variable i, as described earlier.

In step S139, the checker 472 determines whether the value of the variable i set in step S138 is greater than 0. In this example, the value of the variable i is −1, which is not greater than 0. Thus, in step S140, the checker 472 determines that the window image in question does not correspond to a face.

That is, in this example, it is determined that the window image does not correspond to a face only by processing of the uppermost node 221-1.

When it is determined in step S133 that the window image corresponds to a human face (the evaluation value s is positive), in step S134, the checker 472 determines whether the node currently being processed has a child node. The node 221-1 currently being processed has three child nodes 221-1-1, 221-1-2, and 221-1-3. Thus, in step S135, the checker 472 determines whether the variable branch_count[i] of the node 221-1 (initialized to 0 in step S131 in this example) is less than the number of child nodes (size(numChild)) of the node 221-1. Since the value of the variable branch_count[i] is 0 and the number of child nodes is 3, it is determined that the value of the variable branch_count[i] is less than the number of child nodes. Thus, in step S136, the selector 473 selects a node to be processed next. More specifically, the value of the variable branch_count[i] is incremented by 1 (the value becomes 1). Then, an ID of the child node corresponding to the value of the variable branch_count[i] is set to the variable i. In the example shown in FIG. 25, for example, the ID 1100 of the node 221-1-1, which is a child node of the node 221-1, is set to the variable i. Then, in step S132, a process of calculating an evaluation value of the node having the ID set to the variable i (the node 221-1 in this case) is executed. That is, an evaluation value s is calculated by the node 221-1-1 (it is determined which label of human face image the window image corresponds to).

In step S133m the checker 472 determines whether the window image corresponds to a face (whether the evaluation value s is positive). When the window image corresponds to a face, in step S134, the checker 472 determines whether the node 221-1-1 currently being processed has a child node. Since the node 221-1-1 has three child nodes 221-1-1-1 to 221-1-1-3, in step S135, the checker 472 determines whether the value (=1) of the variable branch_count[i] of the node 221-1-1 is less than the number of child nodes thereof. Since the number of child nodes is 3, and the value of the variable branch_count[i] is less than the number. Thus, in step S136, the selector 473 compares the value of the variable branch_count[i] of the node 221-1-1 (initialized to 0 in step S131) with the number of child nodes (3 in this case). Since the value of the variable branch_count[i] is less than the number of child nodes, in step S136, the selector 473 increments the value of the variable branch_count[i] of the node 221-1-1 by 1 (the value becomes 1), and then sets the ID 1110 of the node 221-1-1, which is a child node of the node 221-1-1 corresponding to the variable branch_count[i] incremented, to the variable i. Then, the evaluation-value calculator 477 calculates an evaluation value of the node 221-1-1 corresponding to the ID set to the variable i.

In step S133, the checker 472 determines whether the evaluation value s of the node 221-1-1 indicates that the window image corresponds to a face. When the window image corresponds to a face, in step S134, the node 221-1-1 determines whether a child node exists. Since the node 221-1-1 has three child nodes, in step S135, it is determined whether the value of the variable branch_count[i] of the node 221-1-1 is less than the number of child nodes thereof. Since the value (=0) of the variable branch_count[i] is less than the number of child nodes (=3), in step S136, the selector 473 increments the value of the variable branch_count[i] of the node 221-1-1 by 1 (the value becomes 1). Then, an ID of a child node corresponding to the variable branch_count[i] incremented is set to the variable i. In the example shown in FIG. 25, the ID 1111 of the node 221-1-1-1, which is a child node of the node 221-1-1, is set to the variable i. In step S132, the evaluation-value calculator 477 calculates an evaluation value by the node 221-1-1-1.

In step S133, the checker 472 determines whether evaluation value s of the node 221-1-1-1 is positive (whether the image corresponds to a face). When the evaluation value s is positive, in step S134, it is determined whether the node has a child node. The node 221-1-1-1 is a terminal node and does not have any child node. Thus, in this case, in step S137, the checker 472 determines that the window image corresponds to a face with the label 1 associated with the node 221-1-1-1.

On the other hand, when it is determined that the evaluation value s is negative (the image does not correspond to a face), in step S138, the returner 474 sets the ID of the parent node to the variable i. More specifically, in this example, the ID 1110 of the node 221-1-1-1, which is the parent node of the node 221-1-1-1-1, is set to the variable i.

When it is determined in step S139 that the variable i is positive, in step S135, the checker 472 determines whether the variable branch_count[i] of the node 221-1-1-1 is less than the number of child nodes thereof. In this example, the value of the variable branch_count[i] is 1, which is less than the number of child nodes (3). Thus, in step S136, the selector 473 increments the value of the variable branch_count[i] by 1 (the value becomes 2). Furthermore, an ID of a child node corresponding to the variable branch_count[i] is set to the variable i. More specifically, the ID 1112 of the node 221-1-1-1-2 is set to the variable i. In step S132, the evaluation-value calculator 477 calculates an evaluation value s of the node 221-1-1-1-2.

In step S133, the checker 472 determines whether the evaluation value s of the node 221-1-1-1-2 indicates a face. When a face is indicated, in step S134, it is determined whether the node 221-1-1-1-2 has a child node. Since the node 221-1-1-1-2 does not have any child node, in step S137, the checker 472 determines that the window image corresponds to a face with the label 2 associated with the node 221-1-1-1-2.

On the other hand, when it is determined in step S133 that the evaluation value s of the node 221-1-1-1-2 is not positive, in step S138, the returner 474 sets the ID 1110 of the parent node of the node 221-1-1-1-2 to the variable i. Since the checker 472 determines that the variable i is greater than 0, the process proceeds from step S139 to step S135, in which it is determined whether the value (=2) of the variable branch_count[i] of the node 221-1-1-1 having an ID 1110 is less than the number of child nodes thereof. Since the variable branch_count[i] is less than the number of child nodes in this case, in step S136, the selector 473 increments the value of the variable branch_count[i] of the node 221-1-1-1 by 1 (the value becomes 3). Then, an ID of a child node corresponding to the value 3 of the variable branch_count[i] is set to the variable i. In this example, the ID 1113 of the node 221-1-1-3, which is a child node of the node 221-1-1-1, is set to the variable i. In step S132, an evaluation value s of the node 221-1-1-1-3 having the ID 1113 is calculated.

As described above, when it is determined that a window image corresponds to a face at each node, classification is performed sequentially by lower nodes. When it is determined by a lower node (child node) that a window image does not correspond to a human face, a discrimination process is executed at sibling nodes.

As described above, in this embodiment, nodes (weak classifiers) are arranged in a tree structure, so that the average amount of computation needed to obtain results of classification can be reduced. More specifically, in the example shown in FIG. 25, the maximum number of layers is 4. Since the number of weak classifiers at each node other than terminal nodes is 100, for example, the minimum number of weak classifiers needed to obtain classification results of the label 15 is (100×3+L15). Assuming that weak classifiers of all possible pairs of pixels are used for classification, the value (300+L15) is equal to K. Thus, when the labels 1 to 15 are classified by an arrangement shown in FIG. 21, discrimination processes for K×15 weak classifiers are needed to sequentially discriminate the labels 1 to 15. In this case, the processing times is 15 times the time needed for calculation of K weak classifiers. By executing calculation regarding the labels 1 to 15 in parallel, the processing time can be reduced to the calculation time of K weak classifiers, but the amount of computation does not change.

In the case of the example shown in FIG. 25, ideally, when calculation is performed in order of the node 221-1, the node 221-1-3, the node 221-1-3-3, and the node 221-1-3-3-1, the amount of computation and calculation time are those of K weak classifiers. Even if classification processes of lower nodes of the node 221-1-1 and lower nodes of the node 221-1-2 are performed after calculation by the node 221-1-1, the probability of the process reaching a terminal node is low since it could be determined in the middle that the image does not correspond to a face or the image correspond to another label. Even if the process reaches a terminal node, the number of weak classifiers is less than that in the case shown in FIG. 21.

Figure 21:
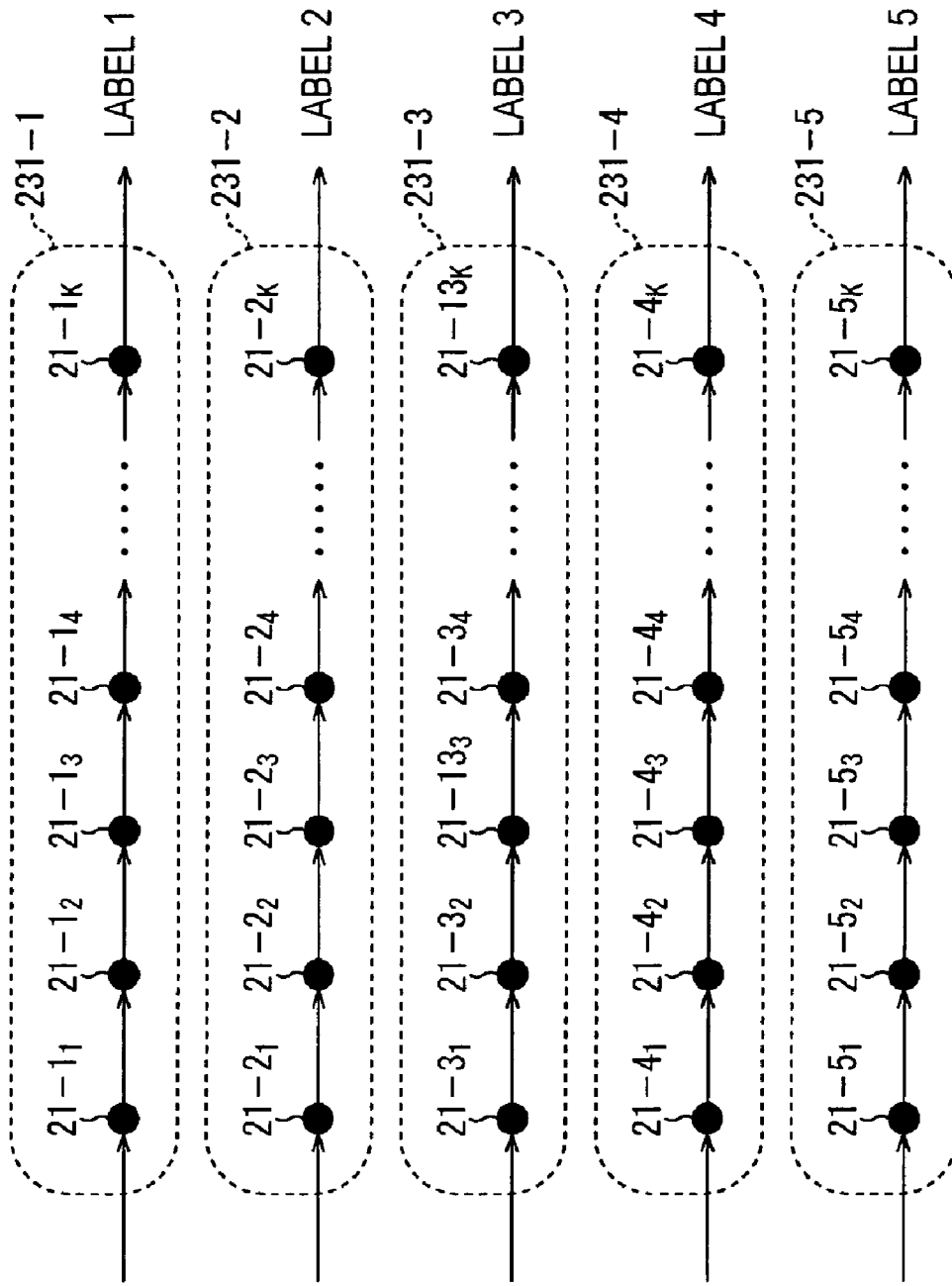
FIG. 21 is a diagram for explaining discrimination of labels according to ordinary AdaBoost.

Thus, by employing the tree structure shown in FIG. 25, it is possible to reduce the amount of computation and processing time compared with the case shown in FIG. 21.

Obviously, even when the tree structure shown in FIG. 25 is employed, by processing nodes of each layer in parallel, the processing time is equal or reduced compared with the case where parallel processing is employed in the case shown in FIG. 21. The amount of computation is reduced compared with the case shown in FIG. 21.

Next, the evaluation-value calculating process in step S132 shown in FIG. 36 will be described with reference to a flowchart shown in FIG. 37.

In step S171, the inheritor 475 inherits outputs of a parent node. More specifically, an evaluation value represented by a value of weighted majority calculated by the parent node is initially set to an evaluation value s(i) of the current node. When no parent node exists, i.e., in the case of the uppermost node, the evaluation value s(i) is initialized to 0.

In step S172, the weak-hypothesis calculator 476 initializes a variable t representing the number (order) of weak classifiers processed to 1. Then, in step S173, the weak-hypothesis calculator 476 calculates a weak hypothesis f(x) by a weak classifier represented by the variable t according to expression (13) given earlier. The weak classifier corresponds to an inter-pixel difference feature d defined by a pair of pixels $I_1$ and $I_2$ as described earlier, and a threshold Th therefore is chosen in advance by the learning process described earlier.

In step S174, the evaluation-value calculator 477, according to expression (15), updates the evaluation value s by multiplying a weak hypothesis (estimation value) of the current weak classifier by the confidence (majority weight) $\alpha_t$ and adding the previous evaluation value s. That is, the evaluation-value calculator 477 calculates the value F(x) of weighted majority by weighting the result of classification of the weak classifier calculated according to expression (13) by the majority weight at according to expression (9), updating the evaluation value s.

$$s(i)=s(i)+\alpha_t\cdot f(x) \qquad (15)$$

A weak classifier that outputs a binary estimation value according to expressions (3) to (5) and a weak classifier that outputs an estimation value according to the function f(x) expressed in expression (6) reflect their estimation values to the evaluation value s in different ways.

When expression (2) is used for a classifier to output a binary estimation value, the evaluation value s can be expressed by expression (16) below:

$$s \leftarrow s + \begin{cases} \alpha_t & \ldots \quad Th_t < d_t \\ -\alpha_t & \ldots \quad \text{Otherwise} \end{cases} \quad (16)$$

That is, the value of the result $f_t(x)$ of classification by a weak classifier is +1 when the value of inter-pixel difference feature d is greater than the threshold $Th_t$ and is otherwise −1. Thus, the value obtained by multiplying the estimation value $f_t(x)$ by the weight $\alpha_t$ is $\alpha t$ when the value of inter-pixel difference feature d is greater than the threshold and is otherwise $-\alpha_t$. These values are added to the previous evaluation value s according to expression (7) to update the evaluation value s, which is the value F(x) of weighted majority according to expression (7).

When expression (3) is used for a weak classifier to output a binary estimation value, the evaluation value s can be expressed by expression (17) below:

$$s \leftarrow s + \begin{cases} \alpha_t & \ldots \quad Th_{t,1} < d_t < Th_{t,2} \\ -\alpha_t & \ldots \quad \text{Otherwise} \end{cases} \quad (17)$$

When expression (4) is used for a weak classifier to output a binary estimation value, the evaluation value s can be expressed by expression (18) below:

$$s \leftarrow s + \begin{cases} \alpha_t & \ldots \quad d_t < Th_{t,1} \text{ or } Th_{t,2} < d_t \\ -\alpha_t & \ldots \quad \text{Otherwise} \end{cases} \quad (18)$$

When expression (5) is used for a weak classifier to output an estimation value according to the function f, the estimation value s can be expressed by expression (19) below:

$$s \leftarrow s + f(d) \quad (19)$$

Then, in step S175, the checker 472 determines whether the evaluation value s(i) is greater than the termination threshold $R_M(t)$. That is, the checker 472 determines whether the evaluation value s(i) updated in step S174 is greater than the termination threshold $R_M(t)$ of the t-th weak classifier, learned during learning. When the evaluation value s(i) is greater than the termination threshold $R_M(t)$, in step S176, the checker 472 increments the variable t by 1. Then, in step S177, the checker 472 determines whether the variable t incremented in step S176 is greater than a predetermined constant T. The constant T denotes the number of weak classifiers included in the node. In this embodiment, the value of T is 100 when the node is not a terminal node, and the value of T is chosen for each node when the node is a terminal node. When the variable t is less than or equal to the constant T, it is indicated that classification by all the weak classifiers has not been finished, so that the process returns to step S173. Then, in step S173, the weak-hypothesis calculator 476 calculates a weak hypothesis of a next weak classifier corresponding to the variable t incremented. Similar processes are sequentially executed.

When it is determined in step S177 that the variable t is greater than the constant T, in step S179, the output unit 479 outputs the evaluation value s(i) updated in step S174 as an evaluation value (classification result) of the node.

On the other hand, when it is determined in step S175 that the evaluation value s(i) is less than or equal to the termination threshold $R_M(t)$, in step S178, the setter 478 sets a negative huge value (−HUGE_VAL) to the evaluation value s(i). Then, in step S179, the output unit 479 outputs the negative huge value of the evaluation value s(i) set in step S178 as a classification result of the node.

That is, in this case, since the evaluation value s(i) is less than the termination threshold $R_M(t)$, it is determined that the window image does not correspond to a human face with any of the labels 1 to 15, so that subsequent discrimination process is not executed. This allows even quicker discrimination.

Figure 36:
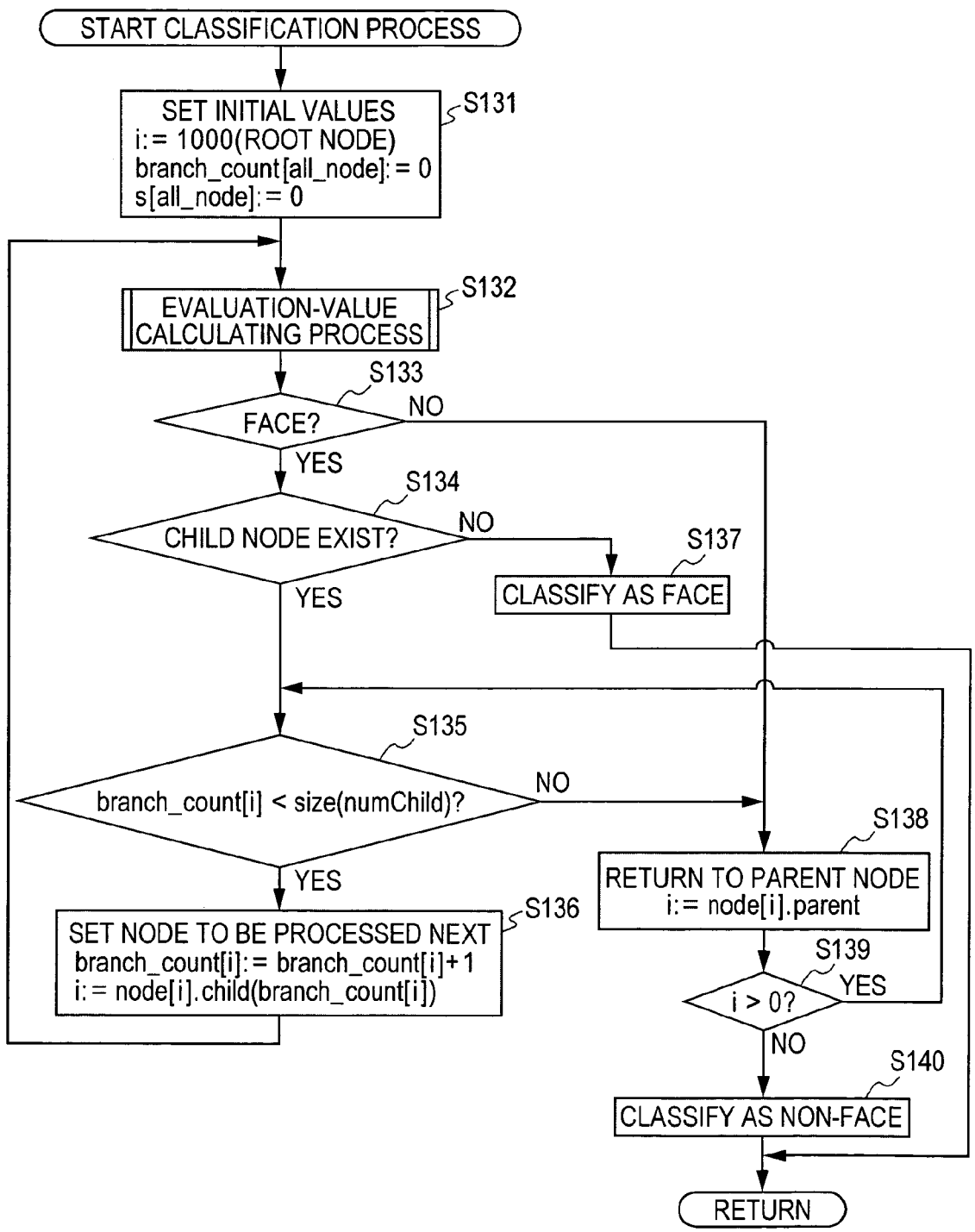
FIG. 36 is a flowchart of a discrimination process in step S103 shown in FIG. 35.
Figure 37:
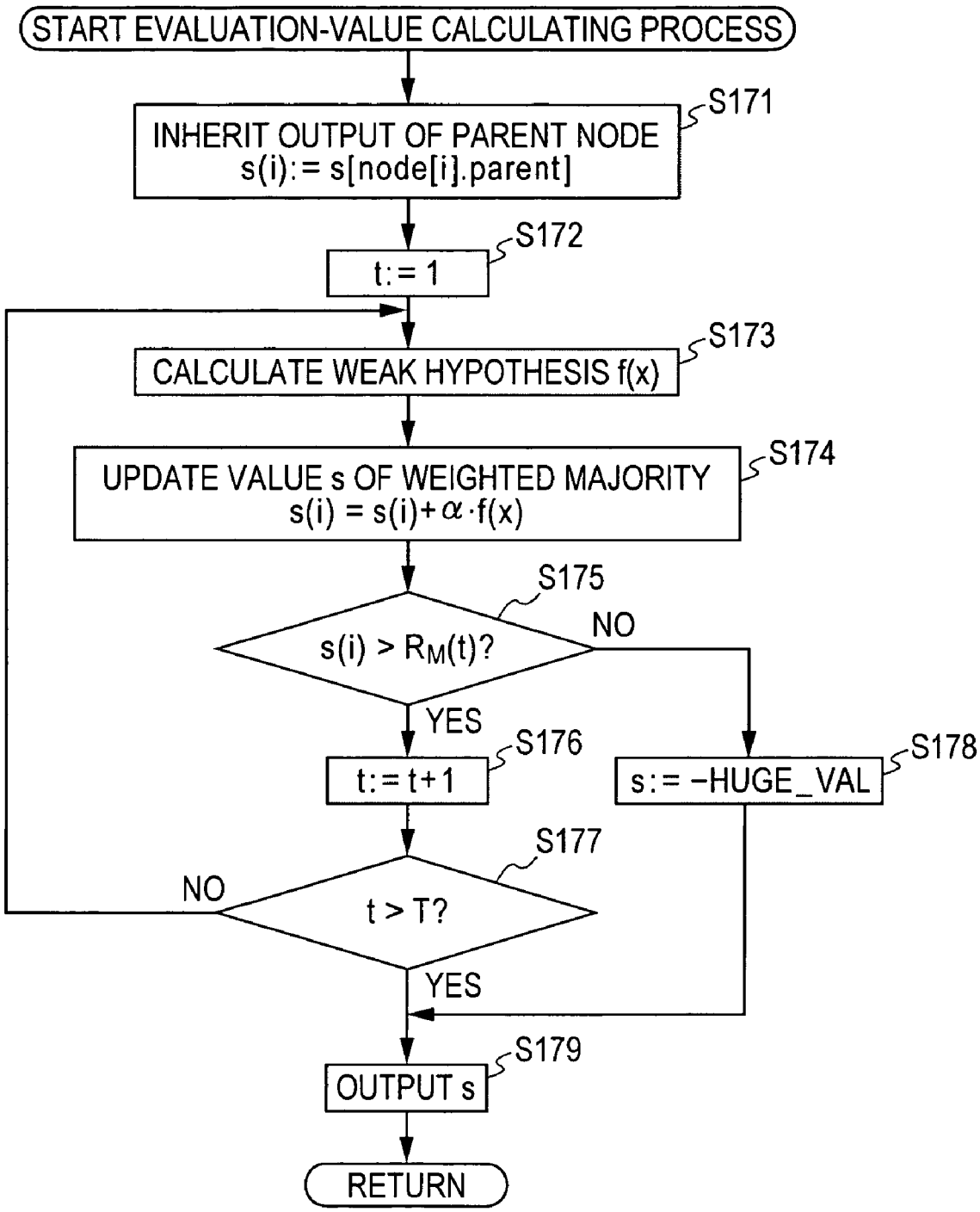
FIG. 37 is a flowchart of an evaluation-value calculating process in step S132 shown in FIG. 36.

Then, the process returns to step S132 shown in FIG. 36. In step S133, it is determined whether the window image is determined as corresponding to a face at the node. As described earlier, when the evaluation value s is chosen to be the reference value in step S178, it is determined that the window image does not correspond to a human face. On the other hand, when the evaluation value s is greater than the reference value, it is determined that the window image corresponds to a human face.

As described above, by the method of detecting an object of interest according to this embodiment, an object of interest is detected using a classification unit constructed by weak classifiers that perform weak classifications based on inter-pixel difference features, learned by ensemble learning. Thus, simply by reading luminance values of two pixels in a window image and calculating the difference therebetween, the step of calculating a feature of an object of interest in step S173 is finished. Thus, face detection can be performed very quickly, allowing real-time face detection.

Furthermore, each time the evaluation value s is updated by adding up a value obtained by multiplying a classification result (estimation value) of a feature by a confidence for a weak classifier used for classification, the evaluation value s is compared with the termination threshold $R_M$ to determine whether to continue calculation of estimation value by weak classifiers. The calculation by weak classifiers is terminated when the evaluation value s becomes less than the termination threshold $R_M$, and the process shifts to a next window image. This considerably reduces useless calculation, allowing even quicker face detection.

That is, when all the regions of the input image and images of reduced scales are scanned to cut out window images, the probability of a window image corresponding to an object of interest is small, and most of the window images correspond to objects not of interest. By terminating classification of window images not corresponding to objects of interest, the efficiency of classification is considerably improved. On the contrary, when a large number of objects of interest to be detected is included, similarly to the method of termination based on the termination threshold, a threshold for terminating calculation of window images that are determined as clearly corresponding to objects of interest may be provided. Furthermore, by scaling an input image by the scaling unit, it is possible to set a search window of an arbitrary size, allowing detection of an object of interest of an arbitrary size.

The present invention is not limited to the embodiments described above, and various modifications are possible without departing from the spirit of the present invention. The present invention can be applied to information processing apparatuses including various image processing apparatuses for receiving and displaying moving pictures as well as still pictures, such as robots.

The series of processes described above can be executed either by hardware or by software. For example, an object detecting apparatus can be implemented by a personal computer shown in FIG. 38.

Figure 38:
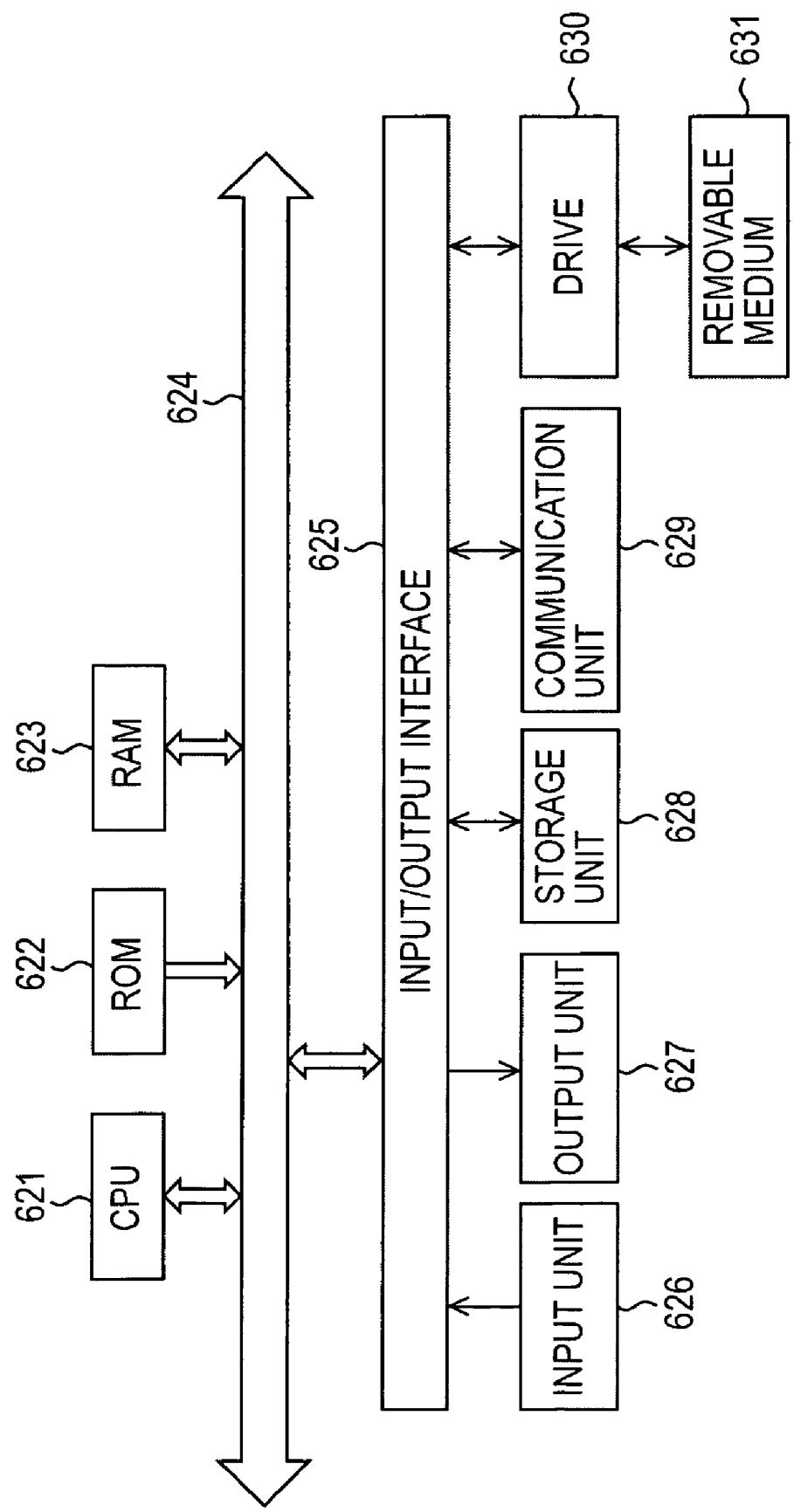
FIG. 38 is a block diagram showing an example construction of a computer.

Referring to FIG. 38, a central processing unit (CPU) 621 executes various processes according to programs stored in a read-only memory (ROM) 622 or programs loaded from a storage unit 628 into a random access memory (RAM) 623. The RAM 623 also stores data needed by the CPU 621 to execute various processes.

The CPU 621, the ROM 622, and the RAM 623 are connected to each other via a bus 624. The bus 624 is also connected to an input/output interface 625.

The input/output interface 625 is connected to an input unit 626, such as a keyboard and a mouse, a display, such as a cathode ray tube (CRT) display or a liquid crystal display (LCD), an output unit 627, such as a speaker, the storage unit 628, such as a hard disk, and a communication unit 629, such as a modem. The communication unit 629 carries out communications via networks including the Internet.

The input/output interface 625 is also connected to a drive 630 as needed. On the drive 630, a removable medium 631, e.g., a magnetic disk, an optical disk, a magneto-optical disk, or a semiconductor memory, is mounted as needed, and computer programs read therefrom are installed on the storage unit 628 as needed.

When the series of processes is executed by software, programs constituting the software are installed on a computer embedded in special hardware, or are installed from a recording medium or via a network to a general-purpose personal computer or the like that allows executing various functions with various programs installed thereon.

The programs may be recorded on a recording medium that is distributed separately from the computer to provide the programs to a user, for example, the removable medium 631 such as a magnetic disk (e.g., a floppy disk), an optical disk (e.g., a compact disk read-only memory (CD-ROM) or a digital versatile disk (DVD)), a magneto-optical disk (e.g., a mini disk (MD)), or a semiconductor memory, as shown in FIG. 38. Alternatively, the recording medium carrying the programs may be the ROM 622 or a hard disk included in the storage unit 628, provided to the user as included in the computer.

Steps that are executed according to the programs recorded on the recording medium need not necessarily be executed sequentially in the order described herein, and may include steps that are executed in parallel or individually.

In this specification, a system refers to the entirety of a plurality of apparatuses.

What is claimed is:

1. A computer program embodied on a computer readable medium for an information processing apparatus comprising:

upper nodes each including a plurality of weak classifiers that learns learning samples with a first label of a first range among learning samples classified with a plurality of labels;

first lower nodes each including a plurality of weak classifiers that learns learning samples with a second label of a second range based on results of classification by the upper nodes, the second range being a part of the first range;

second lower nodes each including a plurality of weak classifiers that learns learning samples with a third label of a third range based on the results of classification by the upper nodes, the third range being a part of the first range and different from the second range; and an inheritor which inherits values, saved by a previous node, as initial values for processing a subsequent node, wherein the learning samples include image patterns of human faces facing a plurality of directions such that learning of the human face is based upon postures of human faces.

2. The computer program according to claim 1, wherein the learning is sequentially performed from an uppermost node among the upper nodes to a terminal node among the first or second lower nodes, and when the learning reaches the terminal node among the first or second lower nodes, the learning is performed for other first or second lower nodes that are parallel to the terminal node.

3. The computer program according to claim 1, wherein the upper nodes each have a predetermined number of weak classifiers, and terminal nodes among the first and second lower nodes each has a number of weak classifiers that is less than or equal to the predetermined number.

4. The computer program according to claim 1, wherein each of the upper nodes and the first and second lower nodes comprises:

selecting means for selecting a weak classifier using data weights in each iteration of learning;

cumulative-sum calculating means for calculating cumulative sums by weighting results of classification of the respective learning samples by weak classifiers that have been selected, the weighting being based on confidences associated with the respective weak classifiers; reference-value calculating means for calculating, based on the cumulative sums, a reference value that is used when discrimination is performed using the learned weak classifiers;

weight calculating means for calculating data weights based on the learning samples; and reflecting means for saving the data weights calculated by the weight calculating means and reflecting the data weights on selection of a weak classifier by the selecting means in a next iteration of learning.

5. The computer program according to claim 1, wherein the weak classifiers calculate results of classification based on a difference between a threshold and a difference between values of two pixels in image data of the learning samples.

6. An information processing method comprising the steps of:

learning learning samples with a first label of a first range among learning samples classified with a plurality of labels, by upper nodes each including a plurality of weak classifiers;

learning learning samples with a second label of a second range based on results of classification by the upper nodes, the second range being a part of the first range, by first lower nodes each including a plurality of weak classifiers;

learning learning samples with a third label of a third range based on the results of classification by the upper nodes, the third range being a part of the first range and different from the second range, by second lower nodes each including a plurality of weak classifiers; and inheriting values, saved by a previous node, as initial values for processing a subsequent node, wherein the learning samples include image patterns of human faces facing a plurality of directions such that learning of the human face is based upon postures of human faces.

7. A computer-readable medium having recorded thereon a computer-readable program comprising the steps of:
- learning learning samples with a first label of a first range among learning samples classified with a plurality of labels, by upper nodes each including a plurality of weak classifiers;
- learning learning samples with a second label of a second range based on results of classification by the upper nodes, the second range being a part of the first range, by first lower nodes each including a plurality of weak classifiers;
- learning learning samples with a third label of a third range based on the results of classification by the upper nodes, the third range being a part of the first range and different from the second range, by second lower nodes each including a plurality of weak classifiers; and
- inheriting values, saved by a previous node, as initial values for processing a subsequent node,
- wherein the learning samples include image patterns of human faces facing a plurality of directions such that learning of the human face is based upon postures of human faces.

8. A program embodied on a computer-readable medium that allows a computer to execute the steps of:
- learning learning samples with a first label of a first range among learning samples classified with a plurality of labels, by upper nodes each including a plurality of weak classifiers;
- learning learning samples with a second label of a second range based on results of classification by the upper nodes, the second range being a part of the first range, by first lower nodes each including a plurality of weak classifiers;
- learning learning samples with a third label of a third range based on the results of classification by the upper nodes, the third range being a part of the first range and different from the second range, by second lower nodes each including a plurality of weak classifiers; and
- inheriting values, saved by a previous node, as initial values for processing a subsequent node,
- wherein the learning samples include image patterns of human faces facing a plurality of directions such that learning of the human face is based upon postures of human faces.

9. A computer program embodied on a computer readable medium for an information processing apparatus comprising:
- upper nodes each including a plurality of weak classifiers that has learned learning samples with a first label of a first range among learning samples classified with a plurality of labels;
- first lower nodes each including a plurality of weak classifiers that has learned learning samples with a second label of a second range based on results of classification by the upper nodes, the second range being a part of the first range;
- second lower nodes each including a plurality of weak classifiers that has learned learning samples with a third label of a third range based on the results of classification by the upper nodes, the third range being a part of the first range and different from the second range; and
- an inheritor which inherits values, saved by a previous node, as initial values for processing a subsequent node,
- wherein inheriting values, saved by a previous node, as initial values for processing a subsequent node, the first and second lower nodes performs discrimination of input signals based on the results of classification by the upper nodes, and discrimination is performed on a node-by-node basis sequentially from an uppermost node among the upper nodes to a terminal node among the first or second lower nodes, and when the discrimination reaches the terminal node among the first or second lower nodes, the discrimination is performed for other first or second lower nodes that are parallel to the terminal node,
- wherein the learning samples include image patterns of human faces facing a plurality of directions such that learning of the human face is based upon postures of human faces.

10. The computer program according to claim 9, wherein the weak classifiers calculate results of classification based on a difference between a threshold and a difference between values of two pixels in image data of the learning samples.

11. An information processing method for an information processing apparatus including:
- upper nodes each including a plurality of weak classifiers that has learned learning samples with a first label of a first range among learning samples classified with a plurality of labels;
- first lower nodes each including a plurality of weak classifiers that has learned learning samples with a second label of a second range based on results of classification by the upper nodes, the second range being a part of the first range;
- second lower nodes each including a plurality of weak classifiers that has learned learning samples with a third label of a third range based on the results of classification by the upper nodes, the third range being a part of the first range and different from the second range; and
- an inheritor which inherits values, saved by a previous node, as initial values for processing a subsequent node, the information processing method comprising the steps of:
- inheriting values, saved by a previous node, as initial values for processing a subsequent nodes;
- discriminating input signals by the lower nodes based on the results of classification by the upper nodes; and
- performing discrimination on a node-by-node basis sequentially from an uppermost node among the upper nodes to a terminal node among the first or second lower nodes, and performing discrimination for other first or second lower nodes that are parallel to the terminal node when the discrimination reaches the terminal node among the first or second lower nodes,
- wherein the learning samples include image patterns of human faces facing a plurality of directions such that learning of the human face is based upon postures of human faces.

12. A computer-readable medium having recorded thereon a program for an information processing apparatus including:
- upper nodes each including a plurality of weak classifiers that has learned learning samples with a first label of a first range among learning samples classified with a plurality of labels;
- first lower nodes each including a plurality of weak classifiers that has learned learning samples with a second label of a second range based on results of classification by the upper nodes, the second range being a part of the first range;
- second lower nodes each including a plurality of weak classifiers that has learned learning samples with a third label of a third range based on the results of classification by the upper nodes, the third range being a part of the first range and different from the second range; and
- an inheritor which inherits values, saved by a previous node, as initial values for processing a subsequent node, the program comprising the steps of:

inheriting values, saved by a previous node, as initial values for processing a subsequent node;

discriminating input signals by the lower nodes based on the results of classification by the upper nodes; and performing discrimination on a node-by-node basis sequentially from an uppermost node among the upper nodes to a terminal node among the first or second lower nodes, and performing discrimination for other first or second lower nodes that are parallel to the terminal node when the discrimination reaches the terminal node among the first or second lower nodes, wherein the learning samples include image patterns of human faces facing a plurality of directions such that learning of the human face is based upon postures of human faces.

13. A computer program embodied on a computer-readable medium for an information processing apparatus including:

upper nodes each including a plurality of weak classifiers that has learned learning samples with a first label of a first range among learning samples classified with a plurality of labels;

first lower nodes each including a plurality of weak classifiers that has learned learning samples with a second label of a second range based on results of classification by the upper nodes, the second range being a part of the first range;

second lower nodes each including a plurality of weak classifiers that has learned learning samples with a third label of a third range based on the results of classification by the upper nodes, the third range being a part of the first range and different from the second range; and an inheritor which inherits values, saved by a previous node, as initial values for processing a subsequent node, the program allowing a computer to execute the steps of:

inheriting values, saved by a previous node, as initial values for processing a subsequent node;

discriminating input signals by the lower nodes based on the results of classification by the upper nodes; and performing discrimination on a node-by-node basis sequentially from an uppermost node among the upper nodes to a terminal node among the first or second lower nodes, and performing discrimination for other first or second lower nodes that are parallel to the terminal node when the discrimination reaches the terminal node among the first or second lower nodes, wherein the learning samples include image patterns of human faces facing a plurality of directions such that learning of the human face is based upon postures of human faces.

14. The computer program according to claim 1, wherein learning of the human face is based upon yaw angle and pitch angle postures of human faces.

15. An information processing method according to claim 6, wherein learning of the human face is based upon yaw angle and pitch angle postures of human faces.

16. A computer-readable medium according to claim 7, wherein learning of the human face is based upon yaw angle and pitch angle postures of human faces.

17. A program according to claim 8, wherein learning of the human face is based upon yaw angle and pitch angle postures of human faces.

18. The program according to claim 9, wherein learning of the human face is based upon yaw angle and pitch angle postures of human faces.

19. An information processing method according to claim 1, wherein the values show data weights of cumulative sums.

20. A computer program according to claim 4, wherein the data weights and cumulative sums of learning samples are passed to the lower node based on the classification of the upper nodes.

\* \* \* \* \*

UNITED STATES PATENT AND TRADEMARK OFFICE
CERTIFICATE OF CORRECTION

PATENT NO.        : 7,630,525 B2                                                    Page 1 of 1
APPLICATION NO. : 11/089932
DATED             : December 8, 2009
INVENTOR(S)       : Sabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1022 days.

Signed and Sealed this

Second Day of November, 2010

David J. Kappos
*Director of the United States Patent and Trademark Office*